United States Patent [19]
Nagumo et al.

[11] Patent Number: 5,990,920
[45] Date of Patent: *Nov. 23, 1999

[54] DRIVING APPARATUS WITH CIRCUITS FOR EFFICIENTLY TRANSFERRING AND STORING COMPENSATION DATA

[75] Inventors: Akira Nagumo; Minoru Teshima; Jiro Tanuma, all of Tokyo, Japan

[73] Assignee: Oki Data Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/694,055

[22] Filed: Aug. 8, 1996

[30] Foreign Application Priority Data

Aug. 11, 1995 [JP] Japan ................................. 7-205891
Jul. 5, 1996 [JP] Japan ................................. 8-176824

[51] Int. Cl.⁶ ...................................................... B41J 2/435
[52] U.S. Cl. ........................................................ 347/237
[58] Field of Search .............................. 347/237, 12, 13, 347/211; 345/55; 395/108

[56] References Cited

U.S. PATENT DOCUMENTS

| | | | |
|---|---|---|---|
| 4,296,423 | 10/1981 | Nakamura | 347/131 |
| 4,706,130 | 11/1987 | Yamakawa | 358/296 |
| 4,864,216 | 9/1989 | Kalata et al. | 323/315 |
| 4,885,597 | 12/1989 | Tashang et al. | 347/237 |
| 5,138,310 | 8/1992 | Hirane et al. | 347/237 X |
| 5,488,404 | 1/1996 | Fleck et al. | 347/237 X |
| 5,559,465 | 9/1996 | Shah | 327/374 |

FOREIGN PATENT DOCUMENTS

| | | | |
|---|---|---|---|
| 60-246169 | 12/1985 | Japan | H04N 1/032 |
| 62-179963 | 8/1987 | Japan . | |
| 63-71373 | 3/1988 | Japan . | |
| 1-160659 | 6/1989 | Japan . | |
| 1-192573 | 8/1989 | Japan . | |
| 4-298362 | 10/1992 | Japan | B41J 2/355 |

OTHER PUBLICATIONS

Millman, Jacob and Grabel, Arvin, "Microelectronics", 2nd edition, McGraw–Hill, pp. 155–157 and 356–357, 1987.
Richard C. Dorf, *The Electrical Engineering Handbook*, CRC Press, Boca Raton, FL, 1993, pp. i.,ii., 1635–1640 and 1721.

*Primary Examiner*—N. Le
*Assistant Examiner*—Judy Nguyen
*Attorney, Agent, or Firm*—Akin, Gump, Strauss, Hauer & Feld, L.L.P.

[57] ABSTRACT

A driving apparatus has driving circuits that supply driving energy to driven elements which form dots. The driving circuits are controlled by driving data indicating which driven elements are to be driven, and compensation data adjusting the amount of driving energy. The compensation data are stored in compensation memory circuits coupled to the driving circuits. A single data transfer means transfers the driving data to the driving circuits and the compensation data to the compensation memory circuits. If the driven elements are located on two or more different semiconductor chips, some of the compensation data preferably compensate for chip-to-chip differences, while other compensation data compensate for dot-to-dot differences within the same chip.

20 Claims, 47 Drawing Sheets

FIG. 10

| COMMAND DATA | | | | MODE |
|---|---|---|---|---|
| $d_3$ | $d_2$ | $d_1$ | $d_0$ | |
| 0 | 0 | 1 | 0 | WRITE (WR) |
| 0 | 1 | 0 | 0 | TRANSFER (TRANS) |
| 0 | 1 | 1 | 0 | DIRECT |
| 1 | 0 | 0 | 0 | READ (RD) |

FIG. 37

| ADDRESS | b₃ | b₂ | b₁ | b₀ | |
|---|---|---|---|---|---|
| $ 000 | — | — | — | chip26 bit3 | |
| $ 001 | dot2496 bit3 | dot2495 bit3 | dot2494 bit3 | dot2493 bit3 | |
| $ 002 | dot2492 bit3 | dot2491 bit3 | dot2490 bit3 | dot2489 bit3 | 25 WORDS |
| ∫ | ≈ | ≈ | ≈ | ≈ | |
| $ 0017 | dot2408 bit3 | dot2407 bit3 | dot2406 bit3 | dot2405 bit3 | |
| $ 0018 | dot2404 bit3 | dot2403 bit3 | dot2402 bit3 | dot2401 bit3 | |
| $ 0019 | — | — | — | chip25 bit3 | |
| $ 001A | dot2400 bit3 | dot2399 bit3 | dot2398 bit3 | dot2397 bit3 | 25 WORDS |
| ∫ | ≈ | ≈ | ≈ | ≈ | |
| $ 031 | dot2308 bit3 | dot2307 bit3 | dot2306 bit3 | dot2305 bit3 | |
| ∫ | ≈ | ≈ | ≈ | ≈ | |
| $ 271 | — | — | — | chip1 bit3 | 650 WORDS |
| $ 272 | dot96 bit3 | dot95 bit3 | dot94 bit3 | dot93 bit3 | |
| ∫ | ≈ | ≈ | ≈ | ≈ | |
| $ 289 | dot4 bit3 | dot3 bit3 | dot2 bit3 | dot1 bit3 | |
| $ 28A | — | — | — | chip26 bit2 | |
| $ 28B | dot2496 bit2 | dot2495 bit2 | dot2494 bit2 | dot2493 bit2 | 650 WORDS |
| ∫ | ≈ | ≈ | ≈ | ≈ | |
| $ 513 | dot4 bit2 | dot3 bit2 | dot2 bit2 | dot1 bit2 | |
| $ 514 | — | — | — | chip26 bit1 | |
| $ 515 | dot2496 bit1 | dot2495 bit1 | dot2494 bit1 | dot2493 bit1 | 650 WORDS |
| ∫ | ≈ | ≈ | ≈ | ≈ | |
| $ 79D | dot4 bit1 | dot3 bit1 | dot2 bit1 | dot1 bit1 | |
| $ 79E | — | — | — | chip26 bit0 | |
| $ 79F | dot2496 bit0 | dot2495 bit0 | dot2494 bit0 | dot2493 bit0 | 650 WORDS |
| ∫ | ≈ | ≈ | ≈ | ≈ | |
| $ A27 | dot4 bit0 | dot3 bit0 | dot2 bit0 | dot1 bit0 | |
| $ A28 | — | — | — | — | 1496 WORDS |
| ∫ | ≈ | ≈ | ≈ | ≈ | |
| $ FFFF | — | — | — | — | |

DRIVING APPARATUS WITH CIRCUITS FOR EFFICIENTLY TRANSFERRING AND STORING COMPENSATION DATA

BACKGROUND OF THE INVENTION

The present invention relates to electronic apparatus for selectively and cyclically driving a group of driven elements such as a row of light-emitting diodes employed in an electrophotographic printer, a row of resistive heating elements employed in a thermal printer, or an array of display elements employed in a display device.

In the following description, the driven elements will be light-emitting diodes or LEDs employed in an electrophotographic printer.

In a conventional electrophotographic printer, for example, an electrically charged photosensitive drum is selectively illuminated, responsive to the data to be printed, to form a latent electrostatic image, which is developed by application of toner particles to form a toner image. The toner Image is then transferred to paper and fused onto the paper.

FIG. 46 is a block diagram of the control circuitry of a conventional electrophotographic printer. FIG. 47 is a timing diagram illustrating the operation of the conventional electrophotographic printer.

The printing control unit 1 in FIG. 46 comprises a microprocessor, read-only memory (ROM), random-access memory (RAM), input-output ports, timers, and other elements disposed in the printing engine of the printer. The printing control unit 1 receives a control signal SG1 and a dot data signal SG2 from a higher-order controller, and controls the printing operations performed by the printing engine. The dot data signal SG2 is a one-dimensional digital signal representing a two-dimensional bit map of picture elements (pixels), referred to below as dots.

Upon receiving a print command via control signal SG1, the printing control unit 1 first checks a temperature sensor 23 to determine whether the fuser 22 is within the necessary temperature range. If the fuser 22 is not within the necessary temperature range, the printing control unit 1 activates a heater 22a built into the fuser 22. When the fuser 22 reaches the necessary temperature, the printing control unit 1 activates a driver 2 that drives a stepping motor or pulse motor (PM) 3 used in the developing and transfer process, and activates a charge signal SGC that switches on a high-voltage power source 25 that charges toner particles in a developer unit 27.

The presence or absence of paper and the size of the paper are detected by a paper sensor 8 and size sensor 9. If paper is present, the printing control unit 1 activates a driver 4 that drives another pulse motor (PM) 5. This motor is first driven in reverse by a certain amount, until paper is detected by a pick-up sensor 6, then driven forward to feed the paper into the printing engine.

When the paper has been fed to the necessary position, the printing control unit 1 sends timing signals SG3 (including horizontal and vertical synchronization signals) to the higher-order controller, and begins receiving the dot data signal SG2, which the higher-order controller generates on a page-at-a time basis. The dot data signal SG2 is supplied as a data signal HD-DATA to an LED head 19 comprising a row of LEDs, with one LED per dot. The transfer of dot data into the LED head 19 is synchronized with a clock signal (HD-CLK). The dot data will be referred to below as driving data, since they determine whether each LED is driven or not.

After sufficient driving data (HD-DATA) for one horizontal dot line have been transferred into the LED head 19, the printing control unit 1 sends the LED head 19 a load signal (HD-LOAD), causing the driving data to be latched in the LED head 19. The LED head 19 can then print this line while receiving driving data for the next line.

The LED head 19 prints the line by illuminating a photosensitive drum (not visible) which has been precharged to a negative electrical potential. The potential level of illuminated dots rises, creating a latent dot image. The toner in the developer unit 27 is also charged to a negative potential, so toner particles are electrostatically attracted to the illuminated dots, creating a toner image.

The LEDs are turned on and off in synchronization with a strobe signal (HD-STB-N). FIG. 47 illustrates the timing of this signal and other signals mentioned above. The SG3 pulses shown at the top of FIG. 47 are horizontal synchronization pulses. FIG. 47 illustrates three successive line-printing cycles, for printing lines N−1, N, and N+1 (where N is an arbitrary integer).

Referring again to FIG. 46, to transfer the toner image to the paper, the printing control unit 1 activates a transfer signal SG4 that turns on a high-voltage power source 26, generating a high positive voltage in a transfer unit 28. As the paper travels through a narrow gap between the photosensitive drum and transfer unit 28, the toner image is transferred by electrostatic attraction to the paper.

The paper with the toner image is then transported to the fuser 22, which has been heated by the heater 22a. The heat fuses the toner to the paper, which then passes an exit sensor 7 and is ejected from the printer.

The printing control unit 1 controls these operations so that the high-voltage power source 26 is switched off except while the paper is traveling past the transfer unit 28, as detected by sensors 6 and 9. When the paper passes the exit sensor 7, the printing control unit 1 also switches off the high-voltage power source 25 of the developer unit 27, and stops the pulse motor (PM) 3 used in the developing and transfer process.

The above sequence is repeated for each page.

FIG. 48 shows the structure of the conventional LED head 19 in more detail. The driving data HD-DATA and clock signal HD-CLK are provided to a shift register comprising, for example, two thousand four hundred ninety-six flip-flop circuits $FF_1$, $FF_2$, ..., $FF_{2496}$ (this number of flip-flop circuits is appropriate for printing on A4-size paper at three hundred dots per inch). When two thousand four hundred ninety-six bits of driving data have been clocked into this shift register, the load signal HD-LOAD is activated, causing the bits to be stored in latches $LT_1$, $LT_2$, ..., $LT_{2496}$. When the strobe signal HD-STB-N is driven low, bits set to the high logic level (one) turn on light-emitting diodes $LD_1$, $LD_2$, ..., $LD_{2496}$ by way of an inverter $G_0$, NAND gates $G_1$, $G_2$, ..., $G_{2496}$, and p-channel metal-oxide-semiconductor (MOS) transistors $Tr_1$, $Tr_2$, ..., $Tr_{2496}$. The symbol $V_{DD}$ represents a power-supply potential.

In a printer employing the LED head in FIG. 48, all of the light-emitting diodes $LD_1$, $LD_2$, ..., $LD_{2496}$ that are switched on are switched on for the same length of time, determined by the strobe signal HD-STB-N. Thus if these light-emitting diodes, or the transistors $Tr_1$, $Tr_2$, ..., $Tr_{2496}$, do not have perfectly uniform electrical properties, the dots will be unevenly illuminated. This will lead to differences in the sizes of the electrostatic dots in the latent image formed on the photosensitive drum, hence to differences in the sizes of the dots printed on the page.

Although different dot sizes are not readily noticeable on pages containing only line art or text, when photographs or similar types of images are printed, variations in dot size create density differences that can degrade the printing quality to an undesirable degree.

Typical differences in LED output are illustrated by the graph in FIG. 49. Dot position is indicated on the horizontal axis, and optical power on the vertical axis. The light-emitting diodes are disposed in a plurality of semiconductor chips, more specifically LED array chips CHP1 to CHP26, which are driven by a like plurality of integrated driver circuits (driver ICs) DRV1 to DRV26, as illustrated at the top of FIG. 49. Ninety-six light-emitting diodes are integrated onto each LED array chip. The LED array chips and driver ICs are interconnected by wire bonding. The driver ICs are cascaded to form a single shift register for receiving the driving data signal HD-DATA.

The horizontal dotted lines indicate the ranges of variability of the optical power output by the light-emitting diodes in each individual LED array. The horizontal dot-dash lines indicate the range of variability of the average optical output power of each LED array. Thus the dotted lines indicate ranges of dot-to-dot variation within each array, while the dot-dash lines indicate the range of chip-to-chip variation.

As illustrated in FIG. 49, the range of chip-to-chip variation is much greater than the range of dot-to-dot variation within any one chip. One conventional practice has therefore been to grade the driver IC chips and LED array chips according to their average output power, and assemble each LED head from chips of the same grade. Alternatively, the average current that must be supplied to each LED array chip to obtain a nominal average optical output can be calculated from measurements of the LED array chips, the average current supplied by each driver IC can be measured, the driver IC chips can be graded according to their average current output, and each LED array chip can be paired with a driver IC that supplies substantially the right amount of average current. In this way it is possible to reduce chip-to-chip differences, but the dot-to-dot differences within each chip remain uncorrected.

FIG. 50 illustrates another conventional LED head, disclosed in Japanese Patent Application Kokai Publication No. 160659/1989. The first dot section of this LED head comprises an inverter 30-1, four transistors 31-1, 32-1, 33-1, and 34-1 coupled in parallel, three NAND gates 35-1, 36-1, 37-1, a light-emitting diode 38-1, three D-type flip-flop circuits 39-1, 40-1, and 41-1 for storing LED compensation data, and an AND gate 42-1. Other dot sections are similar; the letter N denotes the total number of dots printed by the head.

A strobe generator 43 outputs a strobe signal to the AND gates 42-1 to 42-N. A shift register 44 stores the driving data. The input terminals are an LED power supply terminal 45, a compensation data input terminal 46, a clock input terminal 47, a driving data input terminal 48, and another clock input terminal 49. Flip-flops 39-1, 40-1, 41-1, . . . , 39-N, 40-N, 41-N are interconnected to form a shift register receiving data from compensation data input terminal 46 and clock signals from clock input terminal 47.

When LED 38-1 is driven, for example, transistor 31-1 is turned on responsive to the driving data output from terminal Q1 of shift register 44, while transistors 32-1, 33-1, and 34-1 are turned on responsive to both the driving data from terminal Q1 and the compensation data stored in flip-flop circuits 39-1, 40-1, and 41-1. Transistor 31-1 supplies the main driving current; transistors 32-1, 33-1, and 34-1 supply additional compensating current.

FIG. 51 shows an example of the circuit configuration of one of the flip-flop circuits 39-1, 40-1, 41-1, . . . , 39-N, 40-N, 41-N that store LED compensation data. The typical flip-flop circuit 51 shown in FIG. 51 has data (D) and clock (C) input terminals and a data output terminal (Q). The flip-flop circuit comprises four transmission gates 52, 53, 54, and 55, and six inverters 56, 57, 58, 59, 60, and 61. Each transmission gate comprises a p-channel MOS transistor and an n-channel MOS transistor coupled in parallel. Each inverter comprises a p-channel MOS transistor and an n-channel MOS transistor coupled in series. The total number of transistors in the flip-flop circuit 51 is thus twenty.

The LED head illustrated in FIGS. 50 and 51 can minimize both chip-to-chip differences and dot-to-dot (LED-to-LED) differences, but the flip-flop circuits 39-1, 40-1, 41-1, . . . , 39-N, 40-N, 41-N that store LED compensation data greatly increase the size and complexity of the driver ICs. These flip-flop circuits require sixty (3×20) extra transistors per LED, not to mention the two extra input terminals 46 and 47. Extra circuit elements are also required to drive each LED through four transistors instead of just one.

Moreover, the three extra flip-flop circuits store only three bits of compensation diode, allowing only eight levels of adjustment of the optical output. If the step size is 2%, the eight levels are, for example, −6%, −4%, −2%, −0%, +2%, +4%, +6%, and +8%, so adjustment is possible only within the limited range from −6% to +8%. This range may provide adequate compensation for dot-to-dot variations within the same LED array chip, but does not in general provide adequate compensation for chip-to-chip differences.

SUMMARY OF THE INVENTION

It is accordingly an object of the present invention to reduce the circuit size of a driving apparatus for driving an LED array used in an electrophotographic printer, or more generally for driving any group of driven elements.

Another object of the invention is to transfer compensation data with increased efficiency.

A further object is to store compensation data with increased efficiency.

A still further object is to compensate efficiently for chip-to-chip differences, when the driven elements are disposed on different semiconductor chips.

A yet further object is to simplify the circuit configuration of a driving apparatus the employs compensation data to compensate for variations among driven elements.

The invented driving apparatus has a plurality of driving circuits for selectively and cyclically driving a plurality of driven elements to form dots, by supplying driving energy to the driven elements. Driving energy is supplied responsive to driving data indicating whether the driven elements are to be driven, and to compensation data for adjusting the driving energy.

The driving apparatus also has a plurality of compensation memory circuits coupled to the driving circuits, for storing the compensation data, and a data transfer means coupled to both the driving circuits and the compensation memory circuits. The data transfer means first transfers the compensation data to all of the compensation memory circuits, then transfers driving data to the driving circuits in successive driving cycles.

Each of the compensation memory circuits preferably stores multiple bits of compensation data. The compensation data are then transferred in multiple cycles, each compensation memory circuit receiving one bit of compensation data per cycle.

If the driven elements are disposed on different semiconductor chips, some of the compensation memory circuits preferably store chip compensation data compensating for chip-to-chip differences, while other compensation memory circuits store dot compensation data compensating for differences between different driven elements on the same semiconductor chip.

The compensation memory circuits preferably comprise memory cells, each memory cell having a memory element for storing one bit of compensation data, a switching means for selectively coupling the memory element to the data transfer means, and a signal line coupling the memory element to one of the driving circuits.

BRIEF DESCRIPTION OF THE DRAWINGS

In the accompanying drawings:

FIG. 10 shows an example of the bit assignments of mode command data;

FIG. 37 is an address map illustrating the storage of compensation data in the non-volatile memory in the third embodiment;

DETAILED DESCRIPTION OF THE INVENTION

Embodiments of the invention will be described with reference to the attached illustrative drawings. To describe control signals, the suffix -P will sometimes be added to signal names, as in LOAD-P for example, to indicate positive logic (active high), and the suffix -N will sometimes be added, as in LOAD-N for example, to indicate negative logic (active low). Thus LOAD-P and LOAD-N are complementary signals, one being the inverse of the other.

First embodiment

Figure 1:
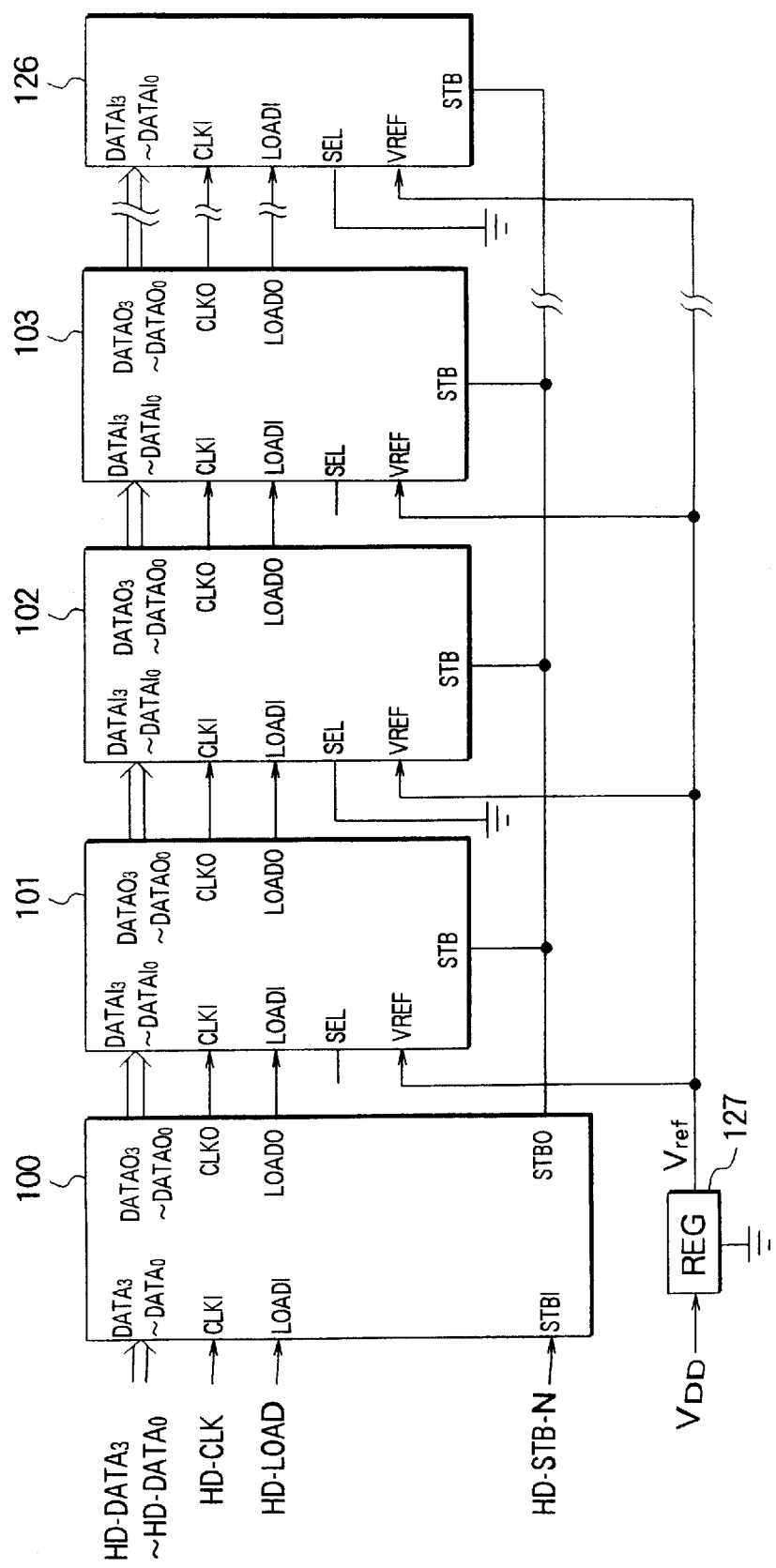
FIG. 1 is a block diagram illustrating the control IC and driver ICs in a driving apparatus according to a first embodiment of the invention.

Referring to FIG. 1, the first embodiment comprises a control IC 100 and twenty-six driver ICs 101, 102, 103, . . . , 126. The control IC 100 is an integrated circuit comprising control circuitry and a non-volatile memory storing compensation data that compensate for differences in the optical output of a plurality of LEDs. The driver ICs 101 to 126 are separate integrated circuits that drive corresponding LED-array chips (not visible), each chip having an array of ninety-six LEDs for printing ninety-six dots. The ICs in FIG. 1 are mounted on a printed circuit board in an LED printing head that prints lines of two thousand four hundred ninety-six dots.

96 dots/chip×26 chips=2496 dots

Also mounted in the LED printing head is a step-down regulator 127 that receives a supply voltage $V_{DD}$ and generates a reference voltage $V_{ref}$ for use in establishing the driving current supplied to the LEDs.

The SEL input terminal of each driver IC is connected to a pull-up resistor inside the IC. The SEL input terminal of the first driver IC 101 is left unconnected, and the SEL input terminal of the second driver IC 102 is coupled to the ground power-supply potential. In like manner, the SEL input terminals of all the odd-numbered driver ICs are left unconnected, and the SEL input terminals of all the even-numbered driver ICs are coupled to ground.

From the printer controller (not visible), the control IC 100 receives data signals HD-DATA$_3$ to HD-DATA$_0$, a clock signal HD-CLK, a load signal HD-LOAD, and a strobe signal HD-STB-N. The control IC 100 receives these signals at terminals denoted DATA$_3$ to DATA$_0$, CLKI, LOADI, and STBI, respectively. DATA$_3$ to DATA$_0$ are input/output terminals; CLKI, LOADI, and STBI are input terminals. The control IC 100 supplies output signals DATAO$_3$ to DATAO$_0$, CLKO, and LOADO to input terminals DATAI$_3$ to DATAI$_0$, CLKI, and LOADI of the first driver IC 101, and supplies an output strobe signal STBO to input terminals STBI of all of the driver ICs 101 to 126.

The signals received at input terminals CLKI and LOADI of driver IC 101 are coupled through internal inverting circuits to output terminals CLKO and LOADO of driver IC 101, and supplied to the CLKI and LOADI input terminals of the next driver IC 102. These signals continue to be passed from one driver IC to the next, being inverted in each driver IC.

Dot driving data are input on signal lines HD-DATA$_3$ to HD-DATA$_0$. Four bits are input at once, in synchronization with the clock signal HD-CLK, representing four adjacent dots. Input of four bits at once enables the clock rate to be reduced by a factor of four, thereby reducing the generation of undesired electromagnetic interference.

The data that compensate for variations in the optical output of the LEDs comprise four bits per dot, enabling the output of each LED to be adjusted in sixteen steps. These compensation data are also received from the printer controller on signal lines HD-DATA$_3$ to HD-DATA$_0$.

The data input and output terminals DATAI$_3$ to DATAI$_0$ and DATAO$_3$ to DATAO$_0$ of the driver ICs 101 to 126 are similarly used for the input and output of both driving data and compensation data. The data output at output terminals DATAO$_3$ to DATAO$_0$ of the control IC 100 are input by the first driver IC 101 and shifted through the other driver ICs to the last driver IC 126, as described below.

Using the same input and output terminals for both driving and compensation data has the following advantages.

First, fewer bonding wires are required for electrical interconnection of the driver ICs to wiring traces on the printed circuit board on which the ICs are mounted. The assembly time of the LED head is thereby reduced.

Second, fewer wiring traces are required on the printed circuit board, so the printed circuit board and consequently the LED head can be reduced in size.

Third, there are fewer wiring traces to be inspected. A 100% inspection of four wiring traces suffices to ensure that both driving data and compensation data will be passed correctly from one driver IC to the next.

Figure 2:
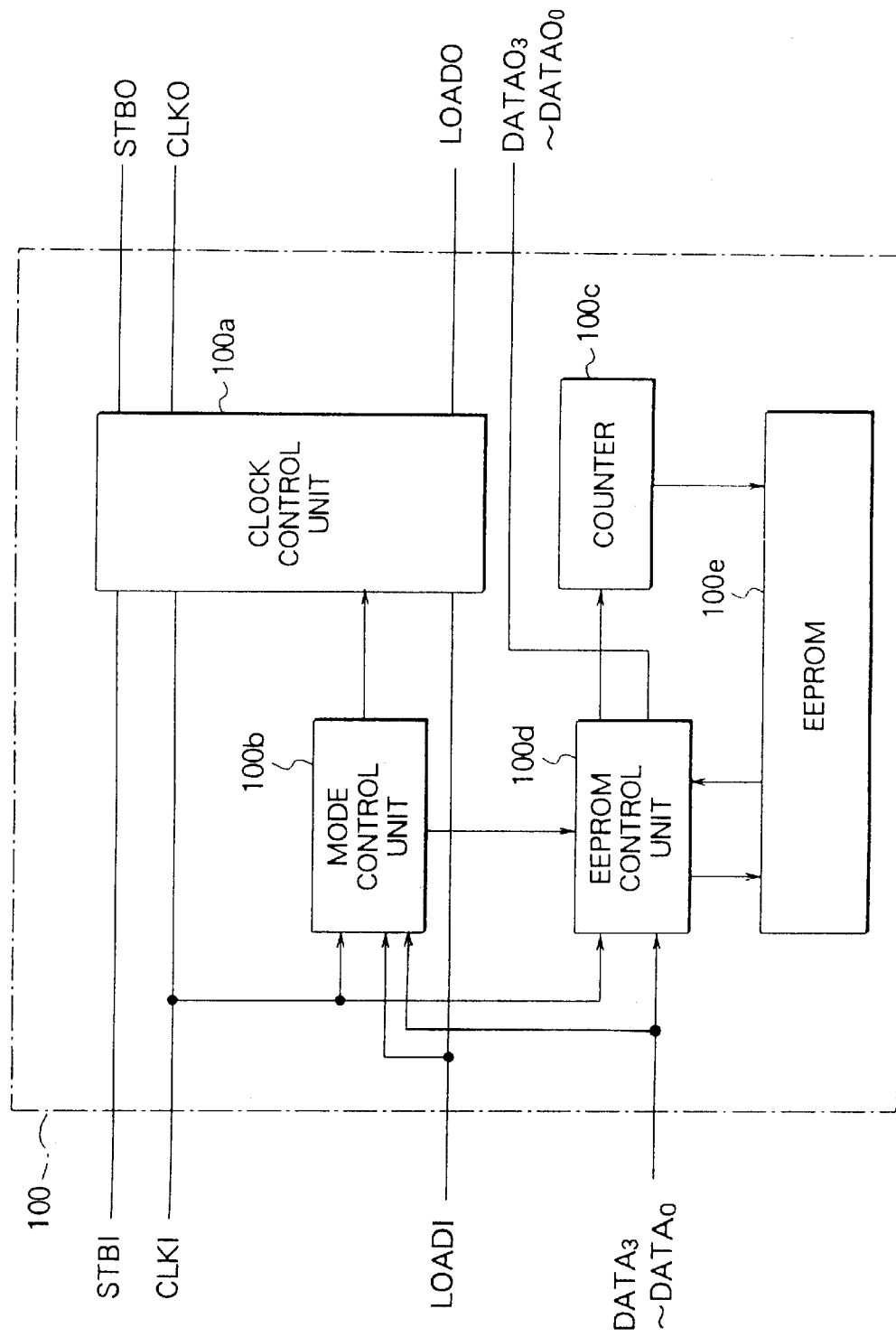
FIG. 2 is a block diagram illustrating the internal structure of the control IC in FIG. 1.

FIG. 2 is a block diagram of the control IC 100, showing the non-volatile memory and related control circuitry. The non-volatile memory is an electrically-erasable programmable read-only memory or EEPROM 100e. A clock control unit 100a supplies clock signals to the other circuits in FIG. 2, via signal lines not explicitly shown in the drawing. A mode control unit 100b decodes and latches command signals sent to the LED head, and issues commands controlling circuit operations. A counter 100c generates read and write addresses on instruction from an EEPROM control unit 100d, which reads and writes data in the EEPROM 100e.

The load signal HD-LOAD and strobe signal HD-STB-N are passed directly from input terminals LOADI and STBI to output terminals LOADO and STBO of the control IC 100, without being inverted. These two signals could be supplied directly to the first driver IC 101 instead of being coupled through the control IC 100.

Figure 3:
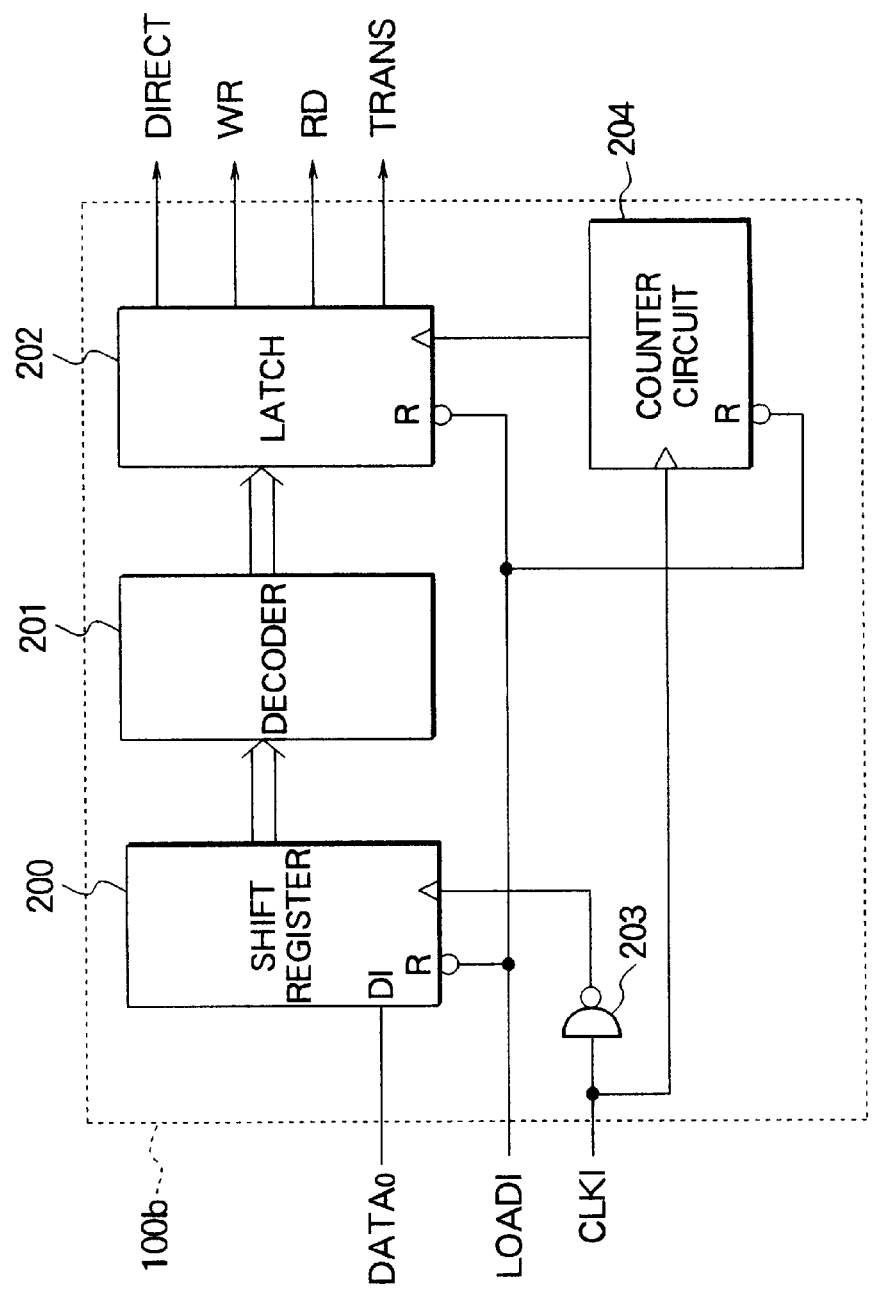
FIG. 3 is a block diagram showing an example of the internal structure of the mode control unit in FIG. 2.

FIG. 3 is a block diagram showing the internal structure of the mode control unit 100b, which comprises a shift register 200, a decoder 201, a latch circuit 202, an inverter 203, and a counter circuit 204.

The shift register 200 has a data input terminal DI coupled to the DATA$_0$ input/output terminal of the control IC 100. The shift register 200, latch circuit 202, and counter circuit 204 have reset terminals R that are coupled to the load signal input terminal LOADI. The clock signal HD-CLK input at the CLKI terminal is supplied to the clock input terminal of the counter circuit 204, and to the inverter 203. The inverter 203 supplies an inverted clock signal to the clock input terminal of the shift register 200. The counter circuit 204 outputs a command latch signal to the latch circuit 202.

Data entering the shift register 200 at data input terminal DI are shifted through the shift register 200 in synchronization with the clock signal (HD-CLK) received at input terminal CLKI. The shift register 200 converts these data from serial to parallel form, and sends the parallel data to the decoder 201 to be decoded. The decoded signals output by the decoder 201 are latched by the latch circuit 202 in response to the command latch signal, and output as a direct mode signal, a write (WR) mode signal, a read (RD) mode signal, and a transfer (TRANS) mode signal. These four mode signals are active high, and only one of them can be active at a time. When the LOADI input is inactive (low), the latch circuit 202 is reset and the direct, write, read, and transfer mode signals are all turned off.

Figure 4:
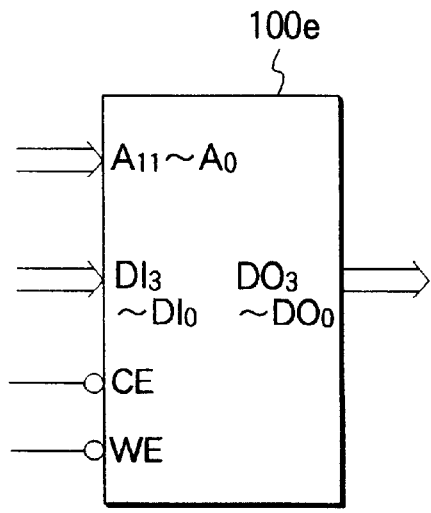
FIG. 4 shows an example of the input and output terminals of the non-volatile memory in FIG. 2.

FIG. 4 shows the input and output terminals of the EEPROM 100e. The EEPROM 100e used in this embodiment must be able to store at least two thousand four hundred ninety-six four-bit words of data; an EEPROM with a capacity of four thousand ninety-six words, for example, may be employed. Four-bit data are input at data input terminals $DI_3$ to $DI_0$, and output at data output terminals $DO_3$ to $DO_0$. Address signals generated by the counter 100c are input at address terminals A11 to A0. A chip enable signal is input at the CE terminal. A write enable signal is input at the WE terminal.

Figure 5:
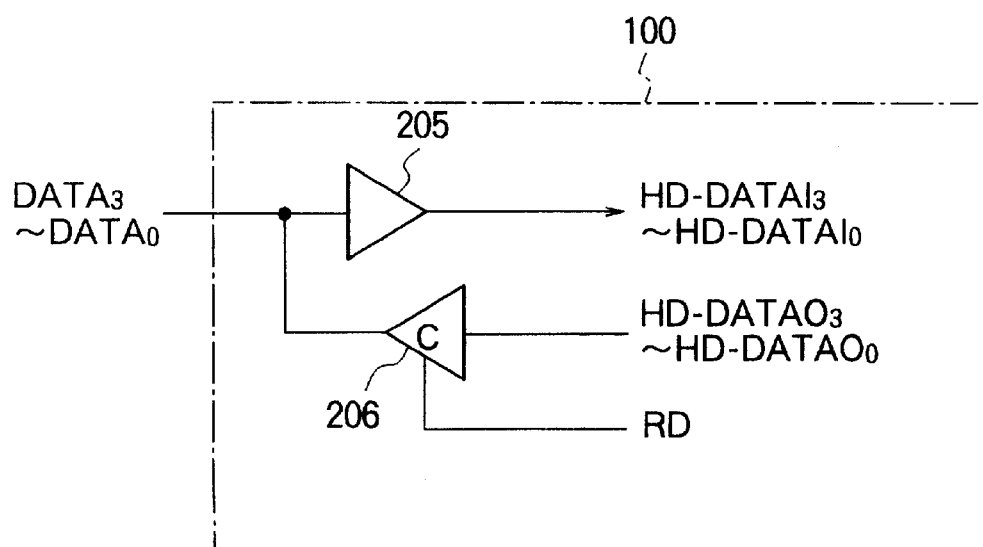
FIG. 5 illustrates the circuits coupled to the data input/output terminals of the control IC in FIG. 2.

FIG. 5 illustrates the circuits that are coupled directly to the data input/output terminals $DATA_3$ to $DATA_0$ of the control IC 100. Each data input/output terminal has a separate pair of buffer amplifiers 205 and 206. Only one pair of buffer amplifiers is shown in the drawing. Amplifier 206 is a three-state output buffer controlled by the read (RD) mode signal. When the read mode signal is active (high), data signals $HD-DATAO_3$ to $HD-DATAO_0$ created in the control IC 100 are output at these data input/output terminals $DATA_3$ to $DATA_0$. When the read mode signal is inactive (low), buffer amplifier 206 is in the high-impedance output state, and the external data signals on the signal lines $HD-DATA_3$ to $HD-DATA_0$ coupled to input/output terminals $DATA_3$ to $DATA_0$ are supplied to other circuits in the control IC 100, as data signals which will be denoted $HD-DATAI_3$ to $HD-DATAI_0$.

Figure 6:
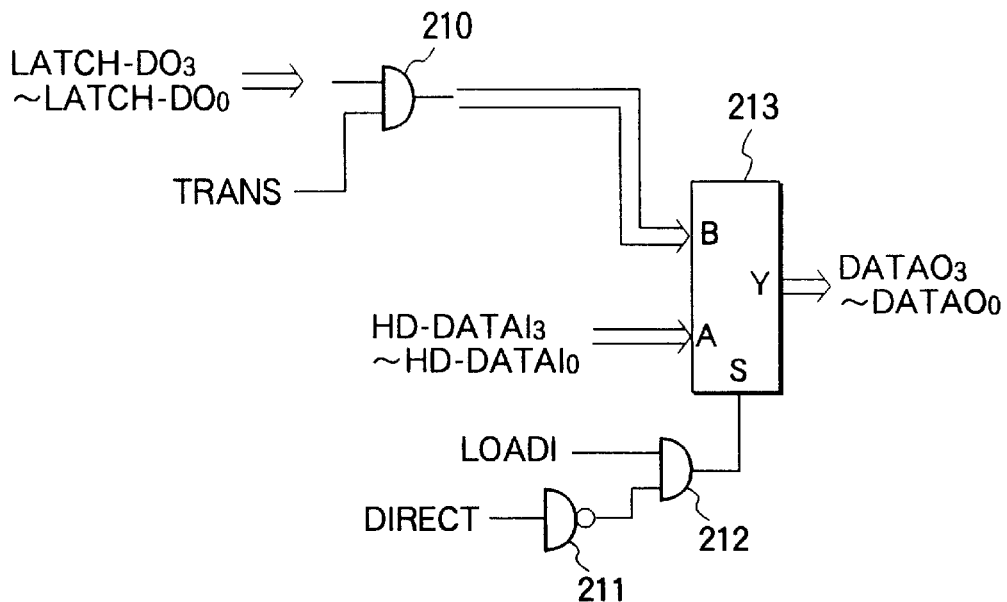
FIG. 6 illustrates the circuits coupled to the data output terminals of the control IC in FIG. 2.

FIG. 6 illustrates the circuits coupled to the data output terminals $DATAO_3$ to $DATAO_0$ of the control IC 100. Each data output terminal has a separate two-input AND gate 210. Reference numeral 210 thus denotes four AND gates, of which only one is visible. The other circuits in FIG. 6, namely the AND gate 212, inverter 211, and data selector 213, are single circuits that are shared by the four data output terminals.

All four AND gates 210 have the transfer mode signal (TRANS) as one of their two inputs. The other inputs to these AND gates 210 are the latched data outputs from the EEPROM 100e, which are held in latches not explicitly shown in the drawings, and are denoted $LATCH-DO_3$ to $LATCH-DO_0$. The four outputs of the AND gates 210 are supplied to four data input terminals of the data selector 213, collectively denoted by the letter B in FIG. 6.

The data selector 213 has four more data input terminals, collectively denoted by the letter A, that receive the data signals $HD-DATAI_3$ to $HD-DATAI_0$ shown in FIG. 5. The data selector 213 selects the A data inputs when the input at the select (S) input terminal is low, selects the B data inputs when the S input is high, and outputs the selected data from the $DATAO_3$ to $DATAO_0$ output terminals to the first driver IC 101.

The S input is created by AND gate 212 from the LOADI input and the direct mode signal, the latter being inverted by inverter 211. Thus when the LOADI input is inactive (low), or when the direct mode signal is active (high), S is low and $HD-DATAI_3$ to $HD-DATAI_0$ are output at $DATAO_3$ to $DATAO_0$. When the transfer mode signal and LOADI signals are both active (high), the latched EEPROM output data $LATCH-DO_3$ to $LATCH-DO_0$ are output at $DATAO_3$ to $DATAO_0$. (When the transfer mode signal is high, the direct mode signal is automatically low.)

Figure 7:
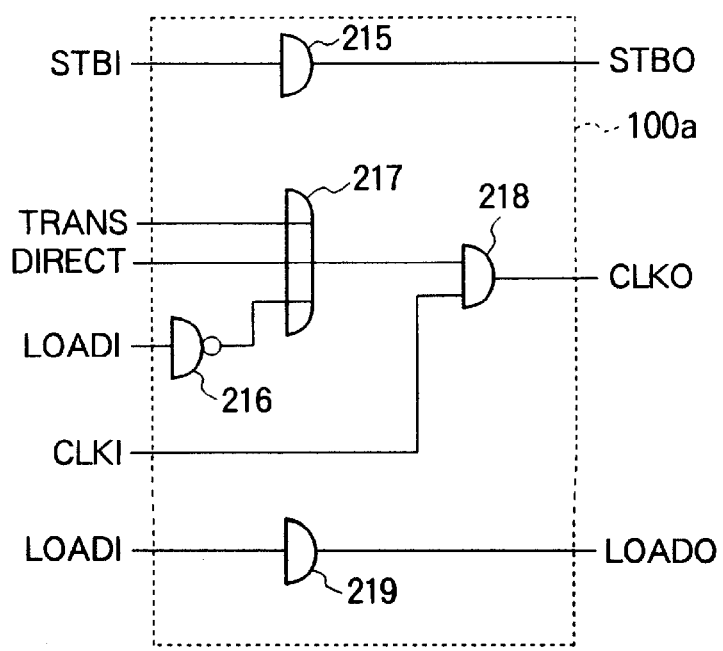
FIG. 7 shows an example of the internal structure of the clock control unit in FIG. 2.

FIG. 7 illustrates the clock control unit 100a, which comprises buffer circuits 215 and 219, an inverter 216, a three-input OR gate 217, and an AND gate 218. Buffers 215 and 219 couple the STBI and LOADI input terminals to the STBO and LOADO output terminals. The other circuit elements are coupled so as to transmit the HD-CLK signal from the CLKI input terminal to the CLKO output terminals when the transfer or direct mode signal is active (high), or when LOADI is low.

Figure 8:
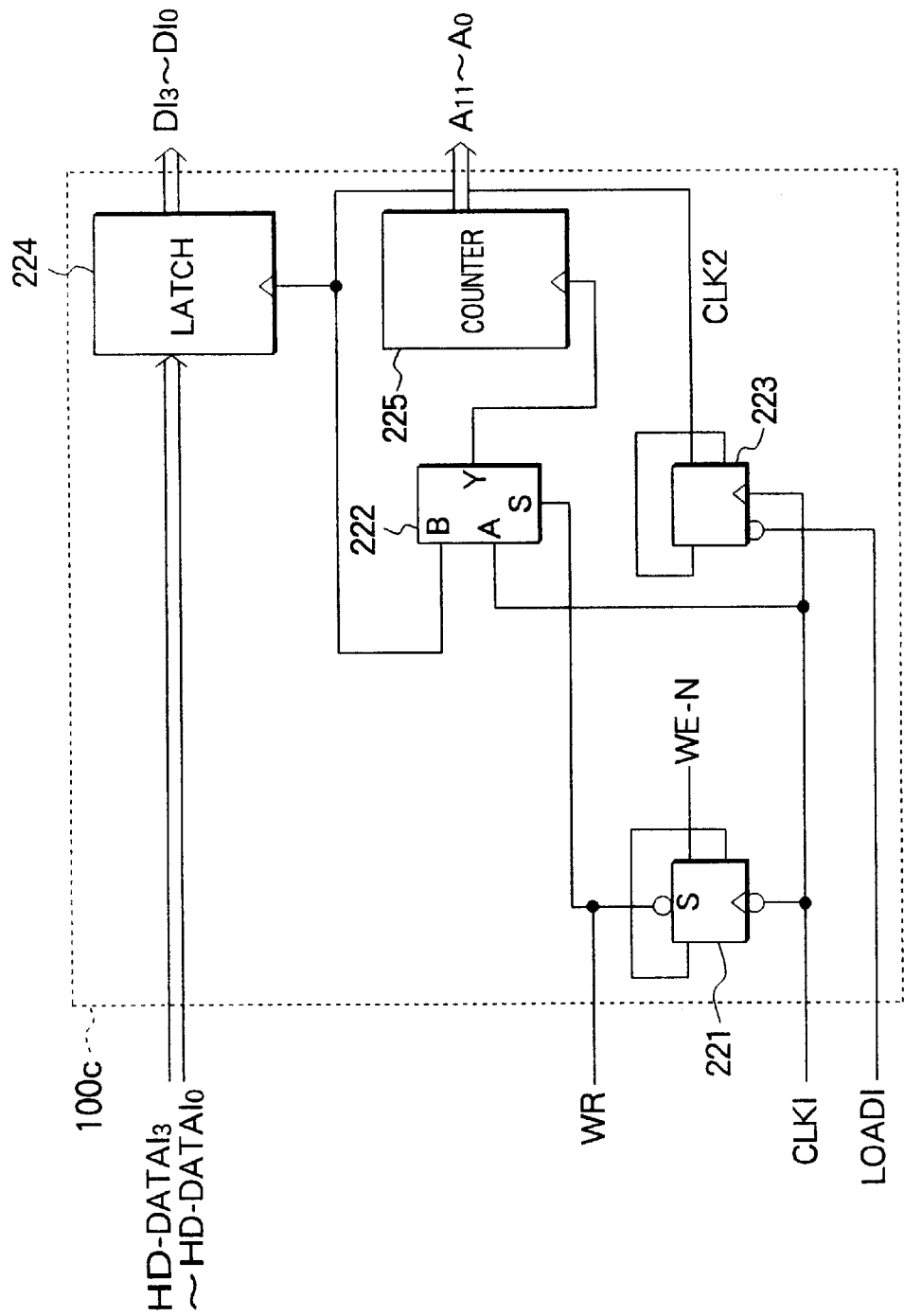
FIG. 8 shows an example of the internal structure of the counter in FIG. 2.

FIG. 8 illustrates the internal structure of the counter 100c that generates address signals for the EEPROM 100e. This counter comprises a flip-flop circuit 221 having a set (S) input terminal, a clock selector 222, another flip-flop circuit 223, a latch circuit 224, and a counter circuit 225.

Flip-flop circuits 221 and 223 both operate as toggle flip-flops, dividing the frequency of the HD-CLK signal input at CLKI by two. The outputs of these flip-flop circuits are a write enable signal (WE-N) and a second clock signal CLK2. The second clock signal CLK2 is input to the latch circuit 224, which latches data signals $HD-DATAI_3$ to $HD-DATAI_0$ and supplies these signals to the data input terminals $DI_3$ to $DI_0$ of the EEPROM 100e.

When the write (WR) mode signal is active (high), clock selector 222 selects CLK2 for input to the counter circuit 225, which generates successive addresses at the address input terminals $A_{11}$ to $A_0$ of the EEPROM 100e. The write enable signal WE-N cycles between the active and inactive states in synchronization with the CLKI input. These operations cause the input data $HD-DATAI_3$ to $HD-DATAI_0$ to be written into the EEPROM 100e in synchronization with CLK2.

When the write mode signal is inactive, the write enable signal WE-N is held in the inactive state, so the data inputs to the EEPROM 100e are ignored. In addition, clock selector 222 selects the HD-CLK signal input at the CLKI terminal, so the counter circuit 225 generates one address per HD-CLK cycle. These addresses are used for reading data from the EEPROM 100e in synchronization with HD-CLK.

Figure 9:
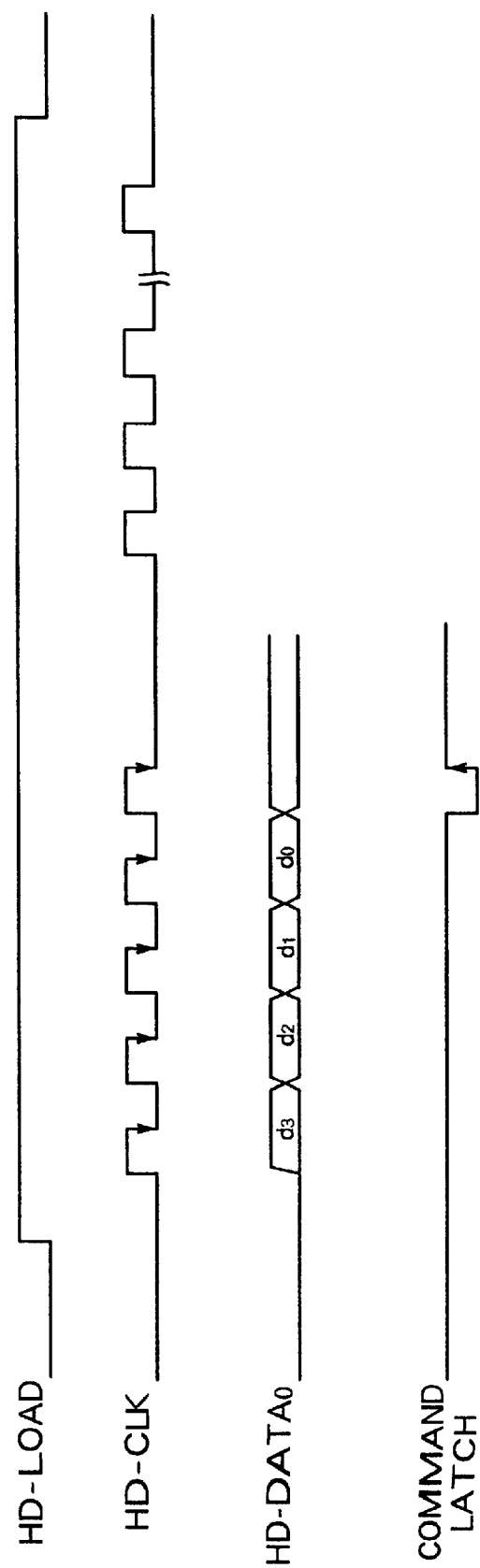
FIG. 9 is a timing diagram illustrating the transfer of mode command data to the LED head.

FIG. 9 is a timing diagram illustrating the sending of a mode designation command to the LED head on the $HD-DATA_0$ signal line. Before the command is sent, the HD-LOAD signal is driven high to release the mode-setting circuit from the reset state. Next, serial data comprising bits $d_3$, $d_2$, $d_1$, and $d_0$ are input on the $HD-DATA_0$ signal line, in synchronization with the HD-CLK signal.

At the fifth HD-CLK cycle, the counter circuit 204 in FIG. 3 activates the command latch signal, causing the latch circuit 202 to latch the mode signals decoded from data $d_3$, $d_2$, $d_1$, and $d_0$ by the decoder 201, thereby setting the mode. This mode setting remains latched until the HD-LOAD signal goes low again. Next, further HD-CLK cycles are generated, causing the logic circuits in the LED head to operate according to the selected mode.

FIG. 10 lists the command data assignments to bits $d_3$, $d_2$, $d_1$, and $d_0$. The four operating modes in this embodiment can be described as follows.

In the write mode, compensation data derived from measurements of the optical output of the LEDs are written into the EEPROM 100e. This mode is used for writing compensation data into the EEPROM 100c when the LED head is manufactured.

In the transfer mode, the compensation data stored in the EEPROM 100e are read out and transferred to the driver ICs. This mode is used when, for example, the printer is powered up during normal use.

In the direct mode, compensation data derived from measurements of the optical output of the LEDs are transferred directly to the driver ICs, without being stored in the EEPROM 100e. Direct transfer enables the manufacturer to test the effect of compensation data before writing the compensation data into the EEPROM 100e. Direct transfer is quicker than first writing the data in the EEPROM, then transferring the data in the transfer mode.

In the read mode, the data stored in the EEPROM 100e are read out and provided from input/output terminals $DATA_3$ to $DATA_0$ to an external device, through a connector attached to the LED head. Read mode is useful in testing the LED head and confirming that the correct compensation data have been stored.

Figure 11:
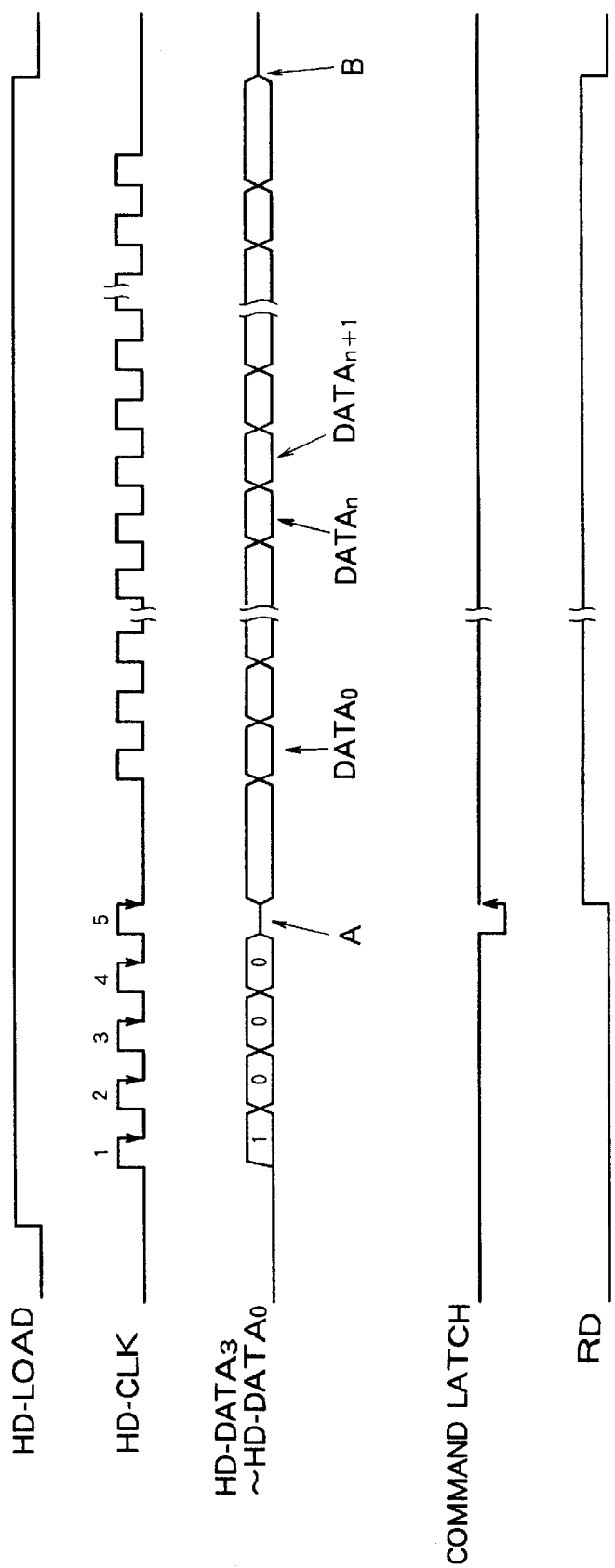
FIG. 11 is a timing diagram illustrating the reading of data from the non-volatile memory in read mode.

FIG. 11 is a timing diagram of the operation of sending the read mode command, then reading data from the EEPROM 100e. After the read mode command '1000' has been sent, the printer controller places $HD\text{-}DATA_3$ to $HD\text{-}DATA_0$ in the high-impedance state, during the interval marked A in the drawing, and outputs a fifth HD-CLK pulse. At the trailing edge of this fifth HD-CLK pulse, the read mode is set and input/output terminals $DATA_3$ to $DATA_0$ are placed in the output state by activating the buffer amplifiers 206 shown in FIG. 5. These terminals remain in the output state until the HD-LOAD signal goes low to terminate the read mode, at the point marked B in the drawing. During the read mode, the EEPROM address changes at each HD-CLK cycle, and the data stored at these addresses are latched and output on the $HD\text{-}DATA_3$ to $HD\text{-}DATA_0$ signal lines as $DATA_0, \ldots, DATA_n, DATA_{n+1}, \ldots$.

Figure 12:
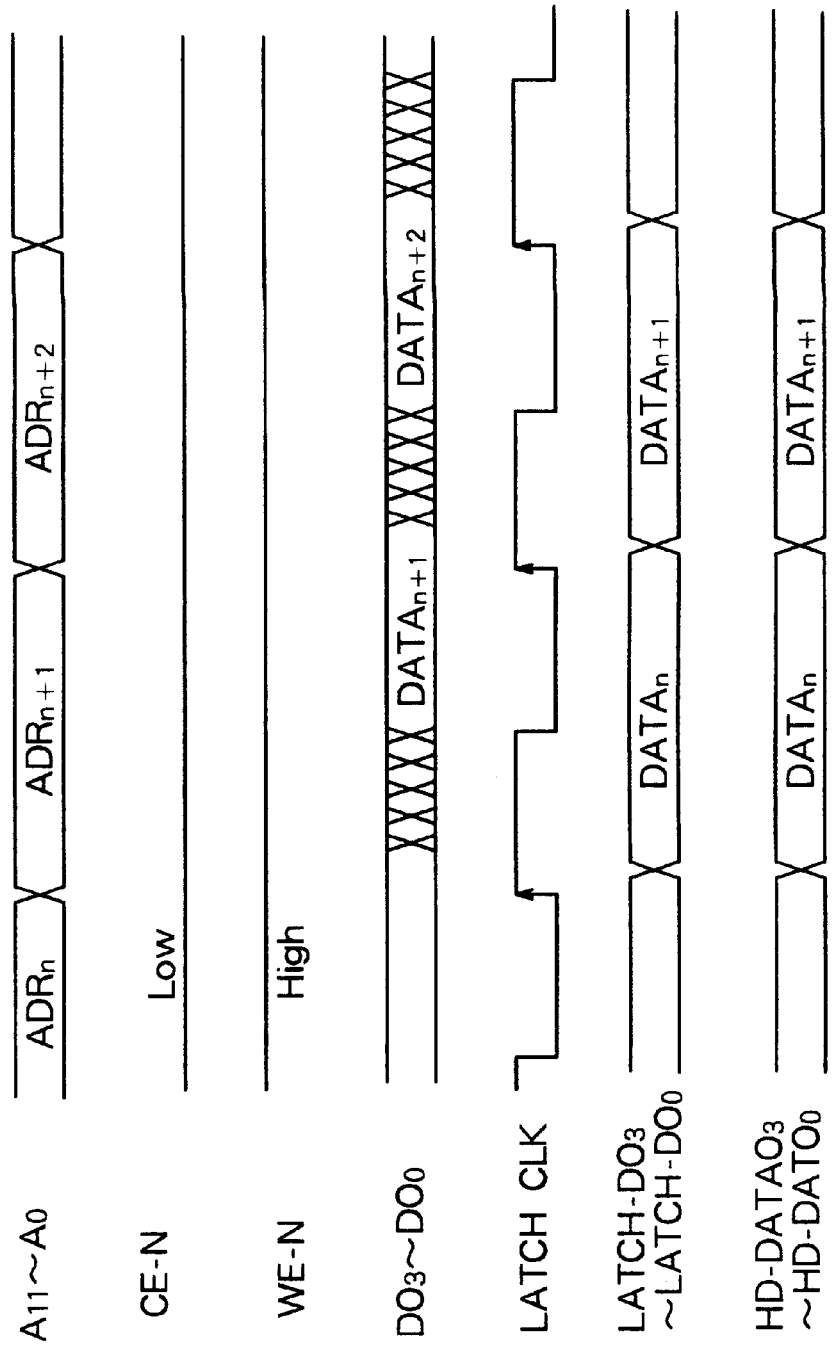
FIG. 12 is a more detailed timing diagram illustrating the reading of data from the non-volatile memory.

FIG. 12 is a more detailed timing diagram showing how data are read out of the EEPROM. Successive addresses $ADR_n$, $ADR_{n+1}$, $ADR_{n+2}$ are sent to the address terminals $A_{11}$ to $A_0$. The data ($DATA_{n+1}$) stored at address $ADR_{n+1}$ are output from terminals $DO_3$ to $DO_0$ of the EEPROM, and latched by a latch circuit in synchronization with a latch clock signal (LATCH CLK) output from the clock control unit 100a (this latch circuit and latch clock signal were not explicitly shown in the preceding drawings). The latched data become the signals $LATCH\text{-}DO_3$ to $LATCH\text{-}DO_0$ supplied to the circuit in FIG. 6. In read mode, the latched data also become the signals $HD\text{-}DATAO_3$ to $HD\text{-}DATAO_0$ which are output from data input/output terminals $DATA_3$ to $DATA_0$ as shown in FIG. 5.

Figure 13:
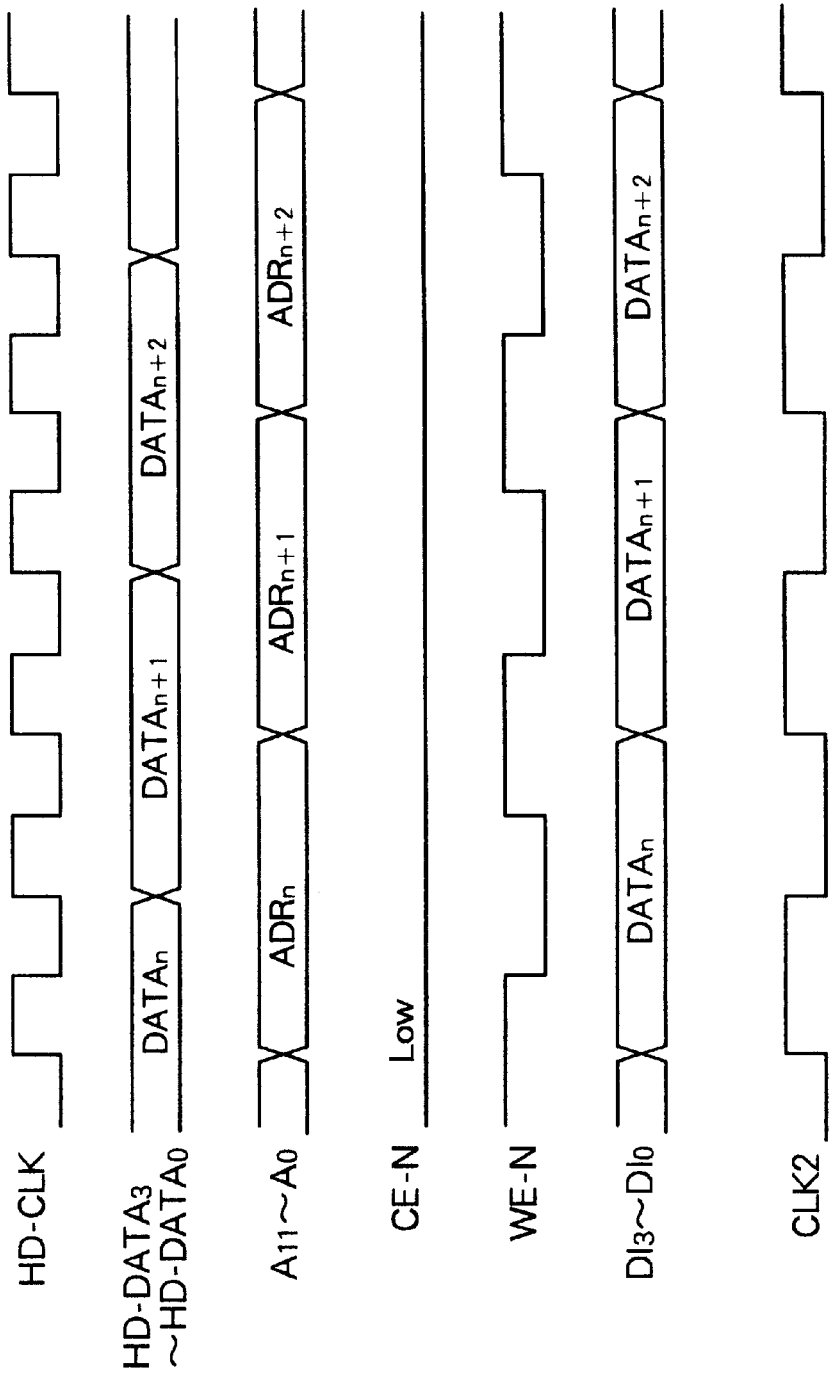
FIG. 13 is a timing diagram illustrating the writing of data to the non-volatile memory.

FIG. 13 is a timing diagram illustrating the operation of writing data into the EEPROM. After the write mode has been selected by serial command data sent to the LED head, further HD-CLK cycles cause the data on signal lines $HD\text{-}DATA_3$ to $HD\text{-}DATA_0$ to be written into the EEPROM in synchronization with the CLK2 signal, which has half the frequency of the HD-CLK signal. CLK2 is selected by the clock selector 222 in FIG. 8. Successive addresses $ADR_n$, $ADR_{n+1}$, $ADR_{n+2}$ are generated by counting CLK2, and furnished to the address terminals $A_{11}$ to $A_0$. The externally supplied data $HD\text{-}DATA_3$ to $HD\text{-}DATA_0$ become $HD\text{-}DATAI_3$ to $HD\text{-}DATAI_0$, which are latched in synchronization with CLK2, producing the data series $DATA_n$, $DATA_{n+1}$, $DATA_{n+2}$ in FIG. 13. These data are supplied to the input terminals $DI_3$ to $DI_0$ of the EEPROM, and latched inside the EEPROM at low-to-high transitions of the WE-N signal.

After thirty-two WE-N cycles, the latched data are written into the EEPROM memory cells. Due to the properties of the memory cells, each data write takes about ten milliseconds (10 ms). The printer controller halts HD-CLK input while the write is in progress. After 10 ms, data input and HD-CLK input resume for thirty-two more WE-N cycles, then HD-CLK is halted again while the next thirty-two four-bit data words are written in the EEPROM memory cells. The write operation continues to repeat in this way.

Figure 14:
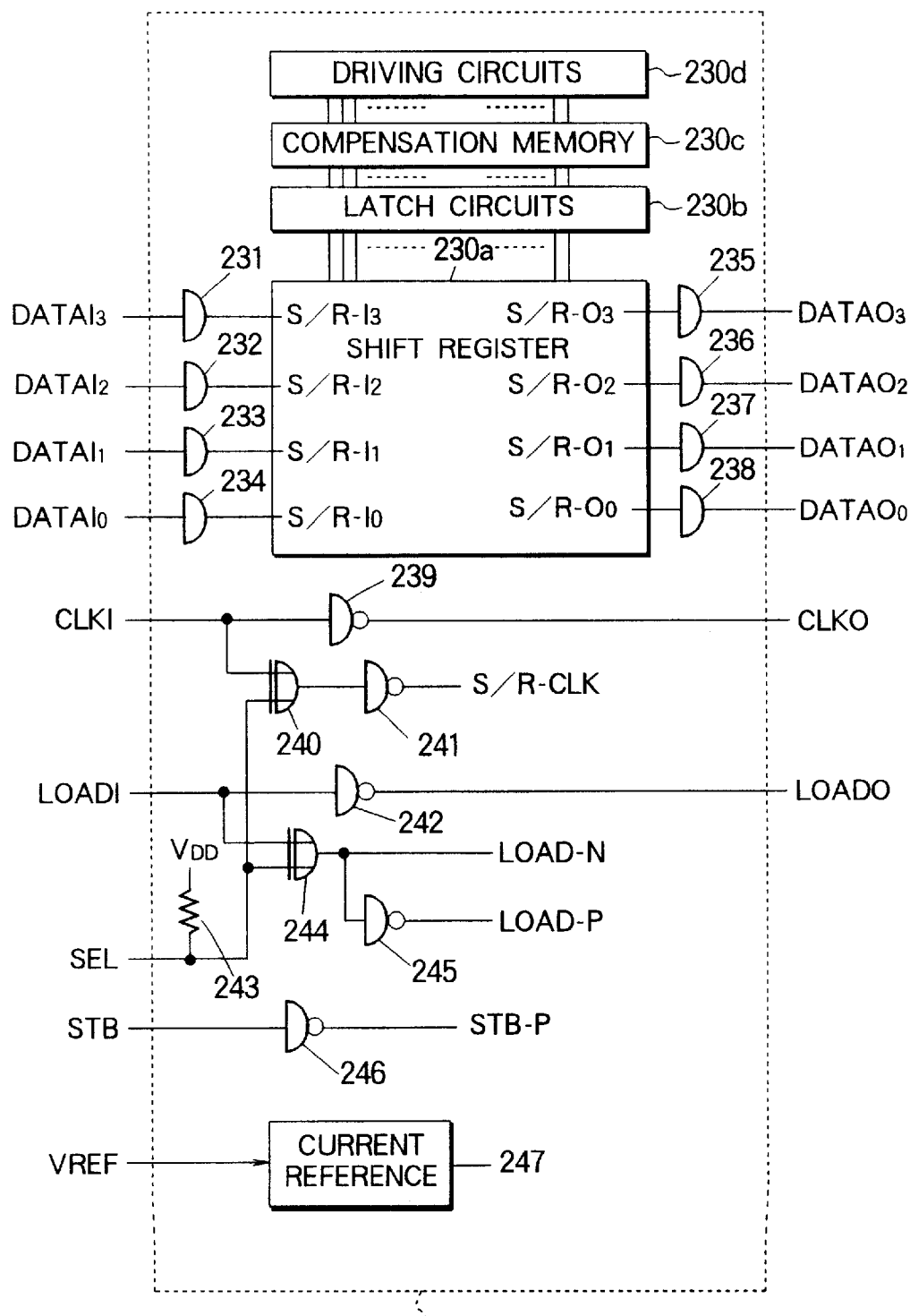
FIG. 14 is a block diagram illustrating the internal structure of the driver ICs in the first embodiment.

FIG. 14 is a block diagram of the first driver IC 101 in FIG. 1. All of the circuits enclosed in the dotted line are integrated into this driver IC. Driver ICs 102 to 126 have similar configurations. The main elements are a shift register 230a for transferring driving data and compensation data, a group of latch circuits 230b for temporarily latching the transferred driving data and compensation data, a group of compensation memory circuits 230c for storing the latched compensation data, and a group of driving circuits 230d for feeding current to LEDs designated by the driving data, in amounts adjusted according to the compensation data.

Each driver IC also has input buffer circuits 231 to 234, output buffer circuits 235 to 238, inverters 239, 241, 242, 245, and 246, exclusive-OR gates 240 and 244, a pull-up resistor 243, and a current reference circuit 247. The input buffer circuits 231 to 234 couple input terminals $DATAI_3$ to $DATAI_0$ to input terminals $S/R\text{-}I_3$ to $S/R\text{-}I_0$ of the shift register 320a. The output buffer circuits 235 to 238 couple output terminals $DATAO_3$ to $DATAO_0$ to output terminals $S/R\text{-}O_3$ to $S/R\text{-}O_0$ of the shift register 320a. The current reference circuit 247 is coupled to a VREF input terminal, to which the regulator 127 in FIG. 1 supplies the reference voltage $V_{ref}$.

The clock signal input to driver IC 101 at the CLKI terminal is inverted by inverter 239 and output at the CLKO output terminal. The load signal input at the LOADI terminal is inverted by inverter 242 and output at the LOADO output terminal. The signals output at output terminals CLKO and LOADO are supplied to the next driver IC 102. These signals continue to be passed from one driver IC to the next driver IC until they reach the last driver IC 126.

Since the above signals are inverted by the inverters 239 and 242 as the pass through each driver IC, even if there are differences between the rise time and fall time of the inverters, these differences will be averaged out as the signals pass through the driver ICs, and the pulse width of the signals input to the CLKI and LOADI terminals of driver IC 126 will be substantially the same as the pulse width of the signals input to the CLKI and LOADI terminals of driver IC 101.

If the SEL input terminal is left unconnected, as in driver IC 101, pull-up resistor 243 generates a high signal, so that the S/R-CLK and LOAD-P signals are logically equivalent to the signals input at the CLKI and LOADI terminals. If the SEL input terminal is grounded, as in driver IC 102, then S/R-CLK and LOAD-P are logically inverted with respect to the CLKI and LOADI inputs; consequently, S/R-CLK and LOAD-P in all of the driver ICs 101 to 126 are logically equivalent to the CLKI and LOADI inputs to driver IC 101.

Figure 15:
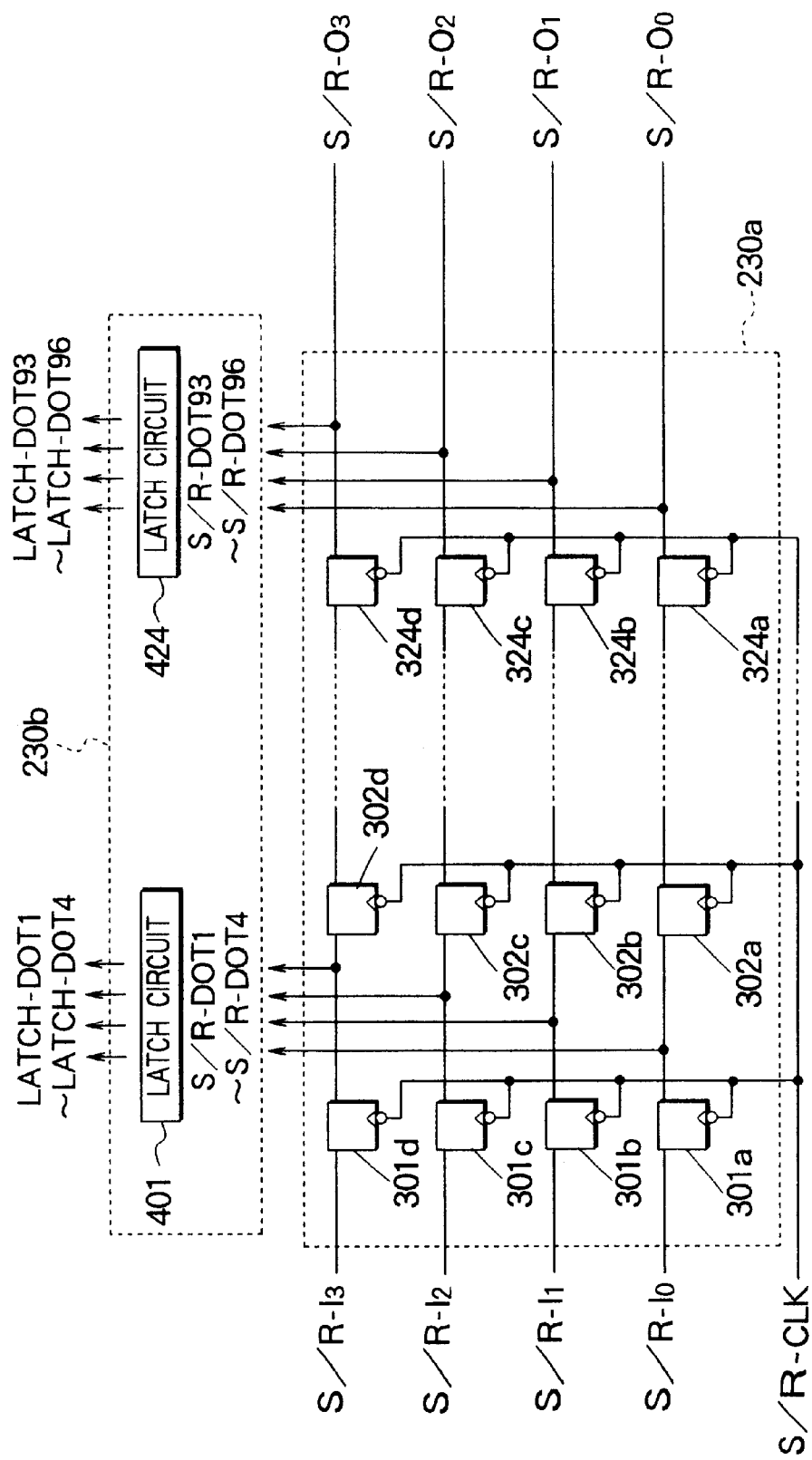
FIG. 15 is a more detailed circuit diagram illustrating the structure of the shift register in FIG. 14, and showing connections to related circuits.
Figure 16:
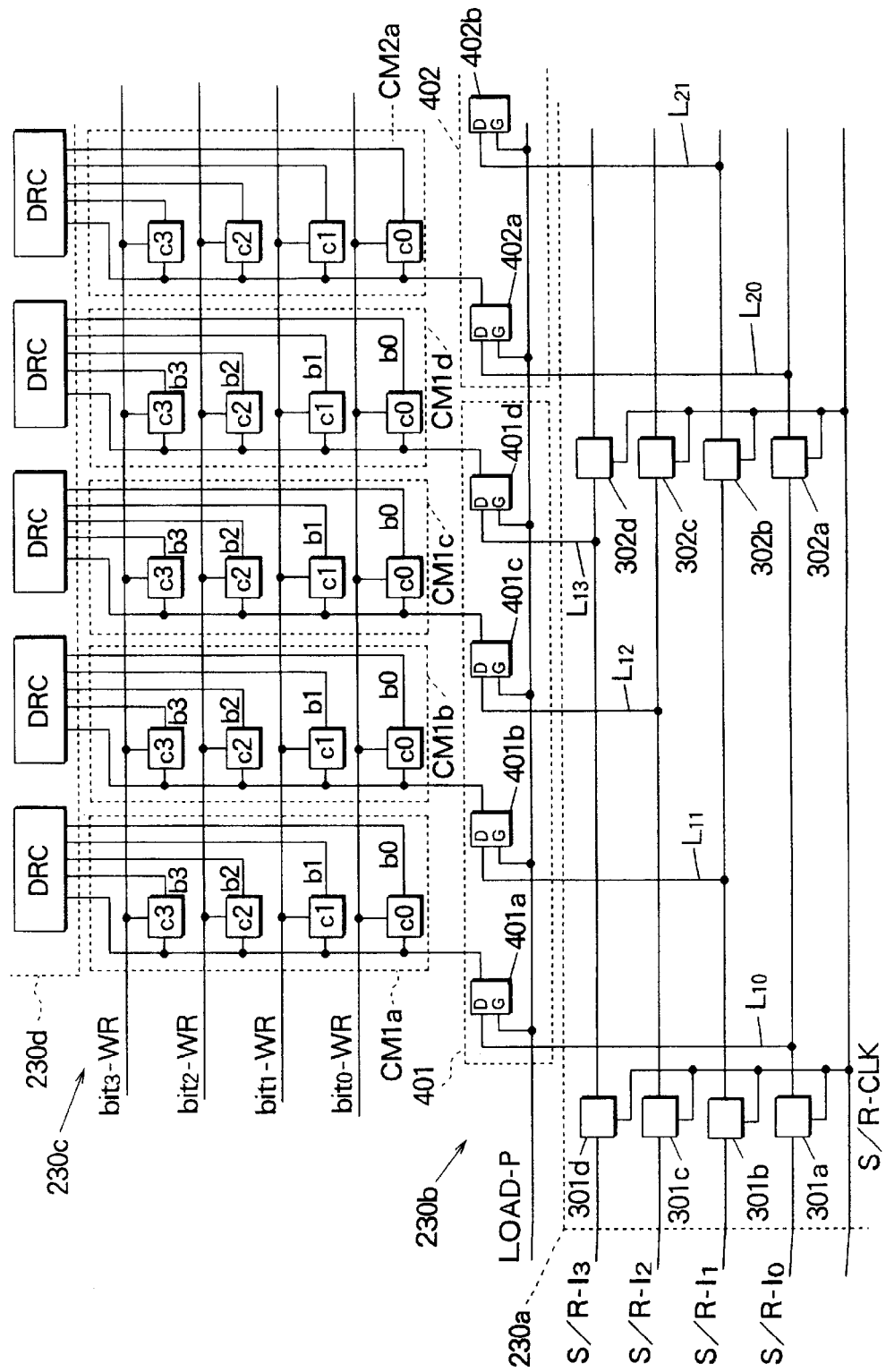
FIG. 16 is a more detailed circuit diagram illustrating the interconnections among the shift register and the groups of latch circuits, compensation memory circuits, and driving circuits in FIG. 14.

FIG. 15 illustrates the interconnections between the shift register 230a and the group of latch circuits 230b. FIG. 16 illustrates the interconnections among the shift register 230a and the groups of latch circuits 230b, compensation memory circuits 230c, and driving circuits 230d. The group of compensation memory circuits 230c comprises the compensation memory circuits CM1a, CM1b, . . . shown in FIG. 16. FIG. 16 shows only the initial portion of the shift register 230a, group of latch circuits 230b, group of compensation memory circuits 230c, and group of driving circuits 230d, but the remaining portion of the circuit configuration is similar to this initial portion.

The shift register 230a has twenty-four stages, through which driving data and compensation data are shifted in four-bit parallel form. The first stage comprises four flip-flop circuits 301a, 301b, 301c, and 301d; the second stage comprises four flip-flop circuits 302a, 302b, 302c, and 302d; the last stage comprises four flip-flop circuits 324a, 324b, 324c, and 324d. The clock signal S/R-CLK is supplied to the clock terminals of the flip-flop circuits in FIGS. 15 and 16. The data output from the flip-flop circuits 301a, 301b, . . . in the shift register 230a are denoted S/R-DOT1, S/R-DOT2, . . . , while the corresponding data output from the latch circuits are denoted LATCH-DOT1, LATCH-DOT2, . . . , as indicated in FIG. 15.

The group of latch circuits 230b comprises latch elements 401a to 424d that receive and temporarily store the outputs of the corresponding flip-flop circuits 301a to 324d in the shift register 230a. The four latch elements that receive and store the outputs of the four flip-flop circuits in the same shift-register stage constitute what will be referred to below as one latch circuit. For example, the four first-stage latch elements 401a to 401d constitute one latch circuit 401.

The group of compensation memory circuits 230c has compensation memory circuits CM1a to CM24d that receive and store the outputs of respective latch elements 401a to 424d. Each compensation memory circuit has four memory cells, denoted c0, c1, c2, and c3, and stores four bits of data. The signals denoted $bit_0$-WR to $bit_3$-WR that determine which memory cell receives each data bit are generated by circuits that will be shown in FIGS. 22 to 24.

The group of driving circuits 230d comprises driving circuits (DRC) that receive the outputs of latch elements 401a to 424d and compensation memory circuits CM1a–CM24d, and supply drive current through corresponding output terminals to the LEDs. These output terminals and LEDs will be illustrated in FIGS. 20 and 45. Each LED is driven by a separate driving circuit.

The compensation data are written into the compensation memory circuits 230c when the LED head is powered up, remain stored in those memory circuits until power is switched off, and are used repeatedly during printing. During the writing of compensation data at power-up, the shift register 230a transfers data supplied from the EEPROM 100e in the control IC 100. During the printing of data, the shift register 230a transfers driving data supplied from the printer controller. The driving data are latched by the latch circuits 401 to 424. The compensation data pass through these latch circuits without being latched.

As can be seen from FIGS. 1 and 14, the shift registers 230a in driver ICs 101 to 126 are interconnected to form one continuous shift register, which functions as a four-bit parallel data transfer means. Due to the adoption of parallel transfer, a typical bit need be shifted through only twenty-four of the ninety-six flip-flop circuits in each driver IC. For example, the bit input at input terminal S/R-$I_0$ in FIGS. 15 and 16 is shifted through flip-flops 301a, 302a, . . . , 324a.

During the transfer and writing of compensation data, four bits are transferred for each LED. The transfer and writing of these bits take place in the following sequence.

First, the most significant bits (bit $b_3$) of compensation data for all the LEDs are shifted through the shift registers 230a in the driver ICs until each of the flip-flops 301a to 324d in each driver IC holds one most significant bit; then these most significant bits are all written at once into the first memory cell (c3) in each compensation memory circuit.

Next, the second bits (bit $b_2$) of compensation data for all the LEDs are similarly shifted through the shift registers 230a in the driver ICs and all written at once into the second memory cells (c2) in the compensation memory circuits.

Following this, the third bits (bit $b_1$) of compensation data for all the LEDs are likewise shifted through the shift registers 230a in the driver ICs and all written at once into the third memory cells (c1) in the compensation memory circuits.

Finally, the fourth bits (bit $b_0$) of compensation data for all the LEDs are shifted through the shift registers 230a in the driver ICs and all written at once into the fourth memory cells (c0) in the compensation memory circuits.

In the transfer of driving data during printing, only one bit per LED is transferred. After all bits have been transferred into the flip-flops 301a to 324d of the shift registers, all bits are latched simultaneously by the latch elements 401a to 424d in the latch circuits. The driving data held in the latch circuits and the compensation data stored in the compensation memory circuits are then transferred to the corresponding drive circuits (DRC) and used in driving the LEDs.

The compensation memory circuits have static memory cells. The four memory cells in each memory circuit share a common input line, which is coupled through the corresponding latch element in the group of latch circuits 230b to the corresponding flip-flop in the shift register 230a. The same common input line also carries driving data to the corresponding driving circuit (DRC) in the group of driving circuits 230d.

Figure 17:
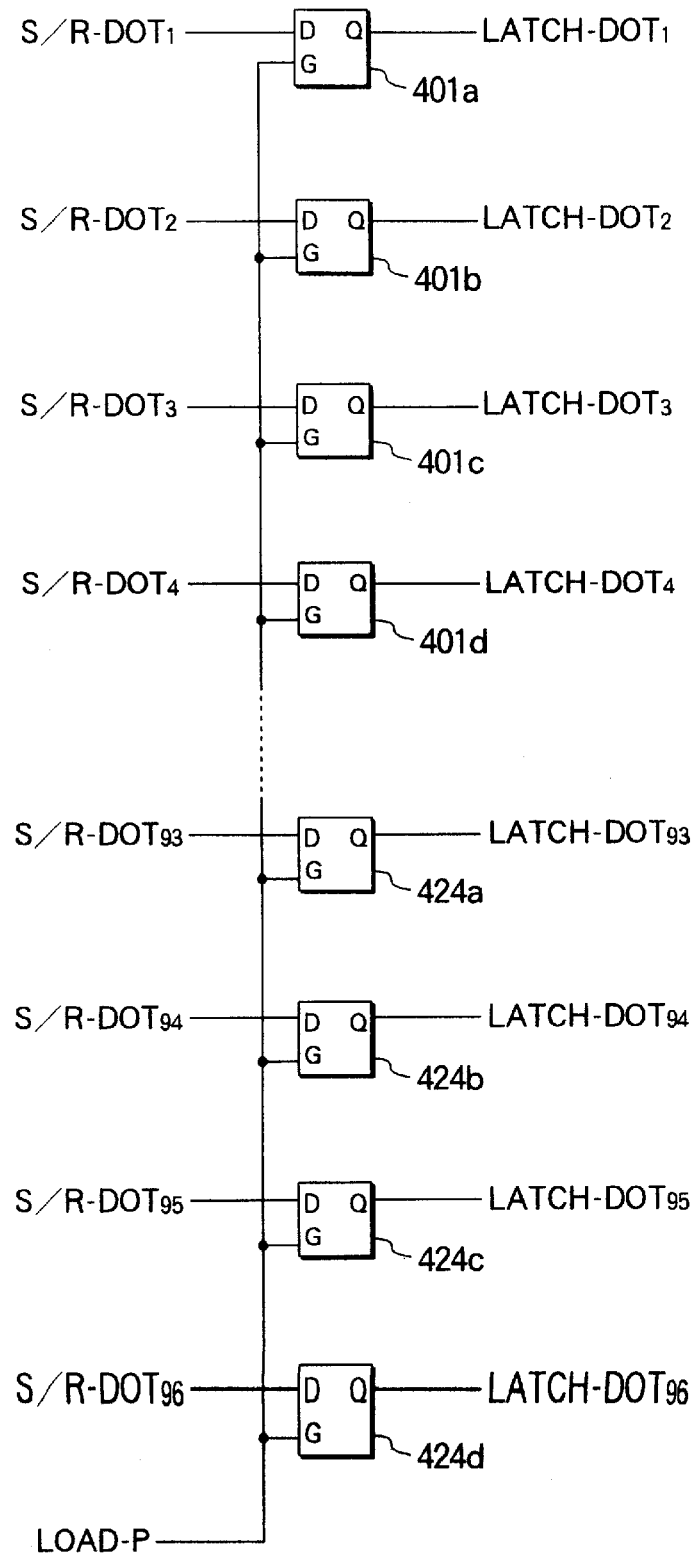
FIG. 17 illustrates two of the latch circuits in FIG. 16.

FIG. 17 illustrates the latch circuits 401 to 424. The LOAD-P signal is supplied to the enable (G) input terminals of all latch elements from 401a to 424d. When LOAD-P is high, these latch elements are transparent: their outputs (Q) are identical to their inputs (D). When LOAD-P goes low, the output (Q) is latched and remains constant until LOAD-P goes high again.

Figure 18:
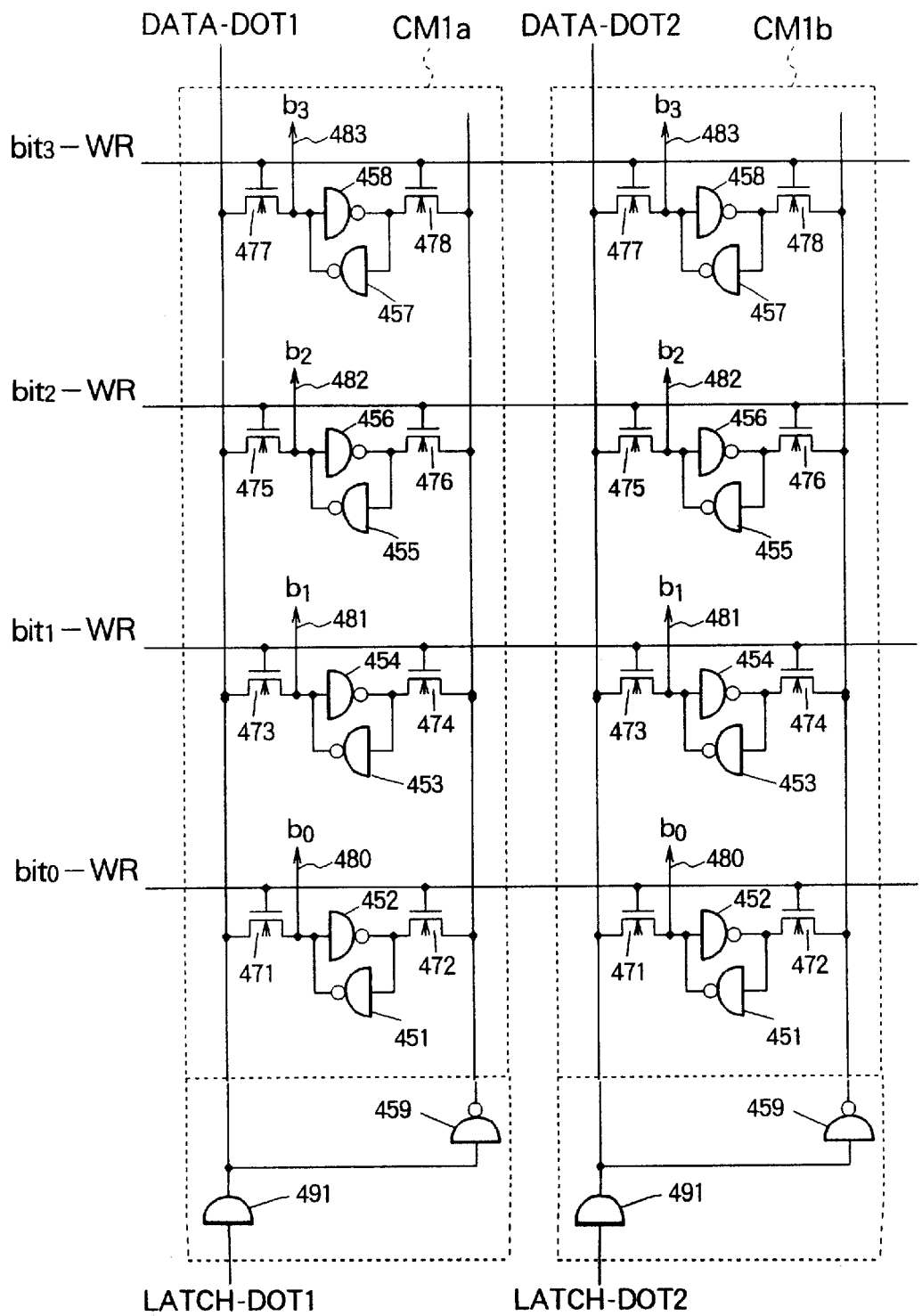
FIG. 18 is a circuit diagram illustrating two compensation memory circuits in the first embodiment.

FIG. 18 illustrates the detailed circuit configuration of the compensation memory circuits. Only the compensation memory circuits CM1a and CM1b pertaining to the first two LEDs are shown, but the other compensation memory circuits are similar.

Each of the compensation memory circuits separately has inverters 451 to 459, n-channel MOS transistors 471 to 478, read-out signal lines 480 to 483, and a buffer 491. The buffers 491 are coupled to the Q output terminals of the corresponding latch elements illustrated in FIG. 17, and receive the data identified as LATCH-DOT1, LATCH-DOT2, . . . . The outputs of buffers 491 are provided as driving data, denoted DATA-DOT1, DATA-DOT2, . . . , to the corresponding driving circuits.

Inverters 451 and 452 store bit $b_0$ of the LED compensation data. Writing of bit $b_0$ is controlled by n-channel MOS transistors 471 and 472. The gates of these transistors 471 and 472 receive the write command signal $bit_0$-WR. The other bits ($b_1$, $b_2$, $b_3$) are stored in similar fashion in the other pairs of inverters.

Inverters 451 and 452 and transistors 471 and 472 constitute memory cell c0 in FIG. 16. Similarly, inverters 453 and 454 and transistors 473 and 474 constitute memory cell c1, inverters 455 and 456 and transistors 475 and 476 constitute memory cell c2, and inverters 457 and 458 and transistors 477 and 478 constitute memory cell c3.

The memory cell that stores one bit of compensation data comprises two MOS transistors and two inverters. Each inverter comprises two MOS transistors. Six transistors thus suffice to store each bit of compensation data, instead of the twenty transistors required by the conventional driver IC employing flip-flop circuits for storage of compensation data. This makes the circuit size of the present embodiment much smaller than the size of that conventional driver IC.

The memory cells in FIG. 18 are similar to well-known static random-access memory (SRAM) cells, but with one significant difference. In an SRAM, data are read out from the memory cells onto a common bus, so the number of bits that can be read simultaneously is limited by the bus width. In FIG. 18, however, each memory cell has its own read-out signal line, so all of the nearly ten thousand bits of compensation data stored in the compensation memory circuits in the LED head are simultaneously readable.

Figure 19:
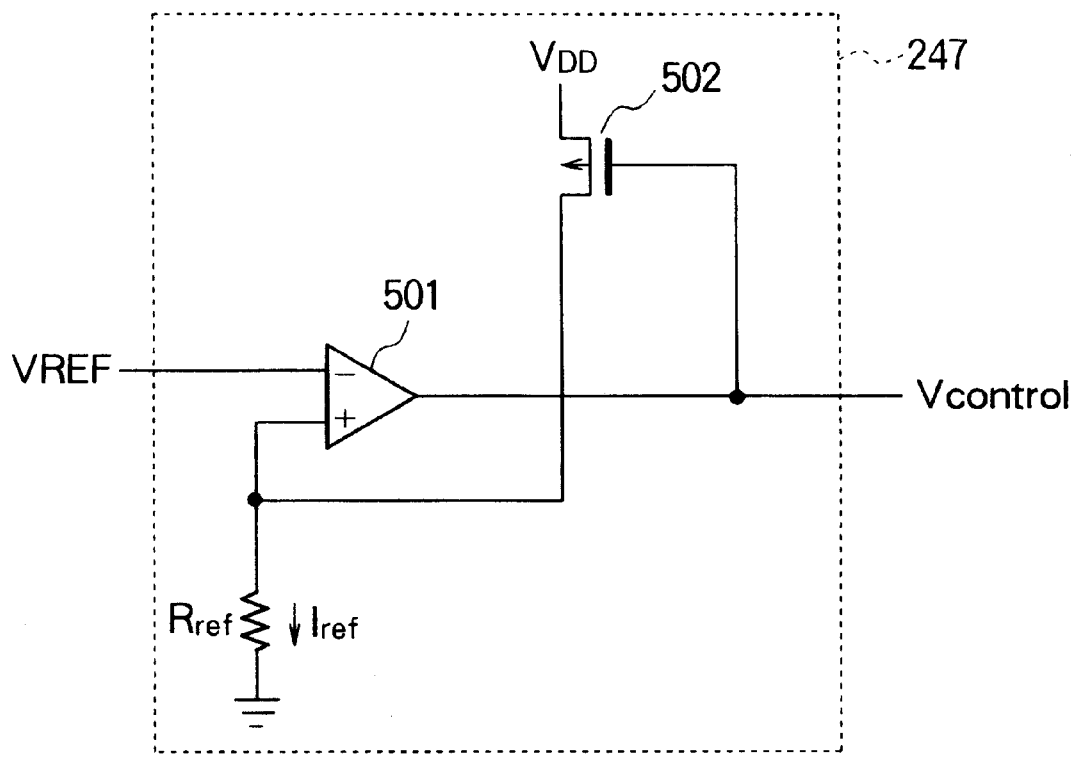
FIG. 19 is a circuit diagram showing an example of the configuration of the current reference circuit in FIG. 14.

FIG. 19 illustrates the internal structure of the current reference circuit 247, which comprises an operational amplifier 501, a p-channel MOS transistor 502, and a resistor with a resistance value of $R_{ref}$. The function of this circuit is to generate a control voltage Vcontrol for use in the driving circuits.

The inverting (−) input terminal of the operational amplifier 501 is coupled to the VREF input terminal of the driver IC 101, which receives the reference voltage $V_{ref}$ supplied by the regulator 127. The non-inverting (+) input terminal of operational amplifier 501 is coupled through p-channel MOS transistor 502 to the power supply ($V_{DD}$), and through resistor $R_{ref}$ to ground. The transistor 502 and resistor $R_{ref}$ are thus coupled in series between $V_{DD}$ and ground. The output of the operational amplifier 501, which is the control voltage Vcontrol, is applied to the gate of the p-channel MOS transistor 502. The operational amplifier 501 operates so as to equalize the inputs at its two input terminals. This operation produces a constant reference current $I_{ref}$ through transistor 502 and resistor $R_{ref}$, given by the following equation:

$$I_{ref} = V_{ref}/R_{ref}$$

Figure 20:
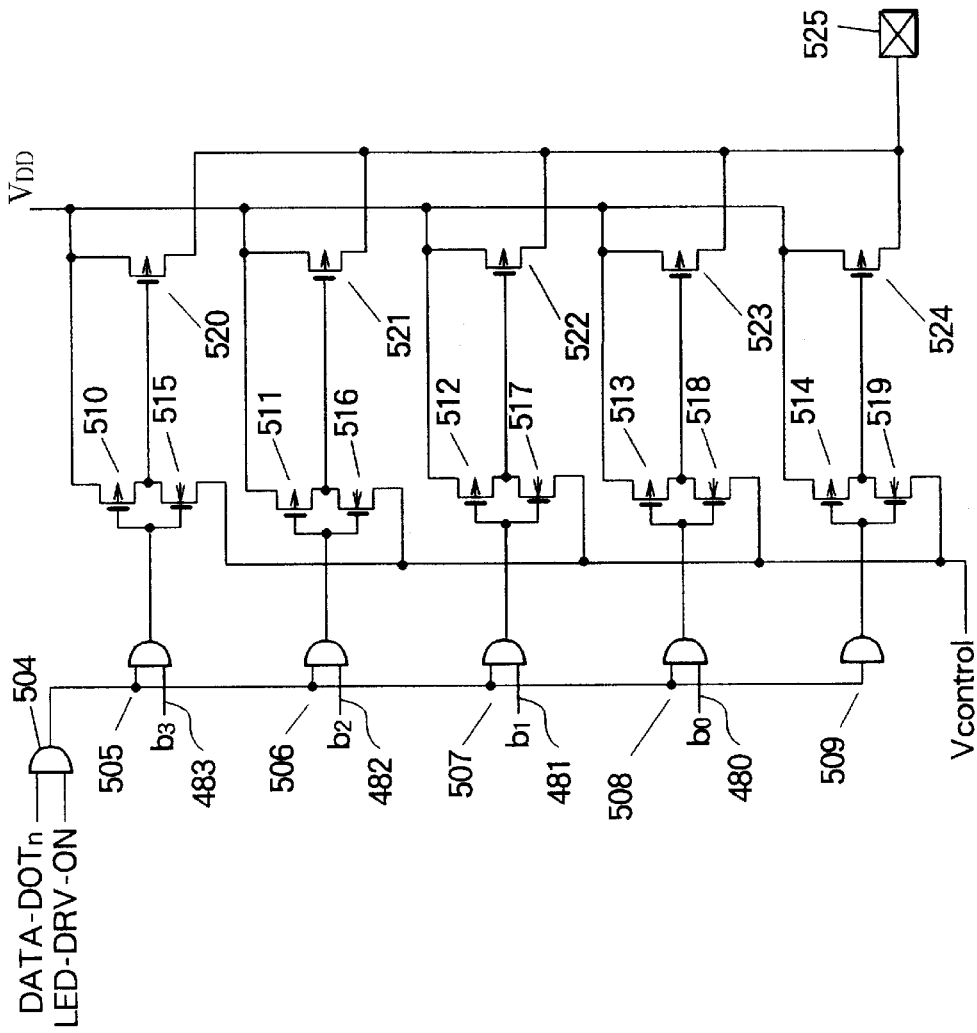
FIG. 20 is a circuit diagram illustrating the internal structure of one of the driving circuits in FIG. 14, showing the circuitry for driving one LED.

FIG. 20 illustrates one of the driving circuits in the group of driving circuits 230d, and the output terminal 525 through which this driving circuit drives one LED (the n-th LED in the LED array). The anode of the LED (not visible) is coupled to output terminal 525.

The circuit in FIG. 20 comprises AND gates 504 to 508, a buffer circuit 509, p-channel MOS transistors 510 to 514, n-channel MOS transistors 515 to 519, and p-channel MOS transistors 520 to 524 that feed drive current to output terminal 525.

The inputs to AND gate 504 are the DATA-DOTn signal and an LED-DRV-ON signal. The output terminal of AND gate 504 is coupled to input terminals of AND gates 505 to 508 and buffer circuit 509. The other input terminals of AND gates 505 to 508 receive compensation data bits $b_3$ to $b_0$, respectively, from the corresponding compensation memory circuit, as shown in FIG. 18. The source terminals of n-channel MOS transistors 515 to 519 receive the control voltage Vcontrol output by the current reference circuit 247 in FIG. 19.

Transistor 524 is the main driving transistor that feeds driving current to the LED. Transistors 520 to 523 are compensation transistors that feed additional current to adjust the optical output of the LED. Transistors 520 to 523 have equal gate lengths, and their gate widths are in the ratio 8:4:2:1, corresponding to compensation data bits $b_3$ to $b_0$. (Transistors 502 and 520 to 524 all have the same gate length.) Transistors 520 to 523 generate weighted compensation currents in proportion to their gate widths.

Transistor 524 is switched on when the LED-DRV-ON and DATA-DOTn signals are both high. Transistors 520 to 523 are switched on when LED-DRV-ON, DATA-DOTn, and the corresponding compensation data bits $b_3$ to $b_0$ are all high. The current supplied from output terminal 525 to the LED is the sum of a main driving current contributed by transistor 524, and weighted compensation currents contributed by those transistors 520 to 523 that are switched on.

Transistors 510 to 519 form five inverters through which the gates of transistors 520 to 524 are driven. The control voltage Vcontrol output by the current reference circuit 247 is supplied to the source terminals of transistors 515 to 519. When transistors 515 to 519 are switched on, they supply voltages substantially equal to Vcontrol to the gate terminals of the driving transistors 520 to 524. Transistor 502 in FIG. 19 and transistors 520 to 524 in FIG. 20 thus form a current mirror. The drain currents output by driving transistors 520 to 524 (when switched on) are determined by the ratios of the gate widths of these driving transistors to the gate width of transistor 502. All LED driving currents supplied by the driver ICs can therefore be adjusted simultaneously by changing the externally applied reference voltage $V_{ref}$, causing a corresponding change in the Vcontrol value.

Subsequent embodiments will describe how Vcontrol can also be varied by means of chip compensation data stored in a separate compensation memory circuit in each driver IC, for the purpose of chip-to-chip compensation.

Figure 21:
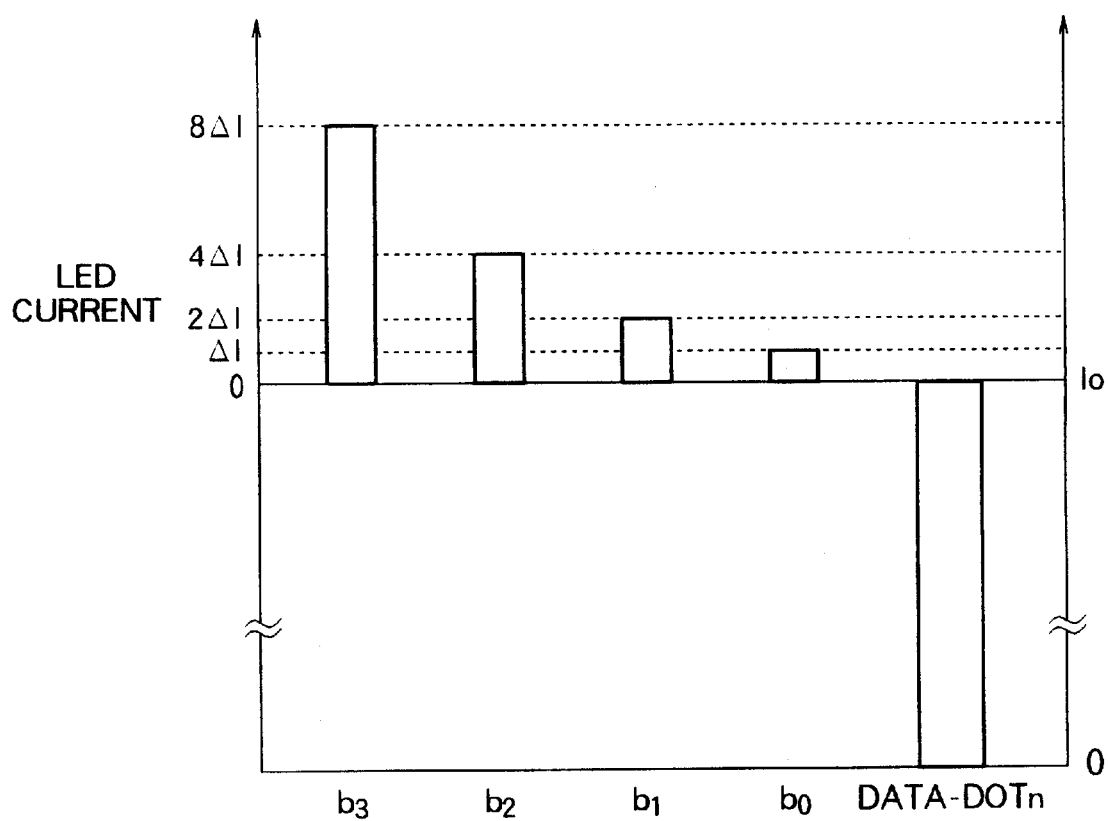
FIG. 21 is a graph illustrating the compensation for differences in the optical output of the LEDs.

The bar graph in FIG. 21 illustrates the relative sizes of the currents output by p-channel MOS transistors 520, 521, 522, 523, and 524 when these transistors are driven. The main driving current has a value $I_0$. The compensation currents output in response to bits $b_3$, $b_2$, $b_1$, and $b_0$ have values of $8\Delta I$, $4\Delta I$, $2\Delta I$, and $\Delta I$, respectively. The quantity $\Delta I$ represents the minimum step in which the LED driving current can be varied by the compensation data. By storing various compensation data values, the LED driving current can be varied in sixteen steps, ranging from $I_0$ (when $b_3$, $b_2$, $b_1$, and $b_0$ are all zero) to $I_0+15\Delta I$ (when $b_3$, $b_2$, $b_1$, and $b_0$ are all one).

Figure 22:
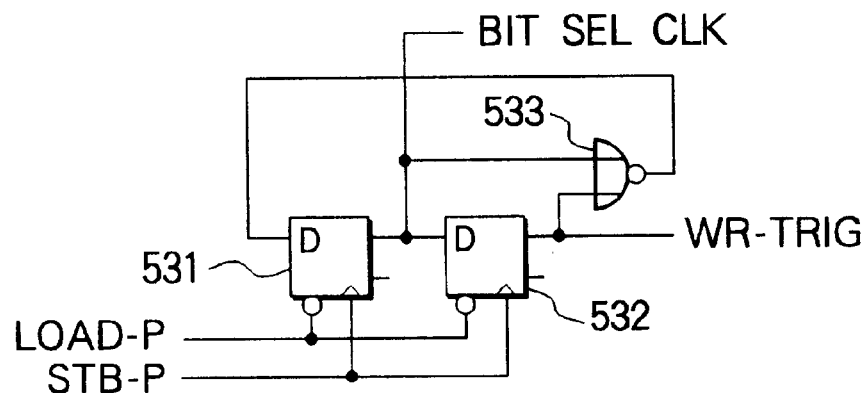
FIG. 22 is a circuit diagram of a timing generator circuit in the driver ICs in the first embodiment.

FIG. 22 illustrates a timing generator (not shown in FIG. 14) which is disposed in driver ICs 101 to 126. The timing generator comprises a pair of flip-flop circuits 531 and 532 and a NOR gate 533, which are interconnected to form a ring counter. The LOAD-P signal is supplied to the reset input terminals of flip-flop circuits 531 and 532. The STB-P signal is supplied to the clock input terminals of flip-flop circuits 531 and 532. The outputs of this timing generator are a bit select clock (BIT SEL CLK) signal and a write trigger (WR-TRIG) signal. For every three cycles of STB-P, one BIT SEL CLK pulse is output, followed by one WR-TRIG pulse, as will be shown in FIG. 26.

Figure 23:
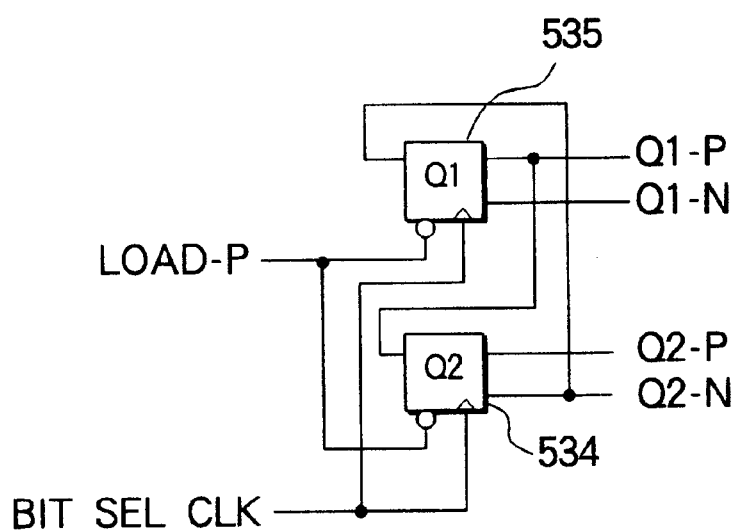
FIG. 23 is a circuit diagram of a bit position counter circuit in the driver ICs in the first embodiment.

FIG. 23 illustrates a compensation bit position counter (not shown in FIG. 14) which is disposed in the driver ICs. This counter comprises flip-flop circuits 534 and 535, which are interconnected to form a Johnson counter. The LOAD-P signal is supplied to the reset input terminals of flip-flop circuits 534 and 535. The BIT SEL CLK signal is supplied to the clock input terminals of these flip-flop circuits 534 and 535. The outputs of this counter are two complementary pairs of signals denoted Q1-P, Q1-N, Q2-P, and Q2-N.

Figure 24:
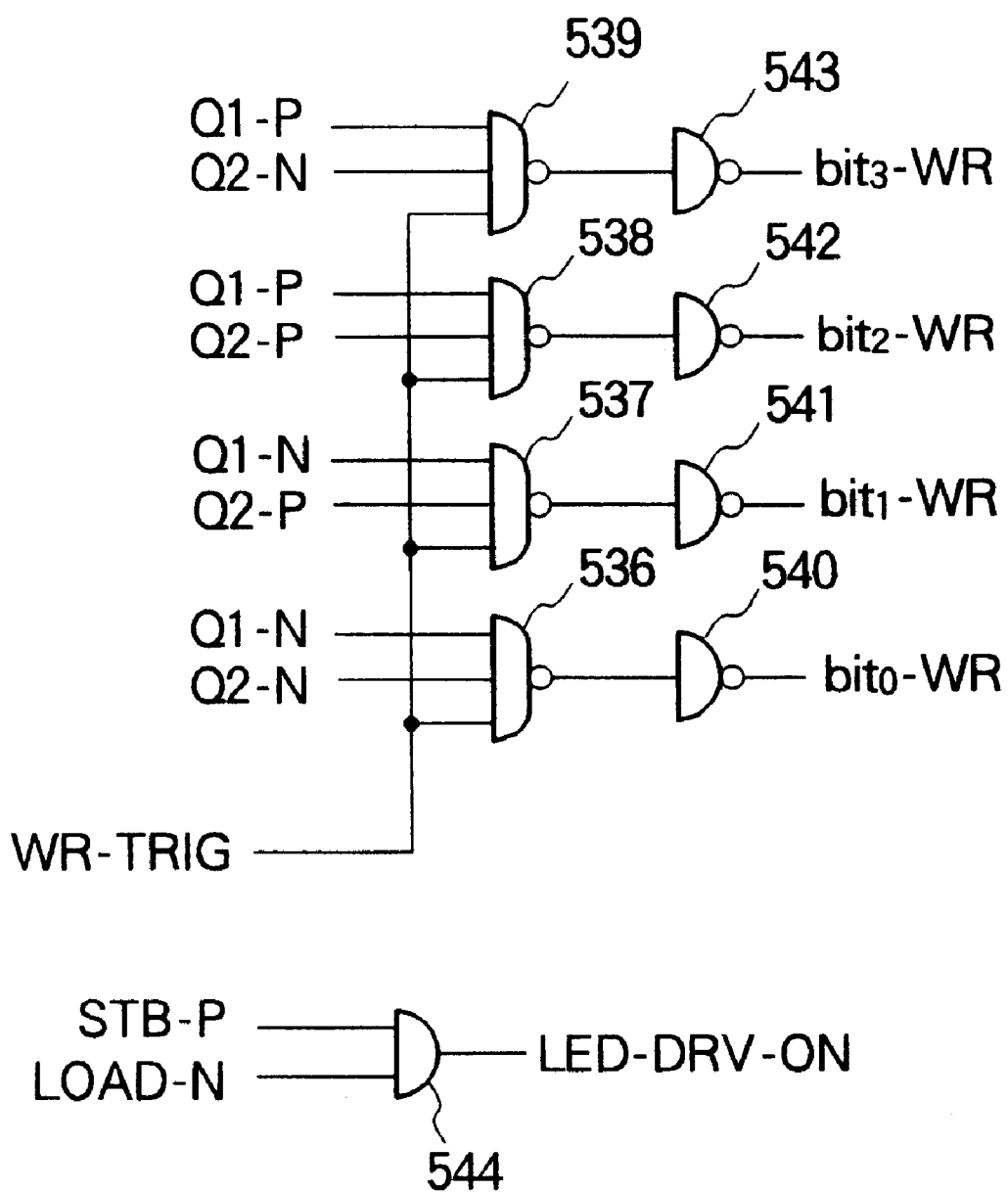
FIG. 24 is a circuit diagram of a word-line decoder circuit in the driver ICs in the first embodiment.

FIG. 24 illustrates a word-line decoder (also not shown in FIG. 14) which is disposed in each of the driver ICs. This decoder comprises NAND gates 536 to 539 and inverters 540 to 543. All four NAND gates 536 to 539 receive the WR-TRIG signal output by the timing generator in FIG. 22. Each NAND gate also receives two of the signals Q1-P, Q1-N, Q2-P, and Q2-N output by the compensation bit position counter. The outputs of the NAND gates go low one at a time responsive to different combinations of the logic levels of Q1-P, Q1-N, Q2-P, and Q2-N. These outputs are inverted by inverters 540 to 543 to generate the signals $bit_3$-WR to $bit_0$-WR that control the writing of compensation data into the compensation memory circuits.

The word-line decoder circuit also generates the LED-DRV-ON signal by means of a NAND gate 544 that receives the STB-P and LOAD-N signals. When the load signal is active (when LOAD-P is high and LOAD-N is low), LED-DRV-ON is held in the inactive (low) state, so that the LEDs are not driven.

The circuits in FIGS. 23 and 24 combine to activate $bit_3$-WR, $bit_2$-WR, $bit_1$-WR, and $bit_0$-WR in turn at four consecutive BIT SEL CLK pulses.

Figure 25:
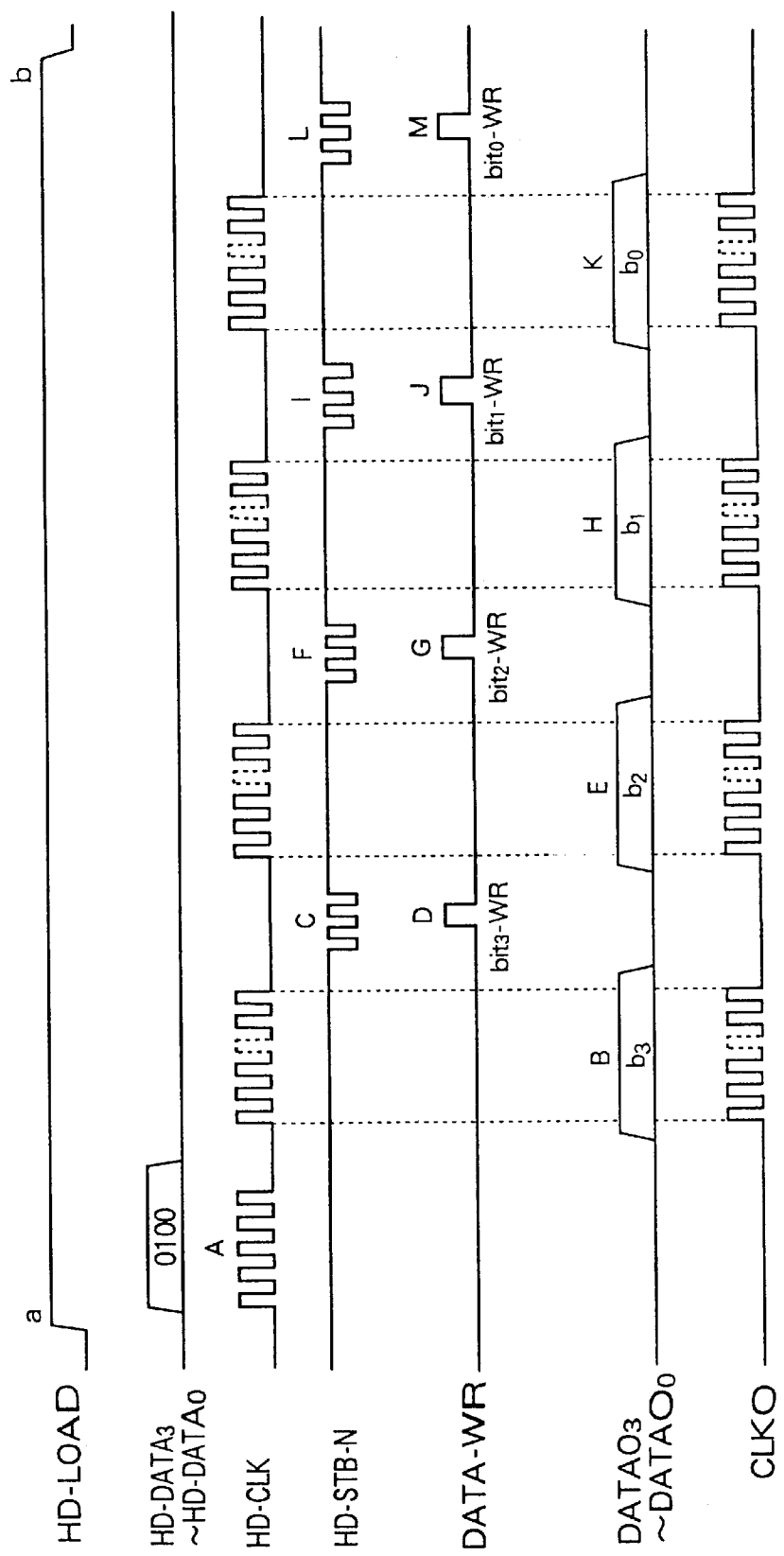
FIG. 25 is a timing diagram illustrating the writing of compensation data.

FIG. 25 illustrates the operation of transferring the compensation data into the compensation memory circuits of driver ICs 101 to 126. This operation is performed when the LED head is powered up, or at some other suitable time before printing begins, and is controlled by the printer controller (not shown in the drawings). The compensation data are read from the EEPROM 100e in the control IC 100.

Signals HD-LOAD, HD-DATA$_3$ to HD-DATA$_0$, HD-CLK, and HD-STB-N in FIG. 25 are provided from the printer controller to the LED head through a connector attached to the LED head. Signals DATAO$_3$ to DATAO$_0$ and CLKO are supplied from the control IC 100 to driver IC 101 in FIG. 1. The DATA-WR signal collectively indicates the four signals $bit_3$-WR to $bit_0$-WR shown in FIGS. 16, 18, and 24, which are generated in each of the driver ICs.

The operation begins when the HD-LOAD signal goes high as shown at the top left (a) in FIG. 25. Next, command data are transferred on the HD-DATA$_0$ signal line in synchronization with HD-CLK (A). The command data ('0100') specify the transfer (TRANS) command, as shown in FIG. 10, which instructs the control IC 100 to transfer compensation data from its internal EEPROM to the driver ICs.

When the command data have been transferred and the control IC 100 has been placed in the transfer mode, further HD-CLK cycles are generated to transfer the compensation data. First, the most significant bits ($b_3$), comprising one bit for each LED, are read from the EEPROM and transferred into the shift registers 230a of the driver ICs. After the number of HD-CLK cycles (B) necessary to transfer all of the most significant bits, HD-CLK is temporarily halted and three HD-STB-N pulses are produced (C).

From these HD-STB-N pulses, each driver IC generates the write command signal $b_3$-WR needed to write the transferred bits into the compensation memory circuits (D). The notation $bit_3$-WR in FIG. 25 indicates that at this point in the drawing, DATA-WR represents $bit_3$-WR. The $bit_3$-WR signals cause all of the data held in the shift registers 230a in the driver ICs to be written into memory cells c3 (FIG. 16) of the compensation memory circuits and stored by inverters 457 and 458 (FIG. 18).

Next, the printer controller sends further HD-CLK cycles to transfer the next bits ($b_2$) of compensation data (E), followed by three more HD-STB-N pulses (F), which cause the driver ICs to generate $bit_2$-WR signals (G). These bits ($b_2$) are thereby written into memory cells c2 (FIG. 16) in the compensation memory circuits, and stored by inverters 455 and 456 in FIG. 18.

In the same way the third bits ($b_1$) are transferred to the driver ICs and written in their compensation memory circuits (H, I, J). Then the last bits ($b_0$) are similarly transferred and written (K, L, M). At this point four bits of compensation data ($b_3$, $b_2$, $b_1$, and $b_0$) have been stored sequentially in the memory cells c3, c2, c1, and c0 in each compensation memory circuit.

Finally, the HD-LOAD signal is driven low (b) to end the transfer of compensation data and prepare for the transfer of driving data. The operation illustrated in FIG. 25 thus comprises a command transfer phase (A), followed by four compensation data transfer cycles (B-C-D, E-F-G, H-I-J, and K-L-M), with each compensation memory circuit receiving one bit of compensation data per cycle.

Figure 26:
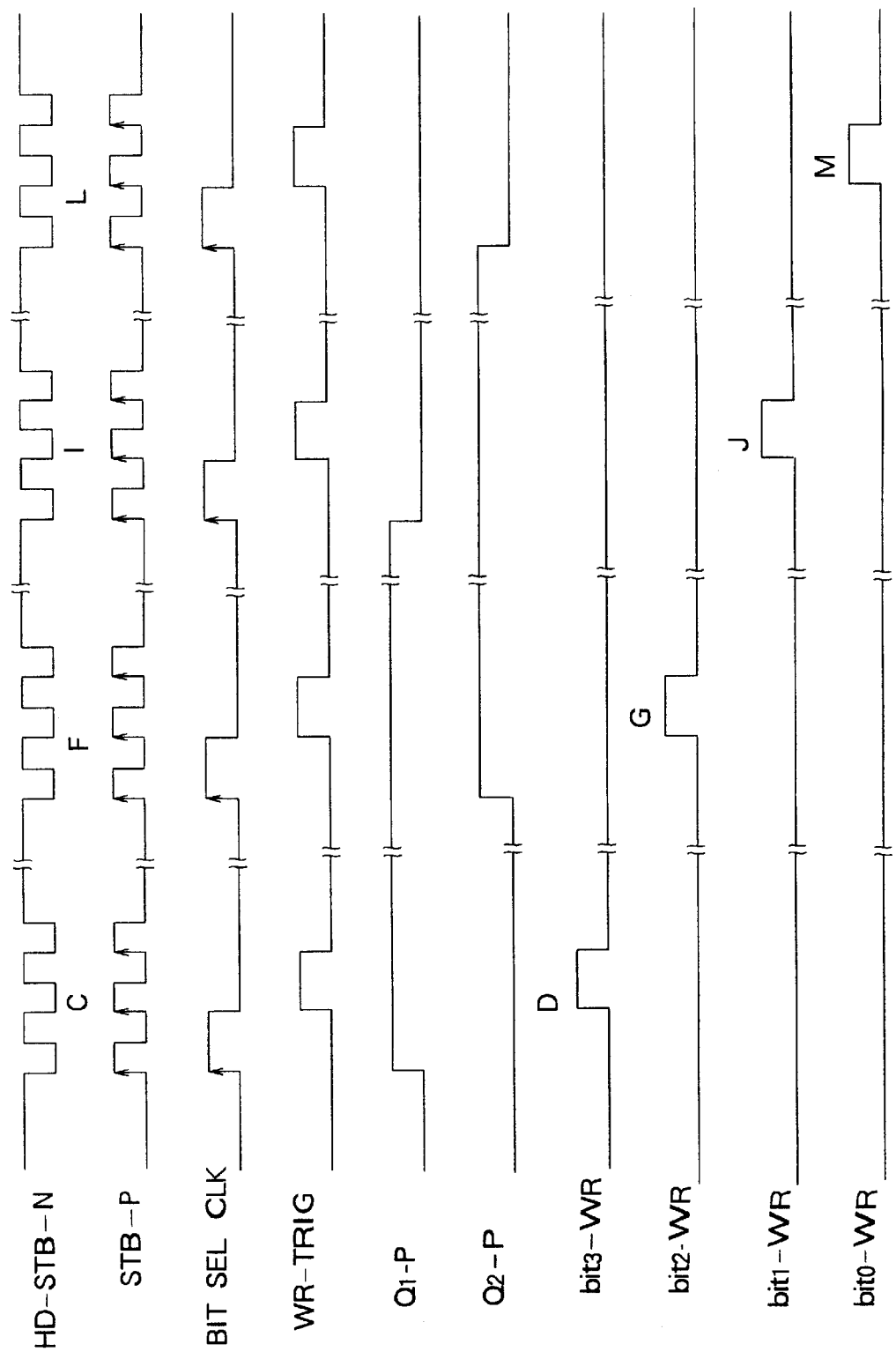
FIG. 26 more detailed timing diagram illustrating the operation of the timing generator circuit, bit position counter circuit, and word-line decoder circuit.

The timing diagram in FIG. 26 illustrates the operation of the timing generator (FIG. 22), compensation bit position counter (FIG. 23), and word-line decoder (FIG. 24) during the writing of data into the compensation memory circuits. The letters C, D, F, G, I, J, L, and M in FIG. 26 have the same meaning as in FIG. 25.

The HD-STB-N signal output from the printer controller is buffered in the control IC 100 and received at the STB input terminals of all the driver ICs (FIG. 1). In each driver IC, inverter 246 (FIG. 14) inverts the STB input to produce STB-P, which clocks the ring counter comprising flip-flop circuits 531 and 532 in FIG. 22. LOAD-P is high, so these flip-flop circuits 531 and 532 are not reset.

The first rising edge of STB-P in FIG. 26 (C) causes BIT SEL CLK to go high. The second rising edge of STB-P causes BIT SEL CLK to go low and WR-TRIG to go high. The third rising edge of STB-P causes WR-TRIG to go low. The same sequence occurs at the other groups of strobe pulses (F, I, L).

Signals Q1-P and Q2-P are generated by the circuit in FIG. 23, in which flip-flop circuits 534 and 535 form a Johnson counter clocked by BIT SEL CLK. The four rising edges of BIT SEL CLK in FIG. 26 cause Q1-P and Q2-P to assume, in turn, the four pairs of values '10,' '11,' '01,' and '00.' The word-line decoder in FIG. 24 decodes these pairs of values and the WR-TRIG signal to generate signals $bit_3$-WR to $bit_0$-WR (shown at D, G, J, and M).

When the load signal is active (when LOAD-P is high and LOAD-N is low), AND gate 544 in FIG. 24 disables the LED-DRV-ON signal, so that the STB-P pulses in FIG. 26 do not cause LED-DRV-ON to go high.

Figure 47:
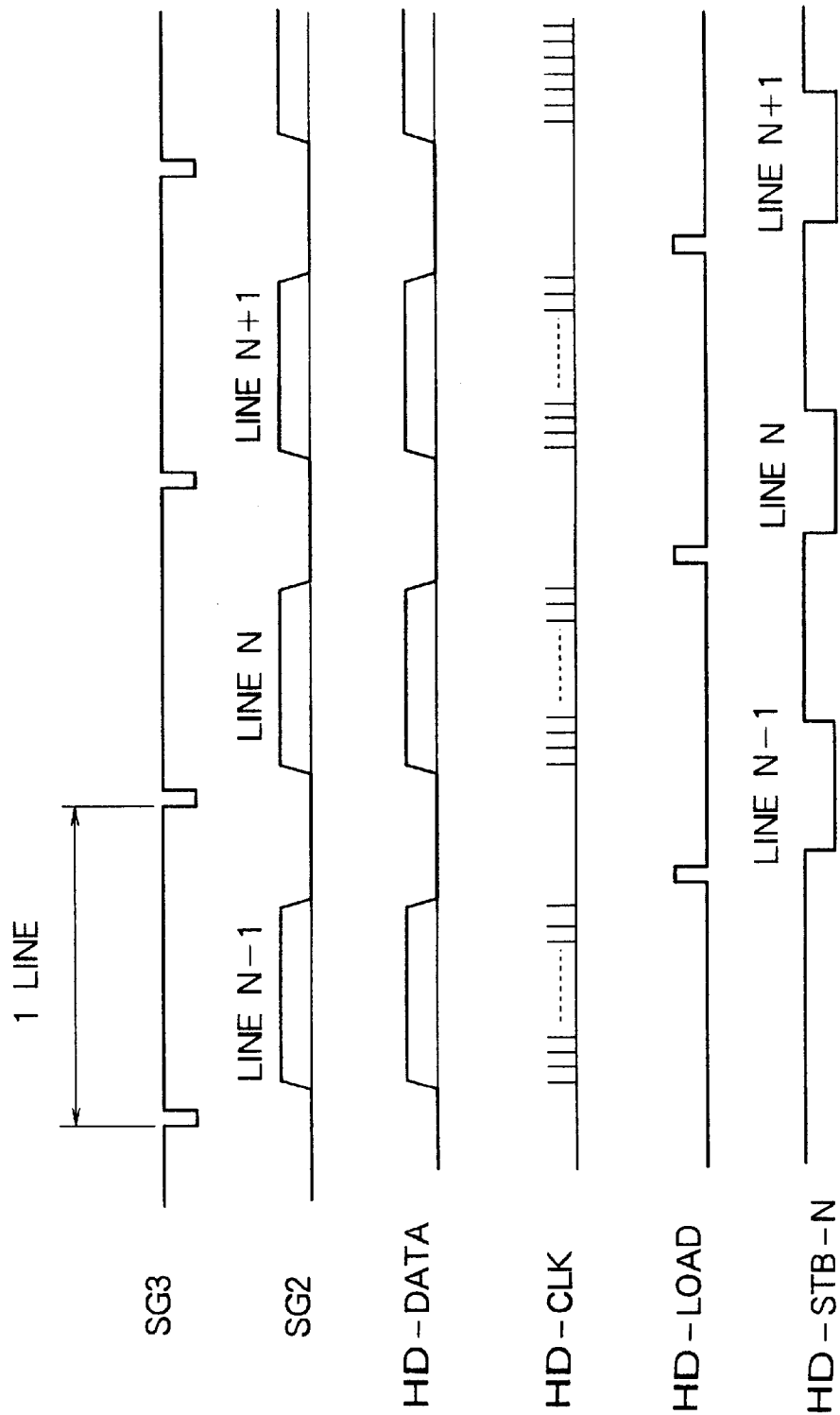
FIG. 47 is a timing diagram illustrating the operation of a conventional electrophotographic printer.
Figure 48:
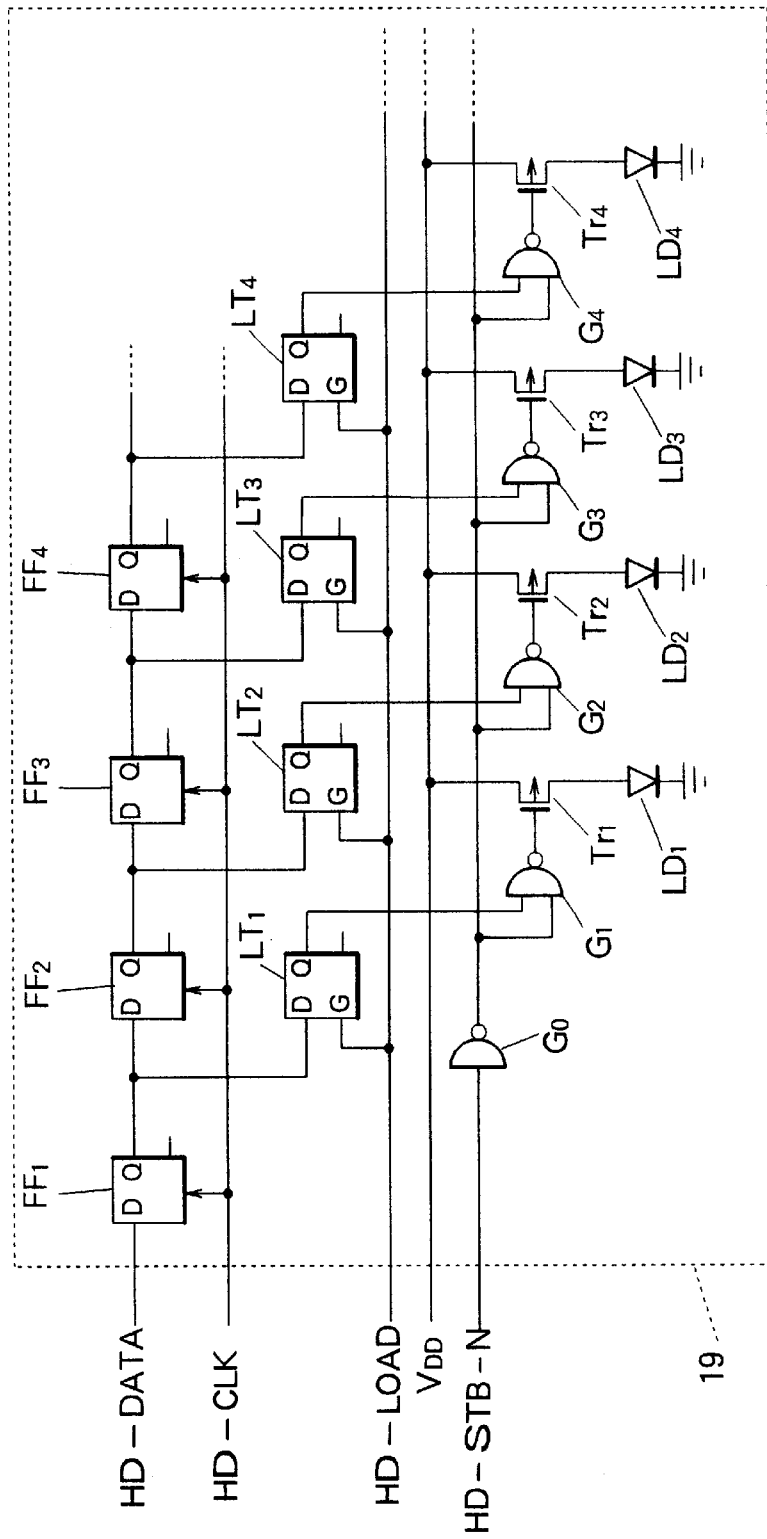
FIG. 48 illustrates the circuit configuration of a conventional LED head.
Figure 49:
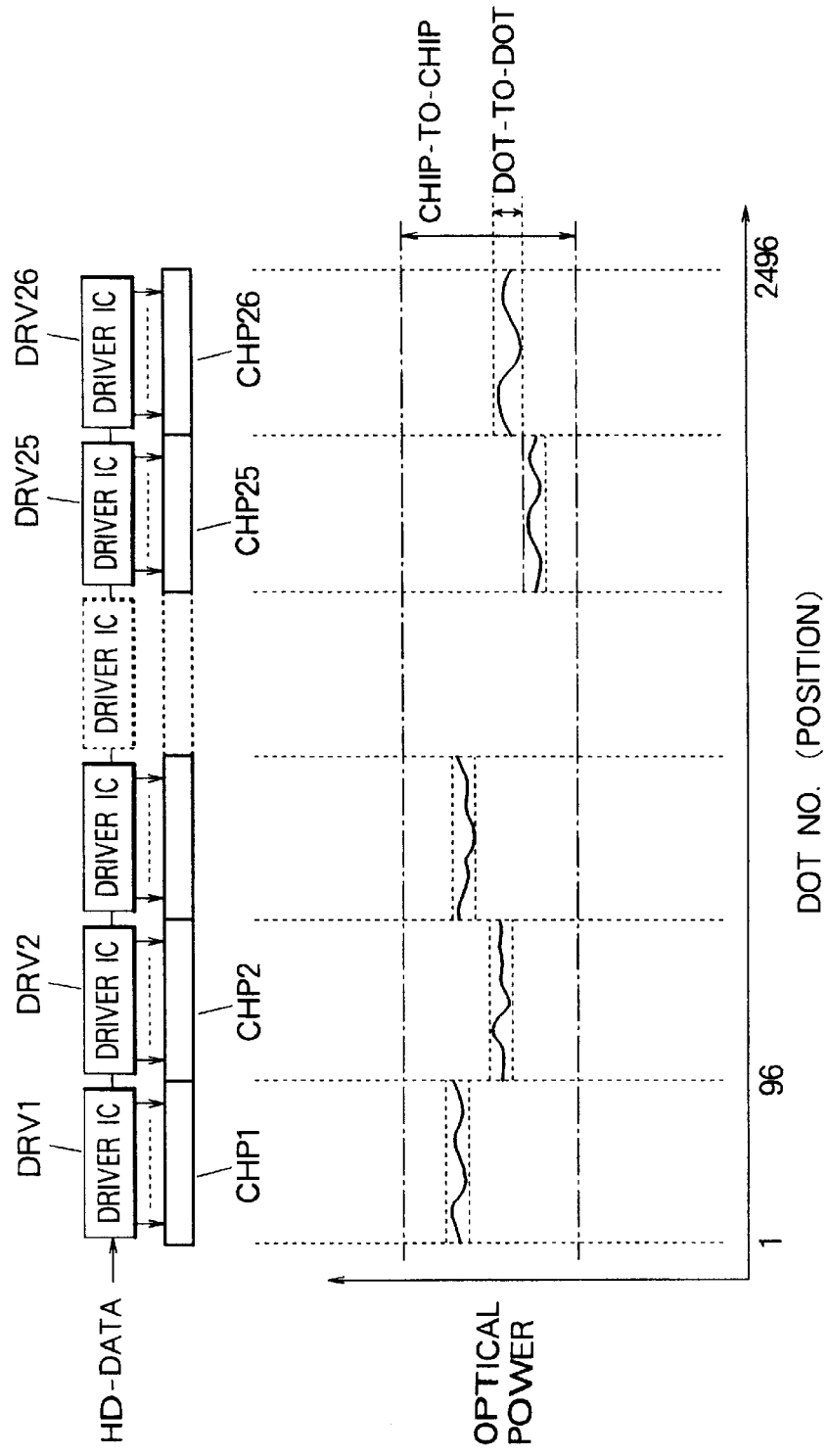
FIG. 49 is a graph illustrating dot-to-dot and chip-to-chip variations in an LED head.

During printing, LED-DRV-ON output is enabled. The load signal is inactive (LOAD-N is high and LOAD-P is low) when STB-P goes high, so STB-P propagates through AND gate 544 to become the LED-DRV-ON signal. Printing is carried out with the same signal timing sequence as in the prior art, illustrated in FIG. 47.

Figure 50:
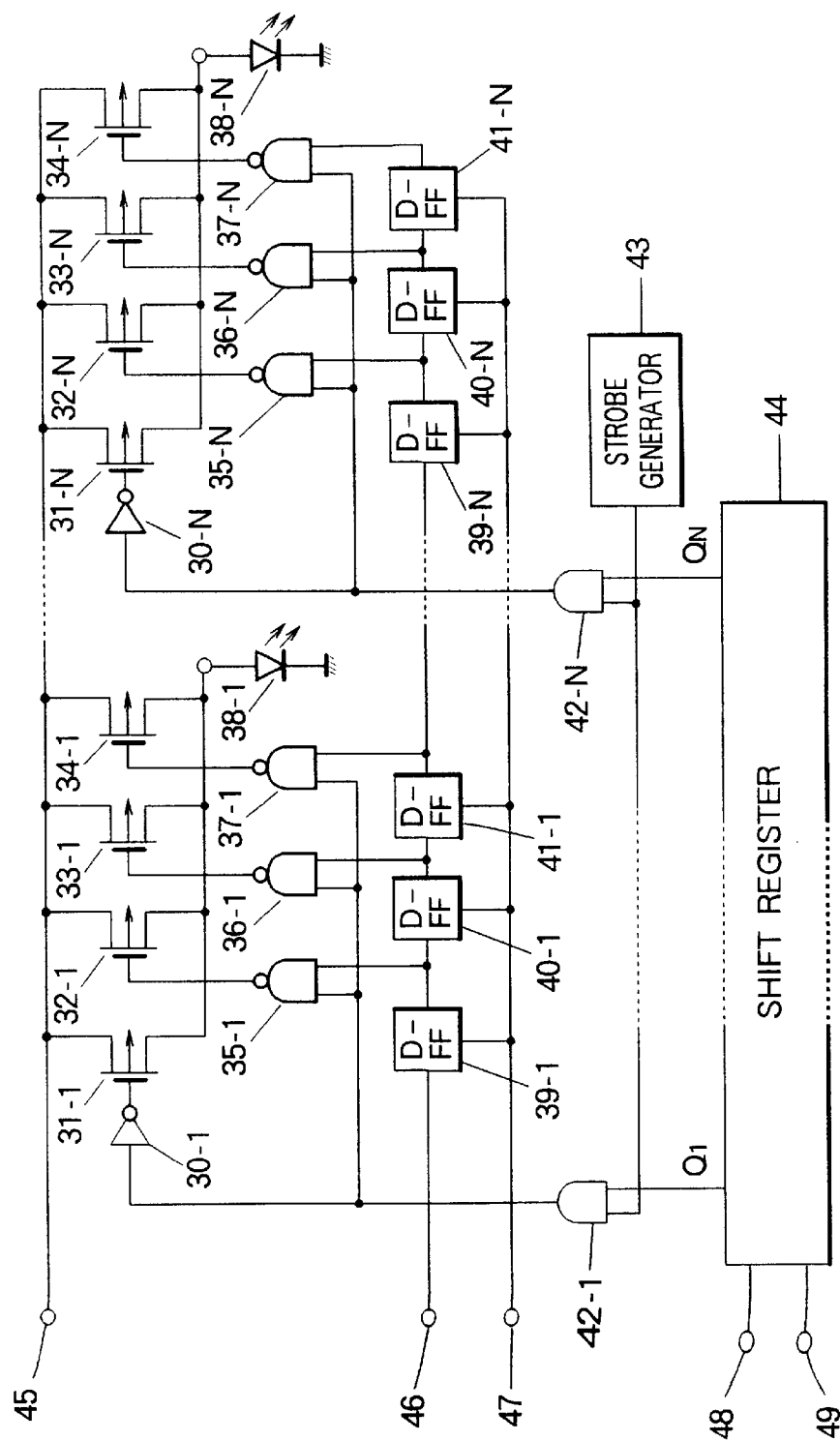
FIG. 50 illustrates the circuit configuration of another conventional LED head.
Figure 51:
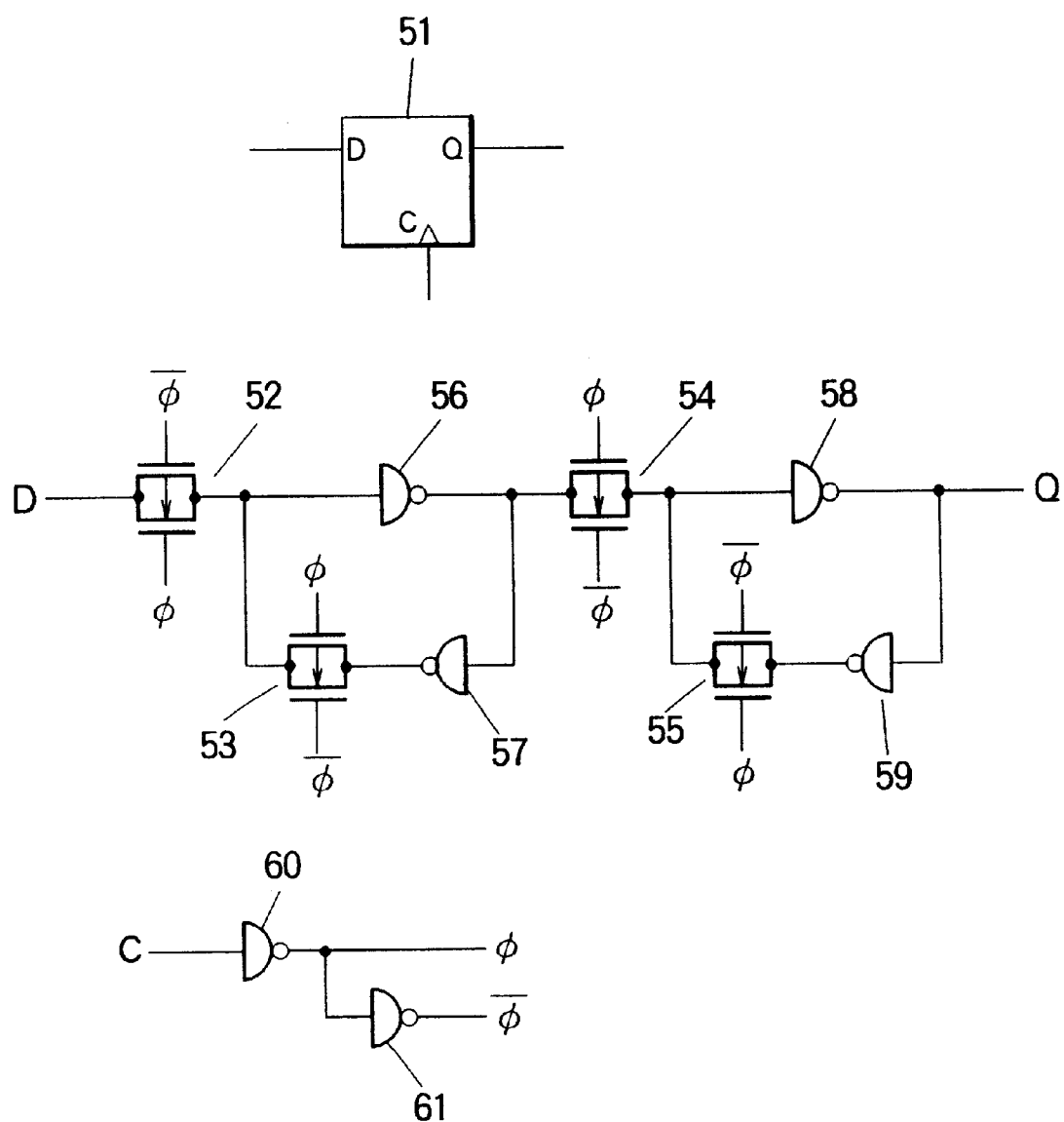
FIG. 51 is a circuit diagram illustrating the structure of a flip-flop circuit for storing compensation data.

As is clear from the preceding description, when compensation data are transferred from the control IC 100 to the driver ICs according to this first embodiment, the compensation data are transferred by the same shift registers that are also used for transferring driving data during printing, and the compensation data held in the shift registers are stored simultaneously in the compensation memory circuits in the driver ICs. Compared with the prior art (FIG. 50) in which a separate shift register comprising flip-flop circuits (FIG. 51) was used to transfer and store the compensation data, the present embodiment requires fewer transistors, fewer external terminals, and fewer wire-bonding interconnections, thereby reducing the size and cost of the driver ICs. Assembly and testing costs are also reduced. In particular, the testing of logic functions in the LED head and inspection of wire-bonding interconnections are simplified.

Another feature of the first embodiment is that the LOAD-P signal distinguishes between the transfer of compensation data and the transfer of driving data. When LOAD-P is high, the STB-P signal does not strobe the LEDs, so STB-P can be used to generate write control signals for the memory cells. Yet another feature of the first embodiment is that the driver ICs internally generate the write command signals that determine which memory cells receive which bits of compensation data. Thus the first embodiment can be practiced without providing any additional signal terminals in the LED head.

Next, a second embodiment of the invention will be described.

Figure 27:
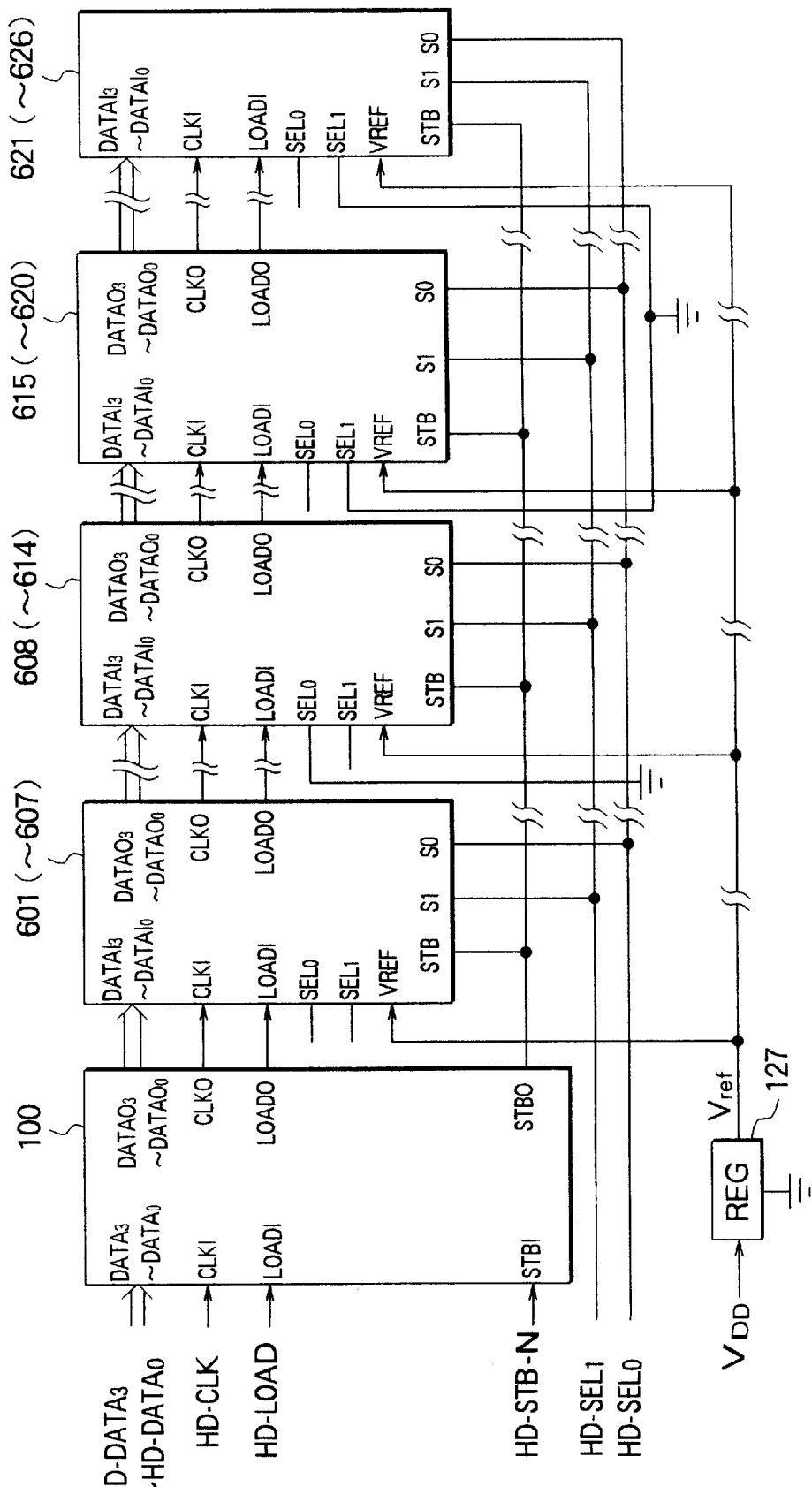
FIG. 27 is a block diagram illustrating the control IC and driver ICs in an LED head according to a second embodiment.

Referring to FIG. 27, in the second embodiment the control IC 100 containing the EEPROM controls twenty-six driver ICs 601 to 626 which are coupled in series as in the first embodiment. The driver ICs are divided into four blocks: a first block comprising driver ICs 601 to 607, a second block comprising driver ICs 608 to 614, a third block comprising driver ICs 615 to 620, and a fourth block comprising driver ICs 621 to 626. All of these driver ICs receive strobe signals from the control IC 100 and a reference voltage $V_{ref}$ from a regulator 127. FIG. 27 shows only the first driver IC in each block.

The driver ICs have selection signal input terminals $SEL_0$, $SEL_1$, S0 and S1. The $SEL_0$ input terminals of odd-numbered driver ICs as seen from the control IC 100 (driver ICs 601, 603, ..., 625) are left unconnected; the $SEL_0$ input terminals of the even-numbered driver ICs 602, 604, ..., 626 are coupled to ground. The $SEL_1$ input terminals of driver ICs 601 to 614 are left unconnected; the $SEL_1$ input terminals of driver ICs 615 to 626 are coupled to ground. Input terminals S0 and S1 of all the driver ICs 601 to 626 are coupled to a connector (not visible) on the LED head and receive signals HD-$SEL_0$ and HD-$SEL_1$, respectively.

Figure 28:
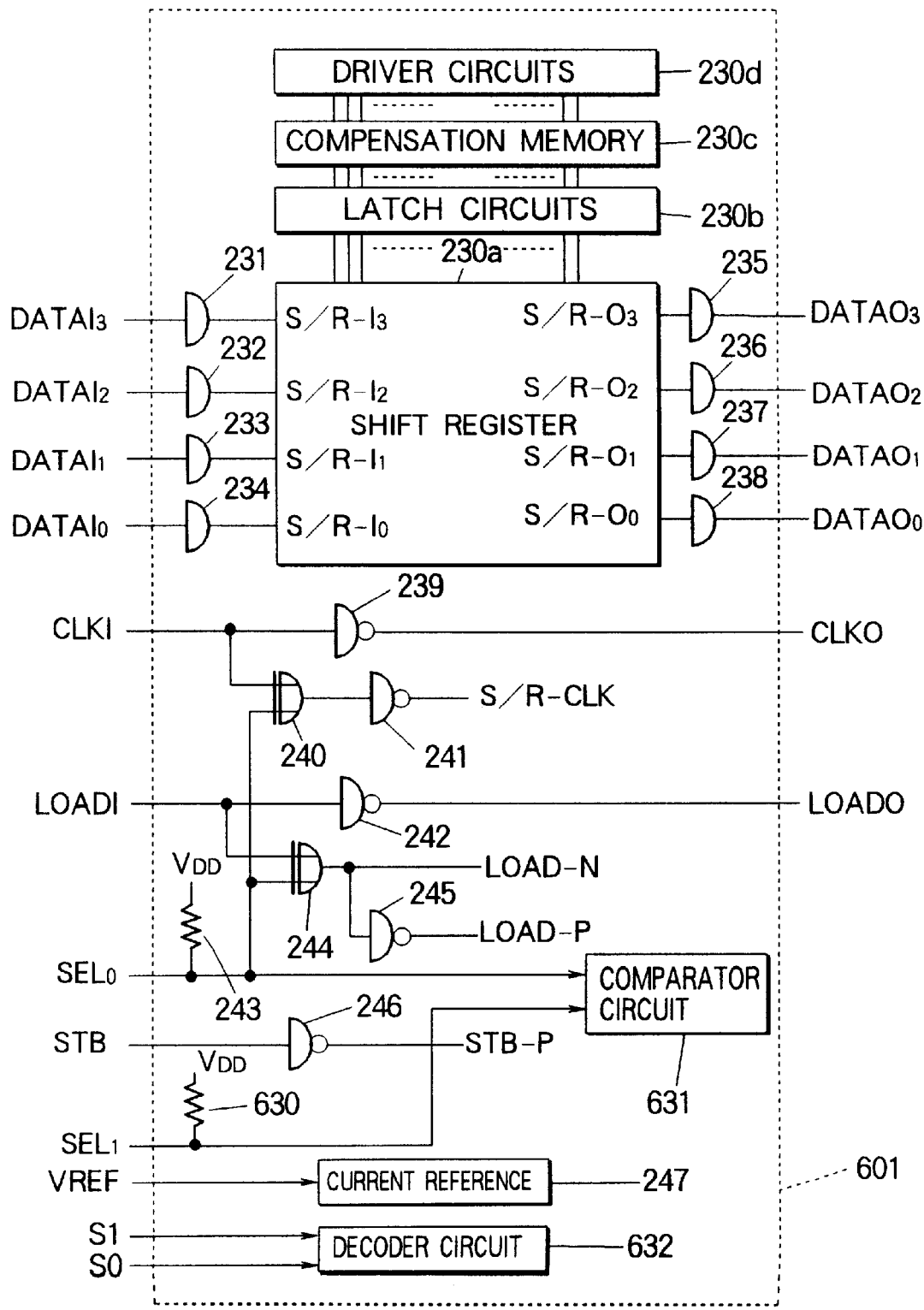
FIG. 28 is a block diagram illustrating the internal structure of the driver ICs in the second embodiment.

FIG. 28 shows the internal structure of the driver ICs in the second embodiment. Compared with the first embodiment, the timing generator (FIG. 22) and compensation bit position counter circuit (FIG. 23) that were used to control the writing of compensation data into the compensation memory circuits have been removed, the $SEL_1$, S1, and S0 terminals have been added, and a resistor 630, a comparator circuit 631, and a decoder circuit 632 have been added. Resistor 630 functions as a pull-up resistor for the SEL1 input. The $SEL_0$ input terminal has the same function as the SEL input terminal in the first embodiment.

Figure 29:
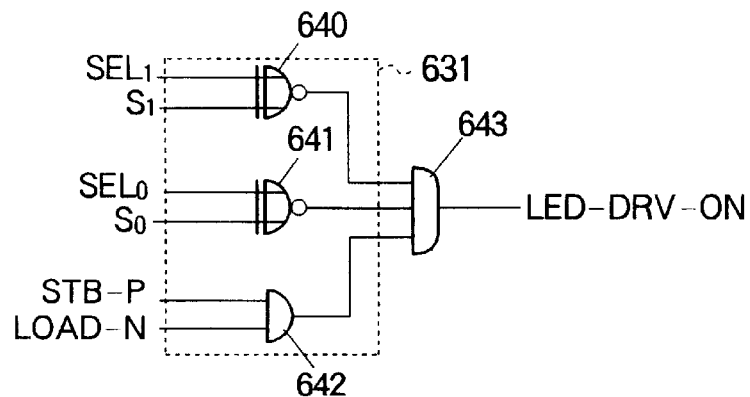
FIG. 29 is a circuit diagram showing an example of the configuration of the comparator circuit in FIG. 28.

FIG. 29 shows the structure of the comparator circuit 631, which comprises a pair of exclusive-NOR gates 640 and 641, and a pair of AND gates 642 and 643. Since $SEL_1$ and $SEL_0$ are grounded or left unconnected as described above, and since unconnected inputs are pulled up to the high or '1' state, the $SEL_1$ and $SEL_0$ inputs alternate between '11' and '10' in the first two blocks, and between '01' and '00' in the last two blocks. That is, the $SEL_1$ and $SEL_0$ values are '11' in driver IC 601, '10' in driver IC 602, '11' in driver IC 603, ..., '10' in driver IC 614, '01' in driver IC 615, '00' in driver IC 616, '01' in driver IC 617, ..., and '00' in driver IC 626. Exclusive-NOR gates 640 and 641 compare the $SEL_1$ and $SEL_0$ inputs with the S1 and S0 inputs from the printer controller. If both pairs of inputs match, and if the load signal is inactive (LOAD-N signal is high), then the strobe signal (STB-P) propagates through AND gates 642 and 643 to become the LED-DRV-ON signal. Otherwise, LED-DRV-ON is inactive (low). As a result, although STB-P is supplied to all driver ICs 101 to 126, LED-DRV-ON is produced in only one group of driver ICs, determined by the combination of signals S1 and S0. This arrangement prevents all LEDs in the LED head from turning on simultaneously, even when a solid horizontal line of dots is printed.

Figure 30:
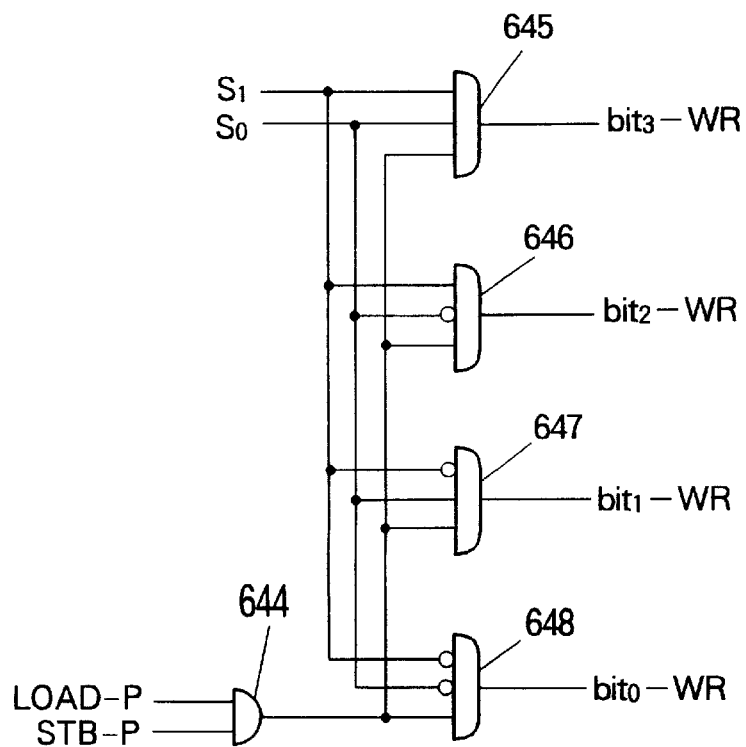
FIG. 30 is a circuit diagram showing an example of the configuration of the decoder circuit in FIG. 28.

FIG. 30 illustrates the decoder circuit 632, which comprises AND gates 644 to 648. AND gate 644 generates a high output signal when LOAD-P and STB-P are both active (high). When the output of AND gate 644 is high, AND gates 645 to 648 decode S1 and S0 to activate one of the four write control signals $bit_3$-WR to $bit_0$-WR. The S1 and S0 signals thus provide bit position information, which in the first embodiment was generated internally in the driver ICs.

Figure 31:
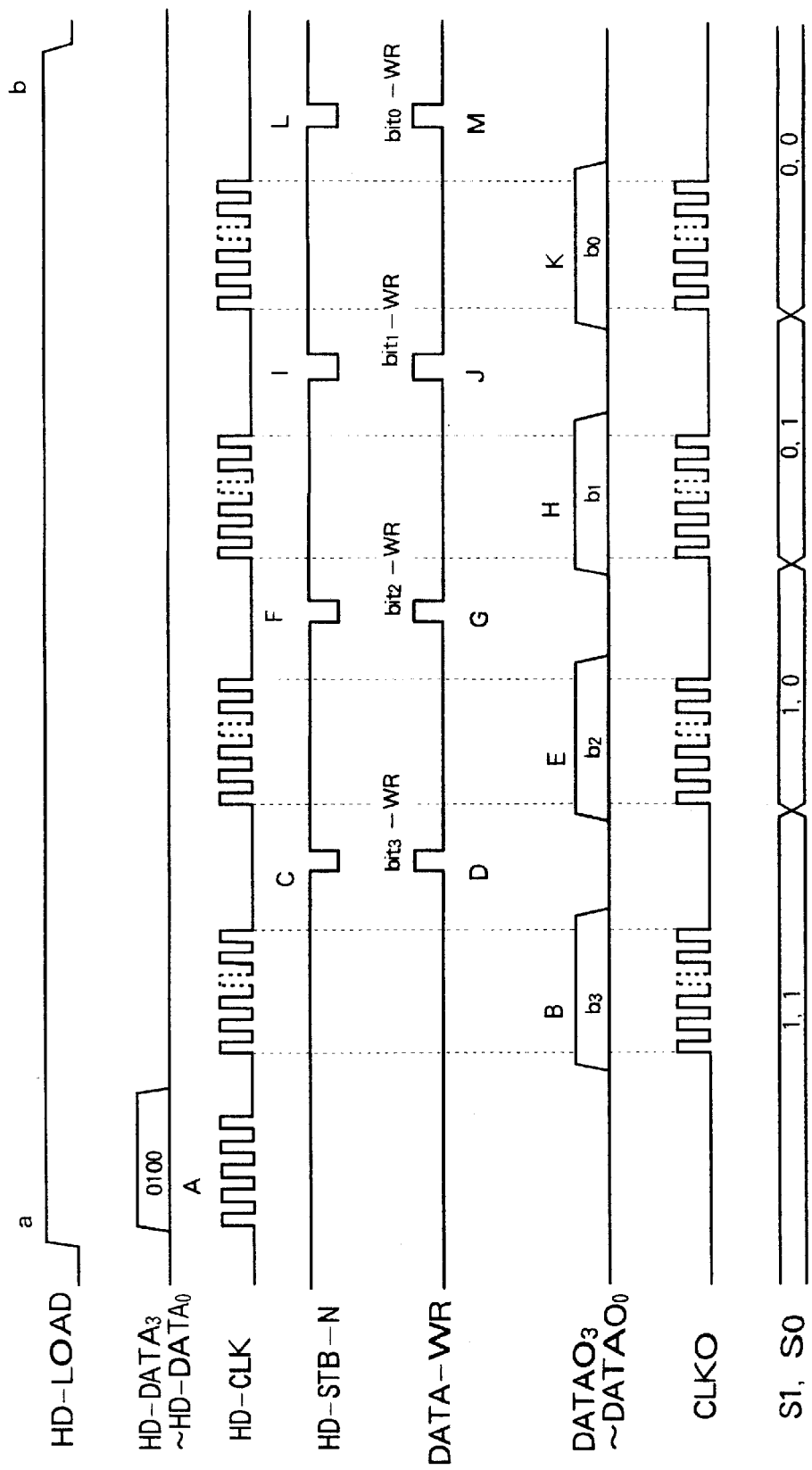
FIG. 31 is a timing diagram illustrating the transfer of compensation data from the non-volatile memory to the driver ICs in the second embodiment.

Compensation data stored in the EEPROM 100e are transferred to the driver ICs 601 to 626 as illustrated in the timing diagram in FIG. 31. The letters A to M match the letters used in FIG. 25. As in the first embodiment, the printer controller begins by driving HD-LOAD to the high level (a) and sending the '0100' command to select the transfer mode (A).

Next the most significant bits ($b_3$) of compensation data are transferred and stored. The S1 and S0 signals are both held high ('1') during this operation. First, the compensation bits ($b_3$) are transferred into the shift registers in the driver ICs (B). Then HD-STB-N is driven low (C), causing the decoder circuit 632 in each driver IC to activate the $bit_3$-WR signal (D), and the compensation bits are written into the appropriate memory cells.

Next, the printer controller changes S0 to '0' and transfers the next bits ($b_2$) of compensation data (E). This time, when HD-STB-N goes low (F), the decoder circuit 632 in each driver IC activates the $bit_2$-WR signal (G), selecting different memory cells to store these compensation data.

The next bits ($b_1$) of compensation data are transferred and stored in a similar manner (H, I, J), with S1 and S0 set to '01.' The least significant bits ($b_0$) are likewise transferred and stored (K, L, M), with S1 and S0 set to '00.'

Figure 32:
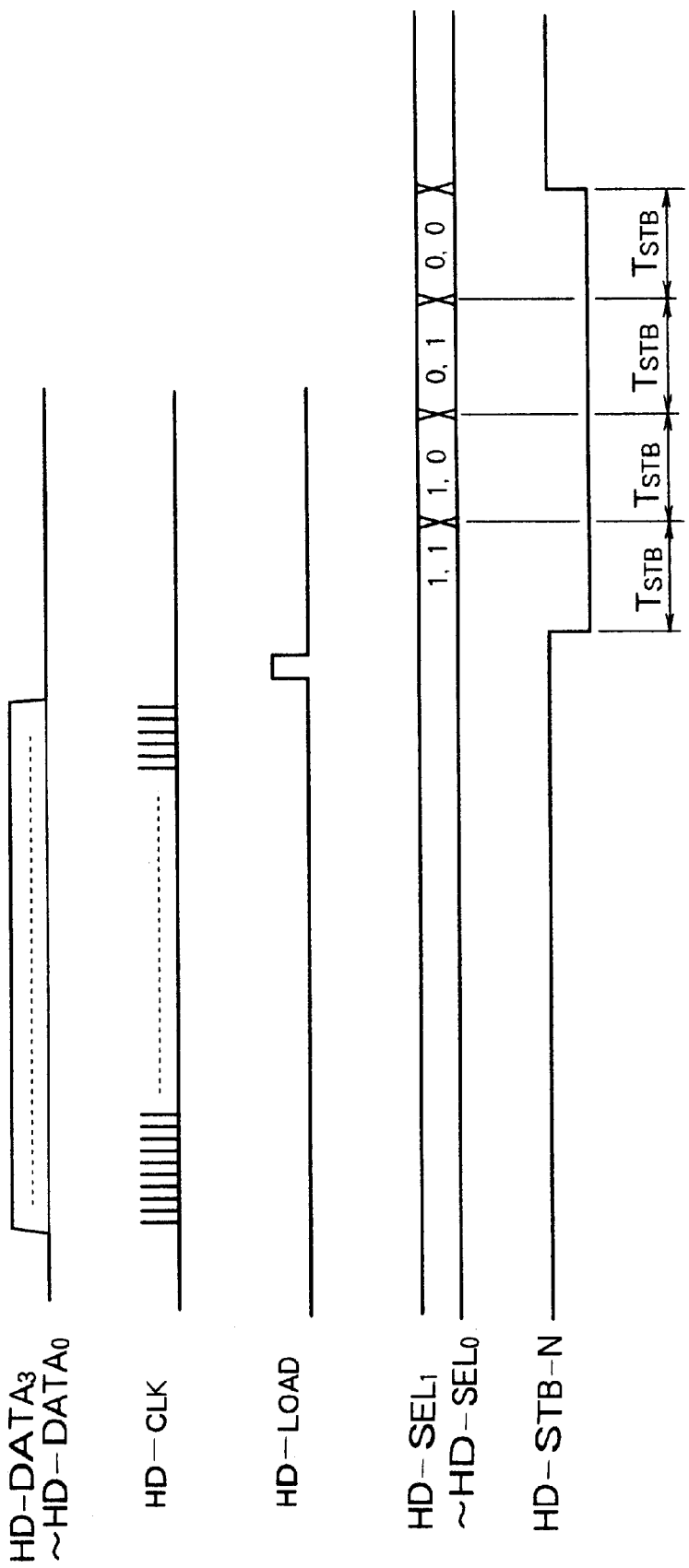
FIG. 32 is a timing diagram illustrating printing operations in the second embodiment.

During printing, driving data are transferred and printed as illustrated by the timing diagram in FIG. 32. The driving data are transferred on signal lines HD-$DATA_3$ to HD-$DATA_0$ and latched in synchronization with the HD-LOAD signal, as in the first embodiment and prior art. Next HD-STB-N is driven low (thus STB-P high), and the S1 and S0 signals are cycled through the four values '11,' '10,' '01,' and '00.' When S1 and S0 are '11,' the comparator circuits 631 in the odd-numbered driver ICs 601, 603, ..., 613 in the first and second blocks generate active LD-DRV-ON signals. When S1 and S0 are '10,' the comparator circuits 631 in the even-numbered driver ICs 602, 604, ..., 614 in the first and second blocks generate active LD-DRV-ON signals. When S1 and S0 are '01,' the comparator circuits 631 in the odd-numbered driver ICs 615, 617, ..., 625 in the third and fourth blocks generate active LD-DRV-ON signals. When S1 and S0 are '00,' the comparator circuits 631 in the even-numbered driver ICs 616, 618, ..., 626 in the third and fourth blocks generate active LD-DRV-ON signals.

Differing from the first embodiment, the second embodiment requires the LED head to receive two additional external signals (S1 and S0). These signals, however, are used for two purposes: to discriminate among different bits of compensation data, thereby eliminating the need for the counter circuit of FIG. 23 in each driver IC; and to stagger the firing of the LEDs, thereby reducing the peak LED current drain and alleviating the problem of switching noise.

Next a third embodiment will be described.

The preceding embodiments compensated for variations in optical output of the individual LEDs in sixteen steps. If ΔP is the size of one step, the total compensation range is 15ΔP. If ΔP is small enough to provide accurate compensation for the dot-to-dot variations in each LED array chip, then 15ΔP may not be large enough to compensate adequately for the chip-to-chip variations.

The third embodiment accordingly adds chip compensation means to the dot compensation means provided by the first embodiment. The description of the third embodiment will be confined to the parts related to chip compensation. Other parts are the same as in the first embodiment and, where illustrated, will be identified by the same reference numerals.

Figure 33:
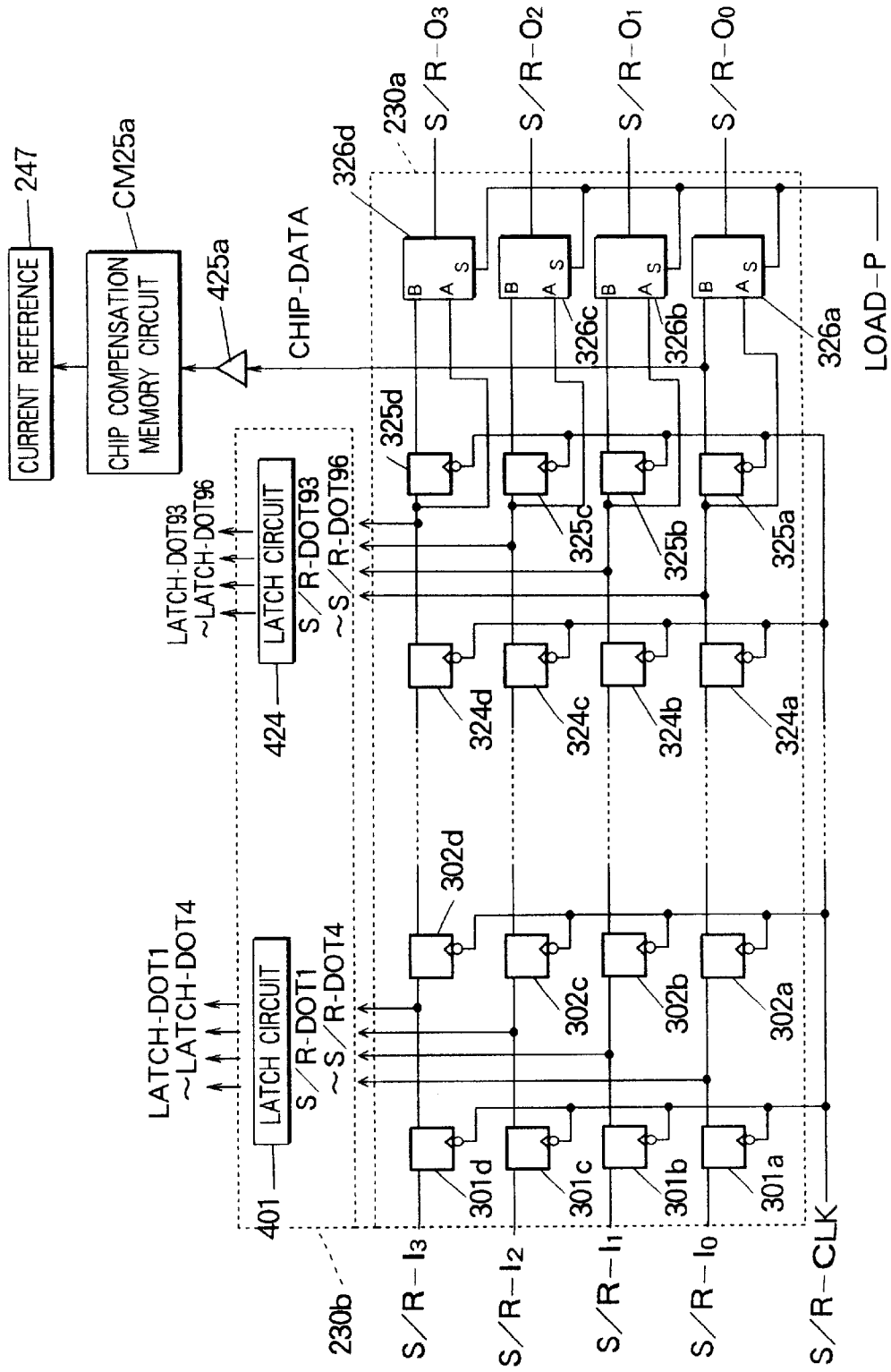
FIG. 33 illustrates the shift register and latch circuits in the driver ICs according to a third embodiment.

FIG. 33 shows the interconnections of the shift register 230a and the group of latch circuits 230b in the third embodiment. The shift register 230a comprises twenty-five stages of flip-flop circuits 301a to 301d, 302a to 302d, ..., 324a to 324d, 325a to 325d, instead of the twenty-four stages of the first embodiment.

The output of flip flop circuit 325*a* comprises the means for generating the control voltages responsive to the chip compensation data stored in the chip compensation memory CM25*a*.

The group of compensation memory circuits 230*c* comprises the same compensation memory circuits CM1*a* to CM24*d* (not visible) as in the first embodiment, and an additional chip compensation memory circuit CM25*a* for storing chip compensation data. The output of flip-flop circuit 325*a* is supplied through a buffer circuit 425*a* to this chip compensation memory circuit CM25*a*. The data stored in the chip compensation memory circuit CM25*a* are supplied to the current reference circuit 247, for adjusting the voltage value of Vcontrol. This voltage Vcontrol is supplied to the driving circuits that drive the LEDs as in the first embodiment (FIG. 20).

The outputs of the last two stages of flip-flop circuits 324*a* to 324*d* and 325*a* to 325*d* are supplied to a bypassing circuit comprising four selectors 326*a* to 326*d*, which are controlled by the LOAD-P signal. When LOAD-P is high, selectors 326*a* to 326*d* select the outputs of flip-flop circuits 325*a* to 325*d* in the twenty-fifth stage. When LOAD-P is low, selectors 326*a* to 326*d* select the outputs of flip-flop circuits 324*a* to 324*d* in the twenty-fourth stage. The signals selected and output by selectors 326*a* to 326*d* become the S/R-$O_0$ to S/R-$O_3$ signals.

Flip-flop circuits 325*b* to 325*d* are provided so that when compensation data are shifted through the shift register 230*a*, all four parallel bits can be shifted with the same timing. This timing is produced by the S/R-CLK signal, which is supplied to the clock input terminals of all the flip-flop circuits in the shift register 230*a*.

The outputs of the flip-flop circuits in the first twenty-four stages of the shift register 230*a* are latched in latch circuits 401 to 424 as in the first embodiment. The latch outputs, designated LATCH-DOT1 to LATCH-DOT96, are employed as in the first embodiment. The chip compensation data output by flip-flop circuit 325*a* are denoted CHIP-DATA in the drawings.

Figure 34:
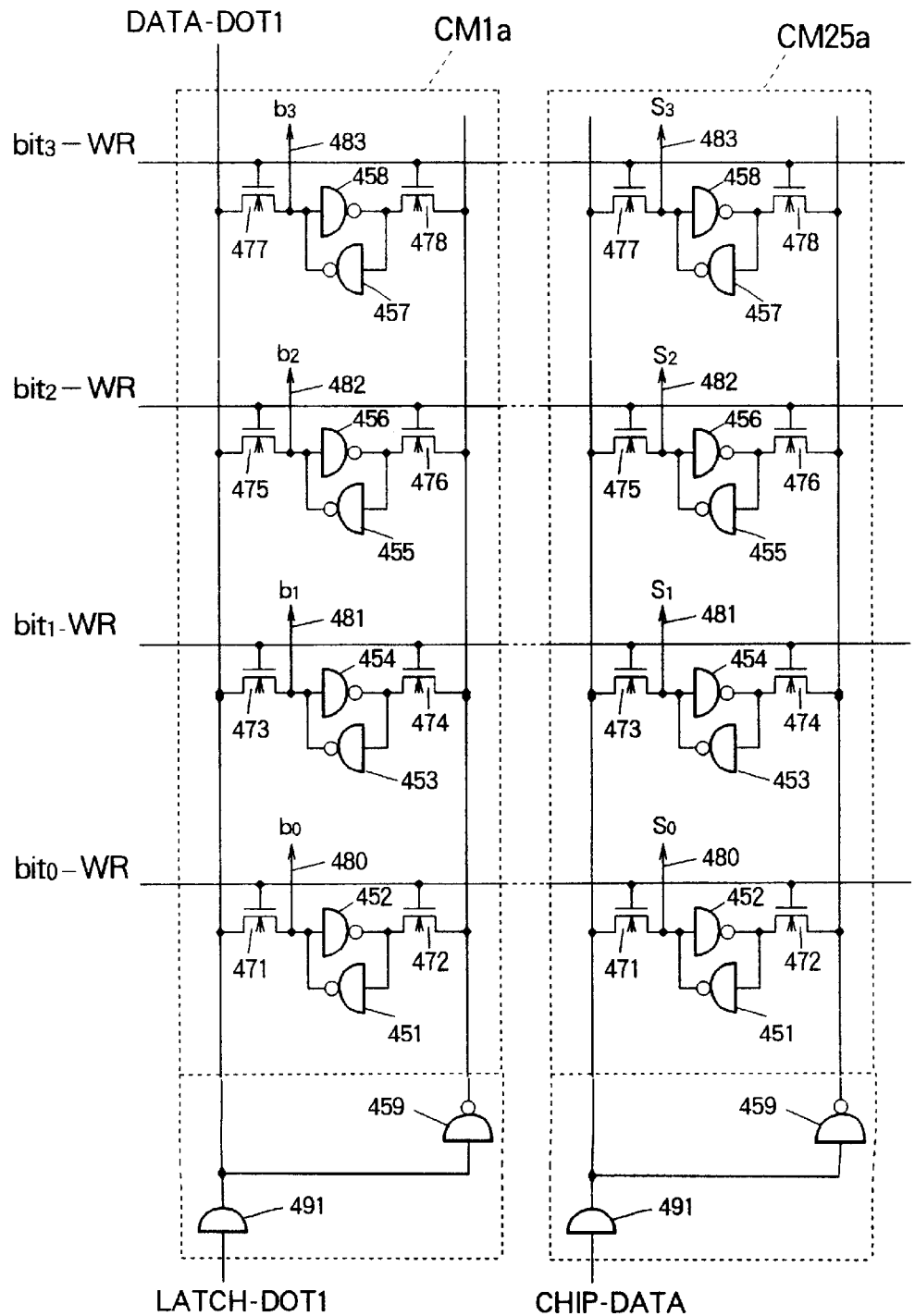
FIG. 34 is a circuit diagram illustrating two compensation memory circuits in the third embodiment.

FIG. 34 illustrates compensation memory circuits CM1*a* and CM25*a*. Both compensation memory circuits have the same structure, which was described in FIG. 18. Compensation memory circuits CM1*b* to CM24*d* also have this structure. The outputs of the memory cells in the chip compensation memory circuit CM25*a* are denoted $S_0$ to $S_3$, to distinguish them from the outputs $b_0$ to $b_3$ of the other compensation memory circuits, but the chip compensation memory circuit CM25*a* is coupled to the same control signal lines $bit_0$-WR to $bit_3$-WR as the other compensation memory circuits, and stores data at the same write timing.

Compensation data are stored in the compensation memory circuits at power-up, for example, and are retained until power is switched off. During printing operations, the shift register 230*a* transfers driving data, which are combined with the compensation data stored in the compensation memory circuits to control the current supplied by the driving circuits to the LEDs.

Figure 35:
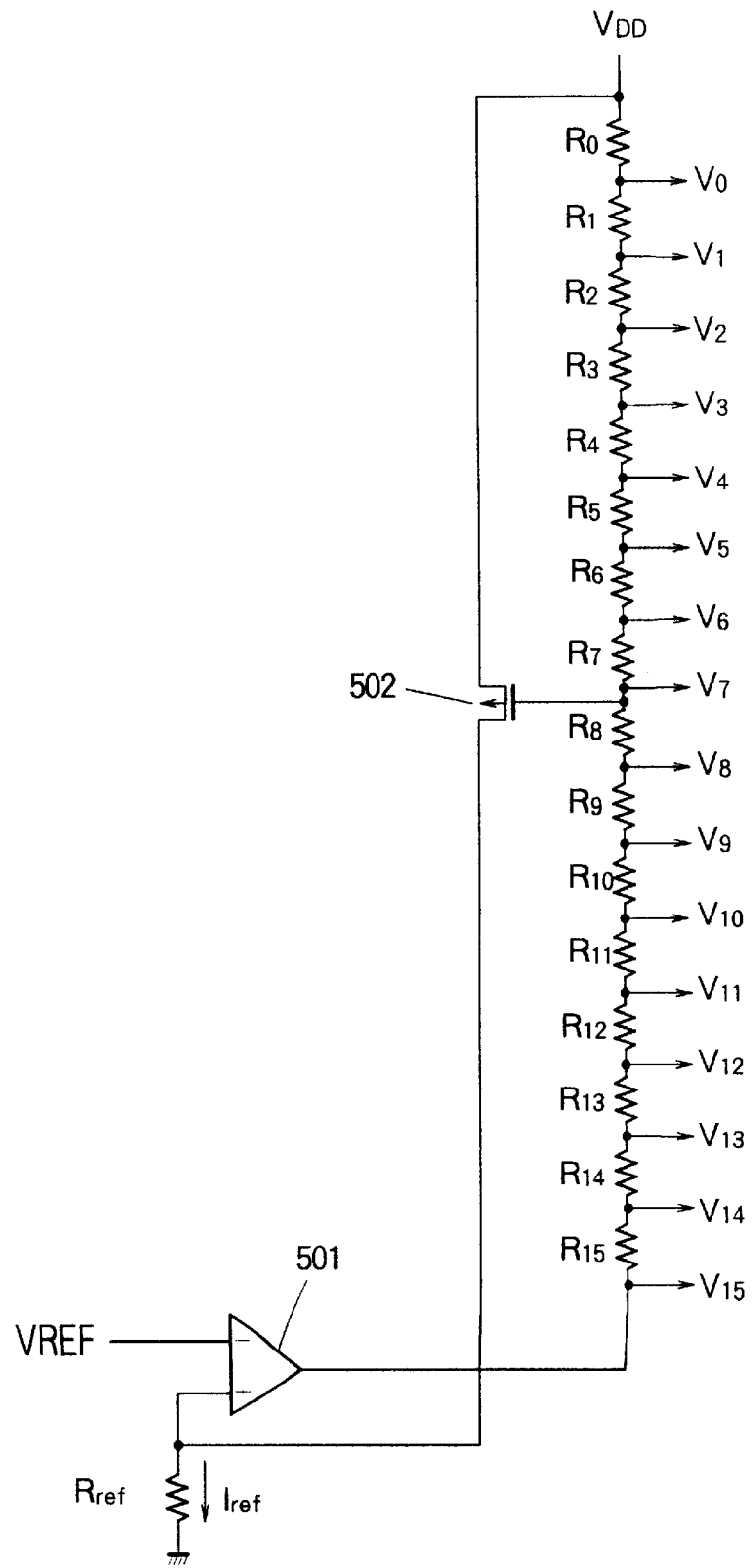
FIG. 35 is a circuit diagram illustrating part of the current reference circuit in the third embodiment.

FIG. 35 shows part of the current reference circuit 247. As in the first embodiment, the inverting input terminal (−) of the operational amplifier 501 is coupled to the VREF input terminal of the driver IC 101, which receives the voltage $V_{ref}$ generated by the regulator 127, and the non-inverting input terminal (+) is coupled through p-channel MOS transistor 502 to the power supply ($V_{DD}$) and through resistor $R_{ref}$ to ground. The output terminal of the operational amplifier 501, however, is now coupled to one end of a resistor ladder comprising sixteen resistors $R_0$ to $R_{15}$. The other end of this resistor ladder is coupled to the power supply ($V_{DD}$). The resistor ladder divides the potential difference between $V_{DD}$ and the voltage output by the operational amplifier 501 to produce sixteen output voltages $V_0$ to $V_{15}$ at nodes adjacent to the corresponding resistors.

The gate terminal of p-channel MOS transistor 502 is now coupled to the output terminal of the operational amplifier 501 through part of the resistor ladder. Specifically, the gate terminal of transistor 502 is coupled to the output terminal of the operational amplifier 501 through the center node of the resistor ladder, and receives voltage $V_7$. The operational amplifier 501 again operates so as to equalize the input voltages at the inverting (−) and non-inverting (+) input terminals. The current $I_{ref}$ flowing through transistor 502 and resistor $R_{ref}$ is therefore given by the same equation as in the first embodiment:

$$I_{ref}=V_{ref}/R_{ref}$$

The resistance offered by transistor 502 is determined by its gate voltage $V_7$. If the voltage $V_{ref}$ at input terminal VREF rises, the output of operational amplifier 501 falls, causing a reduction in the gate voltage $V_7$ of transistor 502, hence an increase in the gate-source voltage $V_{DD}-V_7$, this leading to an increase in the current $I_{ref}$ which preserves the relation given by the equation above.

Figure 36:
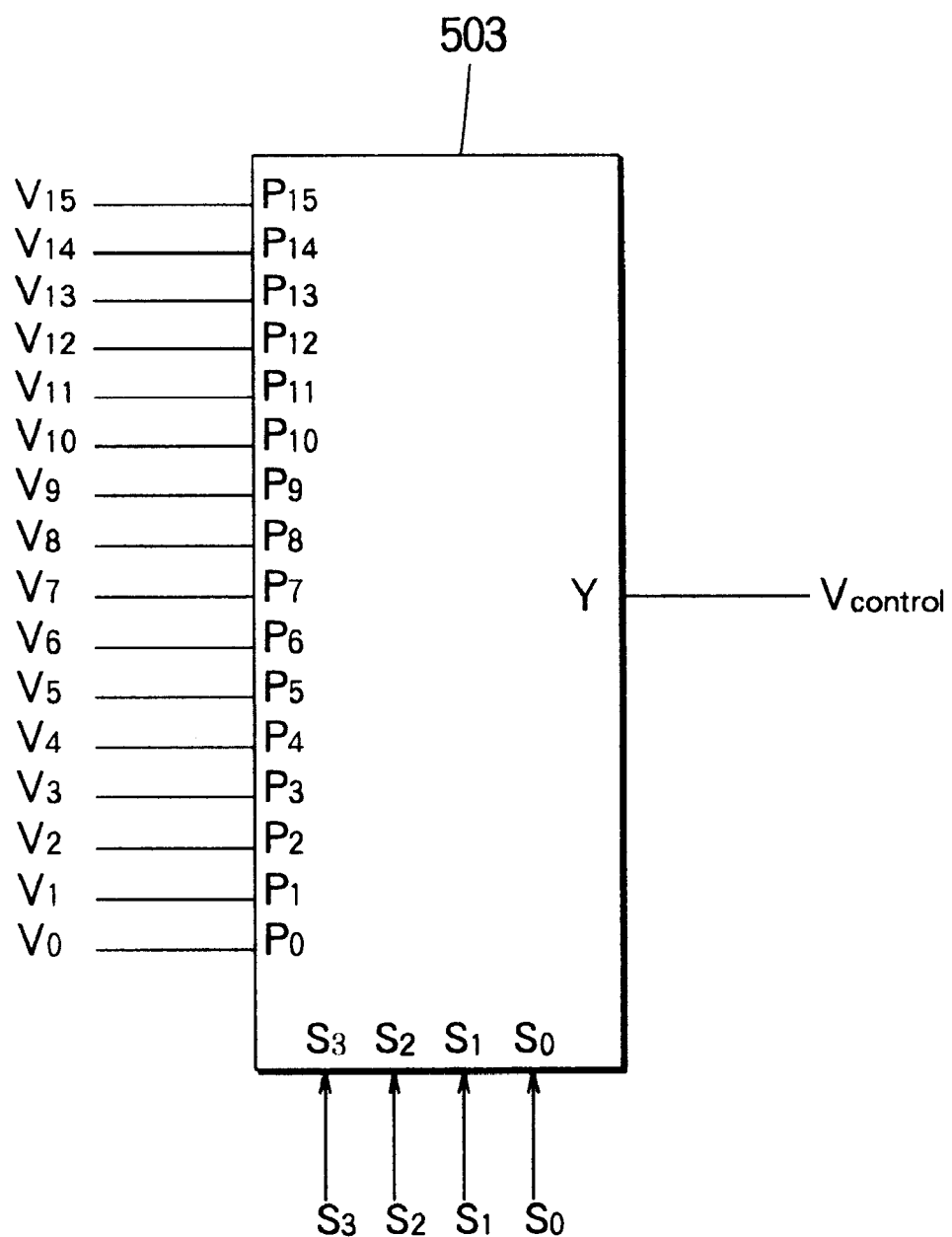
FIG. 36 is a circuit diagram illustrating another part of the current reference circuit in the third embodiment.

FIG. 36 shows another part of the current reference circuit 247, this other part being a selector circuit 503 that receives the voltages $V_0$ to $V_{15}$ output from the resistor ladder in FIG. 35 at sixteen input terminals $P_0$ to $P_{15}$, and receives the chip compensation data $S_0$ to $S_3$ stored in compensation memory circuit CM25*a* (FIG. 34) at four more input terminals, also denoted $S_0$ to $S_3$. Responding to inputs $S_0$ to $S_3$, the selector circuit 503 selects the voltage input at one of the sixteen terminals $P_0$ to $P_{15}$, and outputs the selected voltage as Vcontrol.

As was shown in FIG. 20, Vcontrol is supplied as a source potential to transistors 515 to 519, and a voltage substantially equal to Vcontrol is supplied to the gates of driving transistors 520 to 524 when transistors 515 to 519 are switched on. By adjusting Vcontrol, the chip compensation data $S_0$ to $S_3$ provide for a sixteen-step adjustment of all the drive currents output by the driver IC. This adjustment is used to compensate for chip-to-chip differences.

FIG. 37 is an address map showing how the compensation data are stored in the EEPROM 100*e*. Each row in FIG. 37 represents a four-bit word of compensation data. Row addresses are indicated in hexadecimal notation at the left of the drawing. The total capacity of the EEPROM 100*e* is four thousand ninety-six words, of which two thousand four hundred ninety-six words are used for storing dot compensation data, which adjust the drive currents of individual LEDs. The first bit of dot compensation data, for example, is identified as dot2496 bit3. An additional one hundred four words are used to store one hundred four bits of chip compensation data (four bits for each of twenty-six chips). The first bit of chip compensation data, for example, is identified as chip26 bit3; this bit will be stored as bit $S_3$ in compensation memory circuit CM25*a* of driver IC 126.

The chip compensation data are stored in the rightmost (least significant) bit positions of the corresponding words; the other bit positions are unused. The last one thousand four hundred ninety-six words of the EEPROM 100*e* are also unused.

Figure 38:
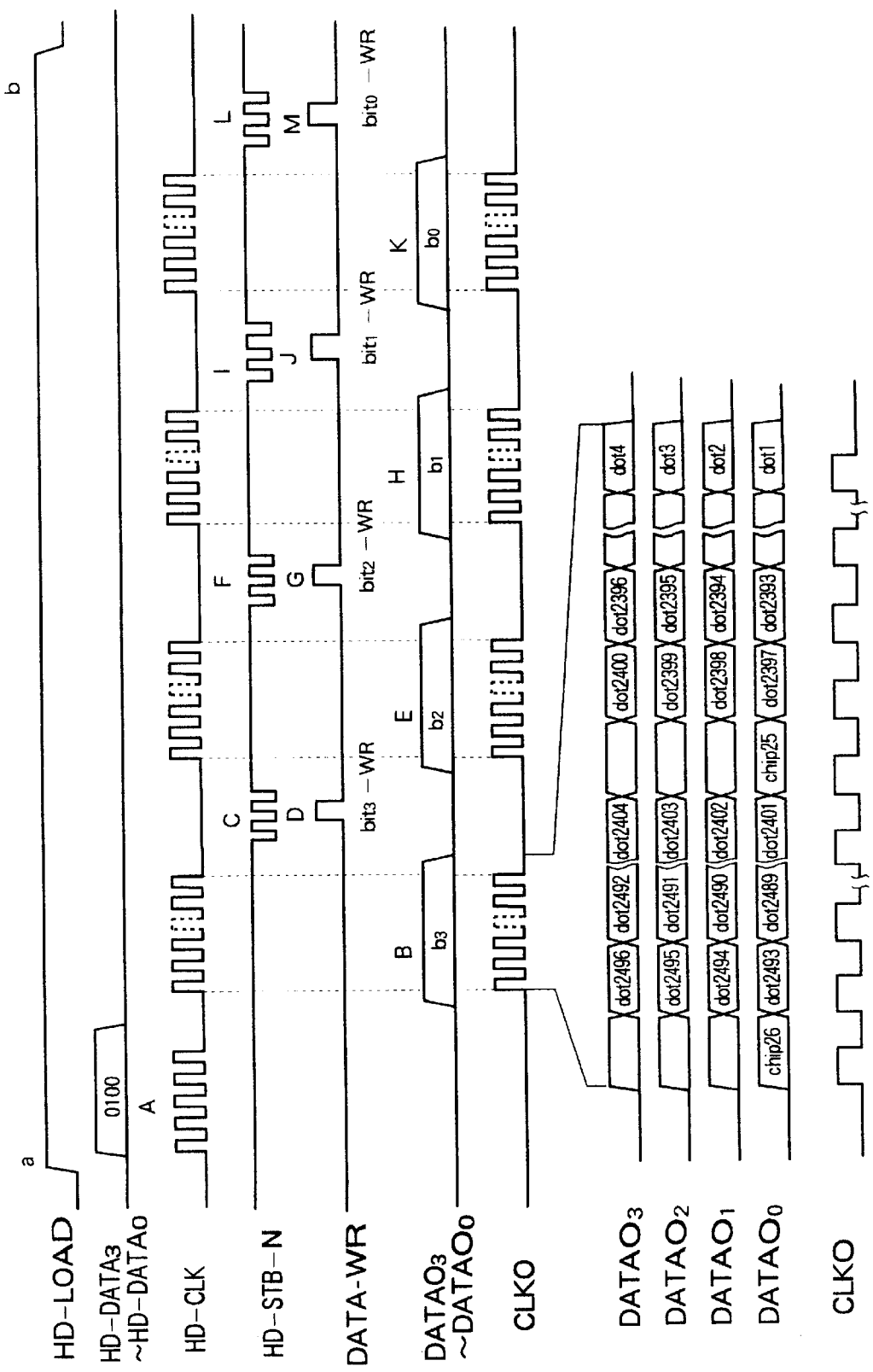
FIG. 38 is a timing diagram illustrating the transfer of compensation data from the non-volatile memory to the driver ICs in the third embodiment.

The data in FIG. 37 are transferred to and stored in the driver ICs as illustrated by the timing diagram in FIG. 38. Before printing begins, the printer controller activates the HD-LOAD signal (a) and sends the transfer mode command '0100' (A). The transfer operation proceeds as described in FIG. 25, except that extra HD-CLK clock cycles are provided to transfer the chip compensation data.

As shown at the bottom of FIG. 38, first (B) the most significant bits are transferred, starting with the bit identified as chip26 bit3 in FIG. 37, and ending with dot1 bit3. These bits are identified simply as chip26 and dot1 in FIG. 38. The bit identified as chip26 is transferred to driver IC 126; the bit identified as chip25 is transferred to driver IC 125; other bits of chip compensation data are similarly transferred to the corresponding driver ICs.

During the transfer, since HD-LOAD is high, the LOAD-P signal in each driver IC is high, and the selectors 326a to 326d select the outputs of flip-flop circuits 325a to 325d. Each shift register 230a thus has the necessary length (twenty-five stages) for transferring both the dot compensation data and the chip compensation data.

When the last four bits (dot4 to dot1) have been transferred, HD-STB-N pulses are sent (C), producing a bit$_3$-WR pulse (D) that stores all the transferred data into the appropriate memory cells in the compensation memory circuits CM1a, . . . , CM24d, CM25a of the driver ICs.

The other bits of compensation data are transferred in a similar fashion (E–M). At the end of the operation, four bits of dot compensation data have been stored for each LED, together with four bits of chip compensation data for each driver IC. At this point the printer controller returns HD-LOAD to the low logic level (b), in preparation for transferring the driving data that will be printed.

During the transfer of driving data, the HD-LOAD signal is low, so LOAD-P is low, and the selectors 326a to 326d select the outputs of flip-flop circuits 324a to 324d. Each shift register 230a thus operates with only twenty-four stages, enabling the driving data to be transferred in the same way as in the first embodiment.

The third embodiment thus provides a switching means for increasing the number of stages in the shift registers 230a when compensation data are transferred, as compared with the transfer of driving data for printing. This means (the selectors 326a to 326d) enables the same shift registers 230a to be used for the transfer of both compensation data and dot printing data, even though the former have more bits than the latter.

By providing a means of compensating for chip-to-chip variations, the third embodiment also enables the head fabrication process to be simplified, in that it is no longer necessary to grade the driver ICs and LED array chips according to their average electrical or optical output (or according to some equivalent value such as the value midway between the maximum and minimum output) and attempt to match like chips, or to find pairs of driver ICs and LED array chips that will produce like optical outputs.

A further advantage of the third embodiment is that finer chip-to-chip adjustment can be achieved than is possible through grading and matching. The third embodiment provided sixteen steps of chip-to-chip compensation, but more steps could be provided by using additional bits of chip compensation data.

Use of the operational amplifier and resistor ladder in FIG. 35 to generate the control voltages for chip-to-chip compensation has the advantage of requiring only a single external reference voltage ($V_{ref}$), and provides a simple method of compensating accurately for quite large chip-to-chip variations, as the operational amplifier can control the current $I_{ref}$ in FIG. 35 over a wide variable range.

It is not necessary for the gate of transistor 502 to be coupled to the output terminal of the operational amplifier 501 through the center node of the resistor ladder. The gate of transistor 502 could be coupled to another node: to the node below resistor $R_{15}$, for example, in which case the transistor 502 and operational amplifier 501 would be coupled as in the first embodiment.

A fourth embodiment of the invention, which provides another configuration for the circuit that compensates for chip-to-chip variations, will be described next. The fourth embodiment differs from the third embodiment only in the internal structure of the current reference circuit 247.

Figure 39:
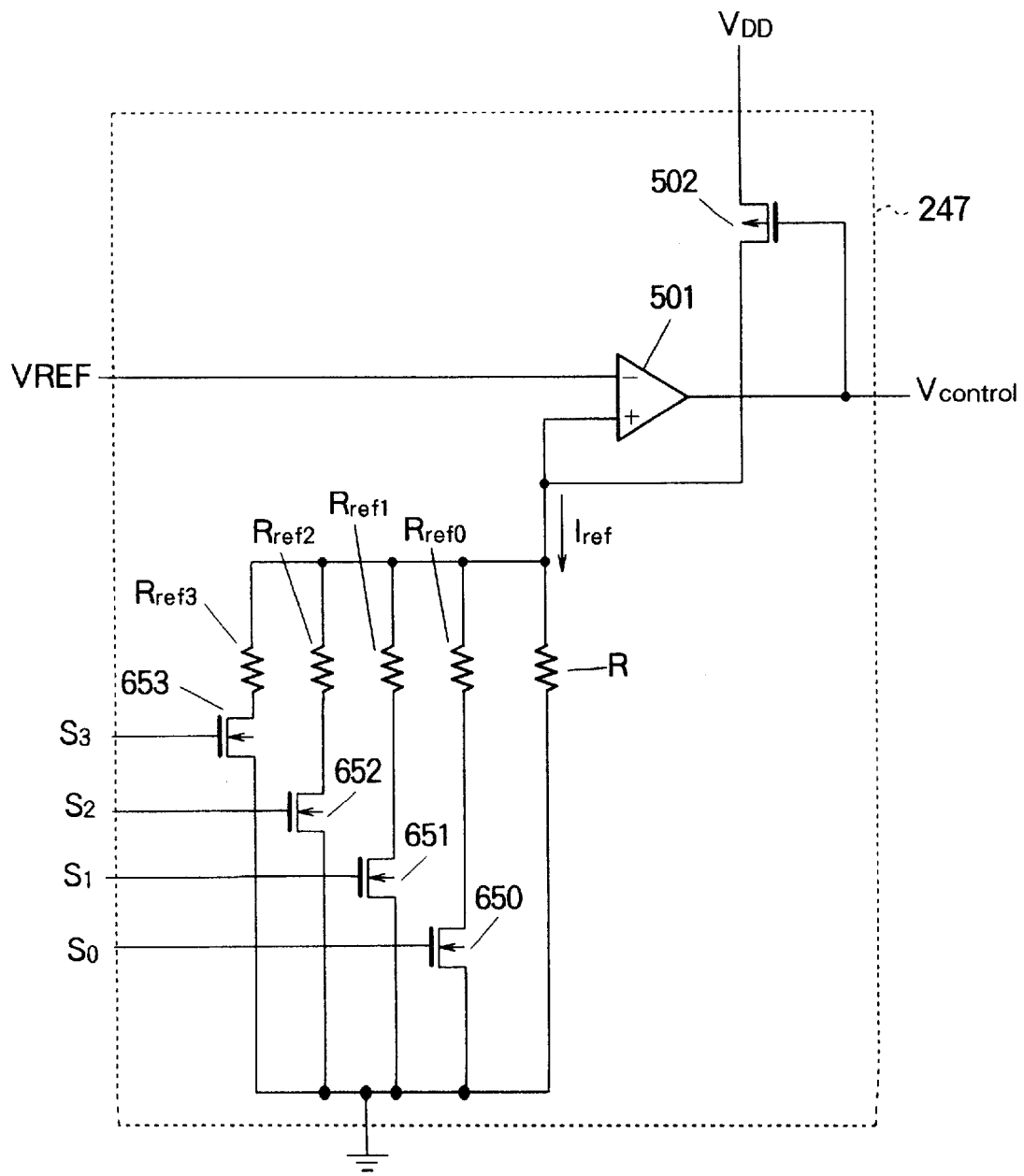
FIG. 39 is a circuit diagram illustrating the current reference circuit in a fourth embodiment.

FIG. 39 illustrates the current reference circuit 247 disposed in each driver IC in the fourth embodiment. The operational amplifier 501 and p-channel MOS transistor 502 are as in the first embodiment, but the non-inverting input terminal of the operational amplifier 501 and the drain terminal of the MOS transistor 502 are coupled to ground through a network comprising a main resistor R, compensation resistors $R_{ref0}$, $R_{ref1}$, $R_{ref2}$, and $R_{ref3}$, and n-channel MOS transistors 650 to 653. These resistors and transistors are integrated into the driver IC. The signals $S_0$ to $S_3$ applied to the gate terminals of transistors 650 to 653 are the outputs of the memory cells in compensation memory circuit CM25a in FIG. 34. The reference current $I_{ref}$ flowing through p-channel MOS transistor 502 is the sum of branch currents $I_{ref0}$ to $I_{ref3}$ flowing through resistors $R_{ref0}$ to $R_{ref3}$ and transistors 650 to 653, and the branch current I flowing through resistor R.

The operational amplifier 501 operates so that the non-inverting input terminal (+) is kept at the same potential $V_{ref}$ as the inverting input terminal (−). Transistors 650 to 653 conduct or fail to conduct depending on the logic levels of the chip compensation data signals $S_0$ to $S_3$. If these signals are all at the low ('0') logic level, for example, the reference current $I_{ref}$ is given by the following equation.

$$I_{ref}=V_{ref}/R=I$$

If chip compensation data $S_3$ to $S_1$ are '0' and $S_0$ is '1,' then the reference current $I_{ref}$ changes as follows.

$$I_{ref}=I+I_{ref0}=V_{ref}/R+V_{ref}/R_{ref0}$$

Similarly, if $S_3$ to $S_0$ are all '1,' the reference current $I_{ref}$ is given as follows:

$$\begin{aligned}I_{ref} &= I + I_{ref3} + I_{ref2} + I_{ref1} + I_{ref0} \\ &= V_{ref}/R + V_{ref}/R_{ref3} + V_{ref}/R_{ref2} \\ &\quad + V_{ref}/R_{ref1} + V_{ref}/R_{ref0}\end{aligned}$$

The resistance values of resistors $R_{ref3}$, $R_{ref2}$, and $R_{ref1}$, are weighted by factors of ⅛, ¼, and ½, respectively, with respect to $R_{ref0}$.

$$R_{ref3}=R_{ref0}/8$$

$$R_{ref2}=R_{ref0}/4$$

$$R_{ref1}=R_{ref0}/2$$

If $S_3$ to $S_0$ are treated as variables taking on values of zero and one, then the reference current $I_{ref}$ can be expressed as follows.

$$I_{ref} = V_{ref}/R + (8S_3 + 4S_2 + 2S_1 + S_0) \times V_{ref}/R_{ref0}$$

$$= V_{ref}/R + (2^3 S_3 + 2^2 S_2 + 2^1 S_1 + 2^0 S_0) \times V_{ref}/R_{ref0}$$

As this equation shows, the reference current $I_{ref}$ can be varied in sixteen steps from a minimum value of $V_{ref}/R$ to a maximum value of $V_{ref}/R+15V_{ref}/R_{ref0}$, with a step size of $V_{ref}/R_{ref0}$.

The fourth embodiment provides the same advantages as the third embodiment, but with fewer circuit elements, by using a weighted resistor network instead of a resistor ladder and selector.

Next, a fifth embodiment will be described.

In the preceding four embodiments, when the dot compensation data and chip compensation data stored in the EEPROM 100e are transferred to the driver ICs, the compensation data are written simultaneously into the memory cells in all the driver ICs. If the LED head has twenty-six driver ICs, each driving ninety-six LEDs, the total number of memory cells written to simultaneously is:

96×26=2496

If chip compensation data are added, the number of memory cells written to simultaneously is:

(96+1)×26=2522

With the memory cell structure shown in FIGS. 18 and 34, when the write trigger signal is activated, an initial transient current, associated with the inversion of data in the memory cells, flown on the power-supply and ground lines, generating a noise voltage. When several thousand memory cells are written to simultaneously, as above, the noise voltage can become too large to be ignored. The fifth embodiment addresses this problem by dividing the driver ICs into blocks and staggering the compensation data write timing so as to reduce the number of memory cells that are written to simultaneously.

Figure 40:
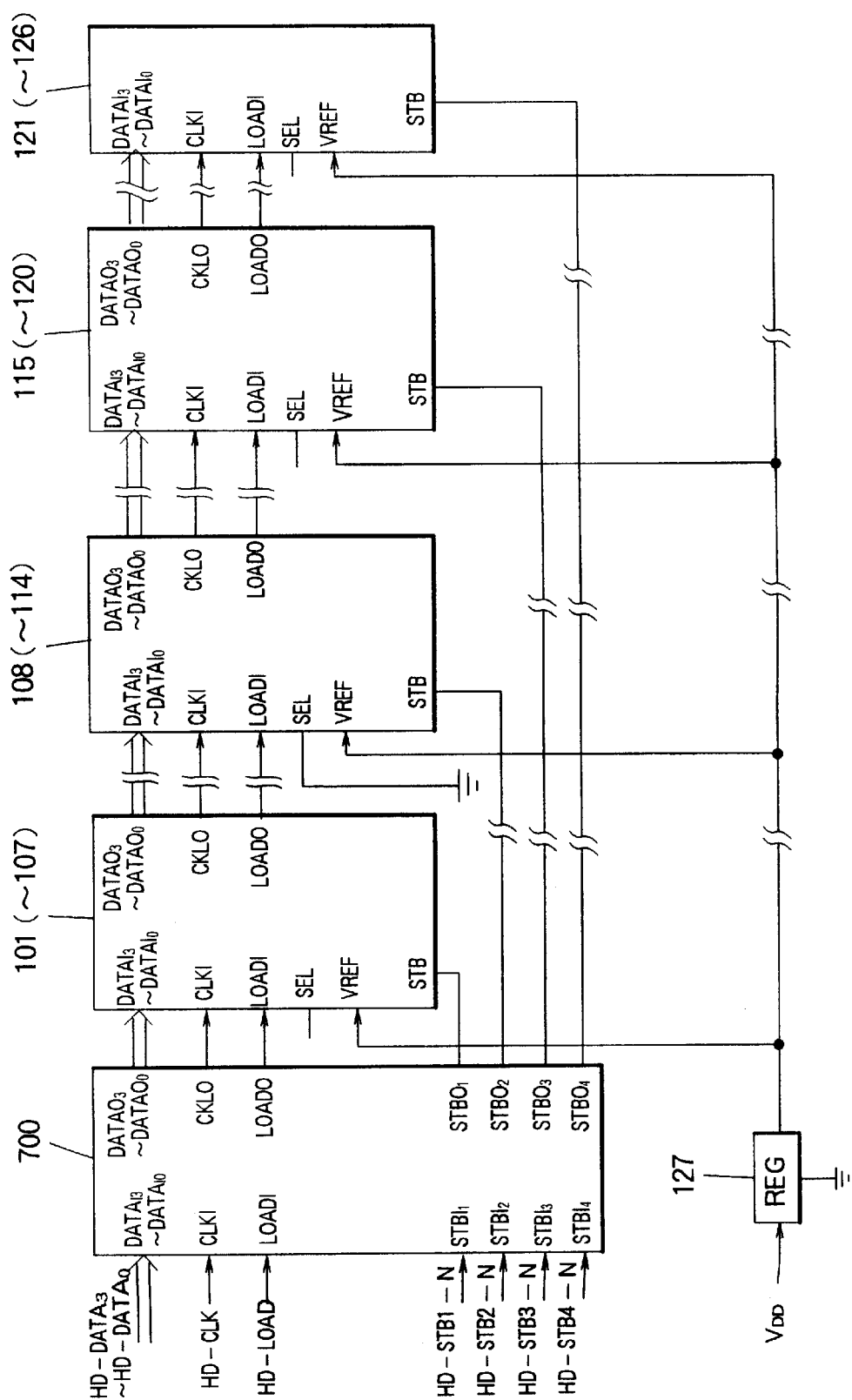
FIG. 40 is a block diagram illustrating the control IC and driver ICs in an LED head according to a fifth embodiment.

Referring to FIG. 40, the control IC 700 is generally similar to the control IC in the preceding embodiments, but has four strobe input terminals $STBI_1$ to $STBI_4$ and four strobe output terminals $STBO_1$ to $STBO_4$, instead of just one strobe input terminal and one strobe output terminal. Each strobe input terminal $STBI_n$ is coupled to the corresponding strobe output terminal $STBO_n$ (n=1 to 4).

The driver ICs 101 to 126 are the same as in the first embodiment, the SEL input terminals of odd-numbered driver ICs being left unconnected, and the SEL input terminals of even-numbered driver ICs being coupled to ground. As in the second embodiment, the driver ICs are divided into four blocks, driver ICs 101 to 107 constituting the first block, driver ICs 108 to 114 the second block, driver ICs 115 to 120 the third block, and driver ICs 121 to 126 the fourth block. FIG. 40 shows only the first driver IC in each block. All driver ICs 101 to 126 receive the reference voltage $V_{ref}$ output by the regulator 127.

The control IC 700 receives four strobe signals HD-STB1-N to HD-STB4-N from the printer controller (not visible), and supplies corresponding strobe signals from output terminals $STBO_1$ to $STBO_4$. Output terminal $STBO_1$ is coupled to the strobe input terminals STB of the driver ICs 101 to 107 in the first block. Output terminal $STBO_2$ is coupled to the strobe input terminals STB of the driver ICs 108 to 114 in the second block. Output terminal $STBO_3$ is coupled to the strobe input terminals STB of the driver ICs 115 to 120 in the third block. Output terminal $STBO_4$ is coupled to the strobe input terminals STB of the driver ICs 121 to 126 in the fourth block.

Figure 41:
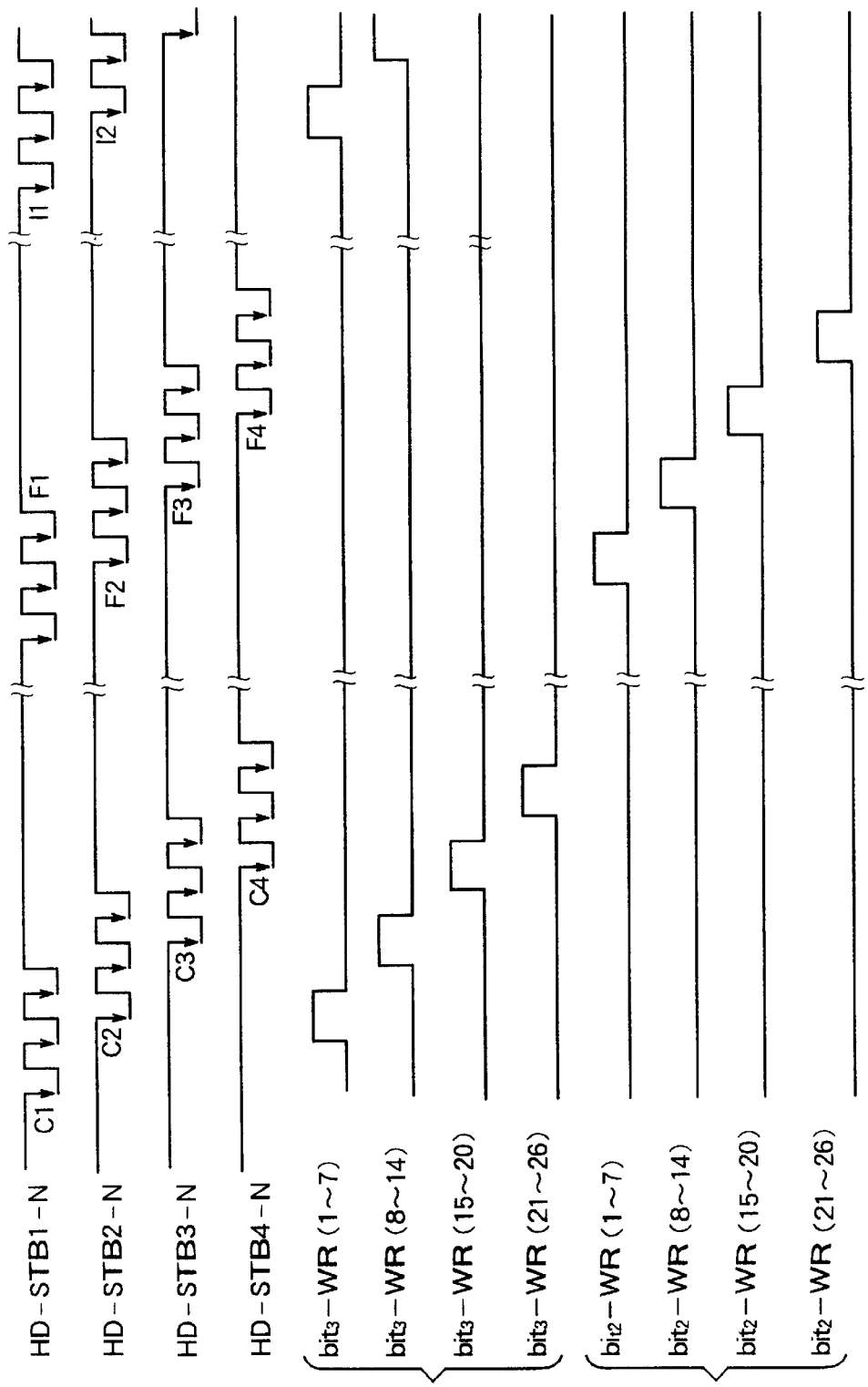
FIG. 41 is a timing diagram illustrating the writing of compensation data into the compensation memory circuits, after the transfer of the data from the control IC to the driver ICs in the fifth embodiment.

FIG. 41 illustrates the timing of the strobe signals HD-STB1-N to HD-STB4-N after the compensation data have been transferred into the shift registers of the driver ICs, and the timing of the resulting write control signals. This timing diagram corresponds, for example, to portions C, D, F, G, and part of I in FIG. 25, and illustrates the writing of the two most significant bits of compensation data.

When the most significant bits ($b_3$) have been transferred into the shift registers of all the driver ICs, the printer controller generates three HD-STB1-N pulses (C1), which propagate from output terminal $STBO_1$ of the control IC 700 to the driver ICs 101 to 107 in the first block and produce write control pulse signals denoted $bit_3$-WR (1–7). The most significant bits ($b_3$) of compensation data are thereby written into the appropriate memory cells in these seven driver ICs.

Halfway through this group of three HD-STB1-N pulses (after 1.5 pulses), the printer controller begins a series of three HD-STB2-N pulses (C2), which propagate from the $STBO_2$ output terminal to the driver ICs 108 to 114 in the second block, generating the indicated $bit_3$-WR (8–14) pulses that store the most significant bits of compensation data in the appropriate memory cells of these driver ICs.

HD-STB3-N and HD-STB4-N pulses are similarly generated at further intervals of 1.5 pulses, writing the most significant bits of compensation data into the driver ICs 115 to 126 in block three and block four.

The timing of the strobe signals is staggered by 1.5 pulses so that there will be no overlap between different groups of write control pulses, from $bit_3$-WR (1–7) to $bit_3$-WR (21–26). It is not strictly necessary to avoid such overlap, however; it suffices for the rising transitions of the write control pulses to be staggered.

The second bits ($b_2$) are then transferred and written into the memory cells in the same way (F1 to F4), the groups of write control signals now being $bit_2$-WR (1–7) to $bit_2$-WR (21–26).

Other aspects of the operation of the fifth embodiment can be understood from the preceding embodiments, so descriptions will be omitted.

The fifth embodiment divides the driver ICs into four blocks having substantially equal numbers (seven, seven, six, six) of driver ICs, and supplies a separate strobe signal (HD-STBn-N, n=1 to 4) to each block. By staggering these strobe signals during the writing of compensation data into the memory cells of the driver ICs, the number of memory cells written to simultaneously is reduced by a factor of substantially four, greatly reducing the amount of transient noise generated on power supply and ground lines. The strobe signals can also be staggered during printing, to stagger the firing of the LEDs, as in the second embodiment.

Next, a sixth embodiment will be described with reference to FIGS. 42 and 43. The sixth embodiment is similar to the third embodiment, but modifies the configuration of the current reference circuit 247 that was illustrated in FIGS. 35 and 36.

Figure 42:
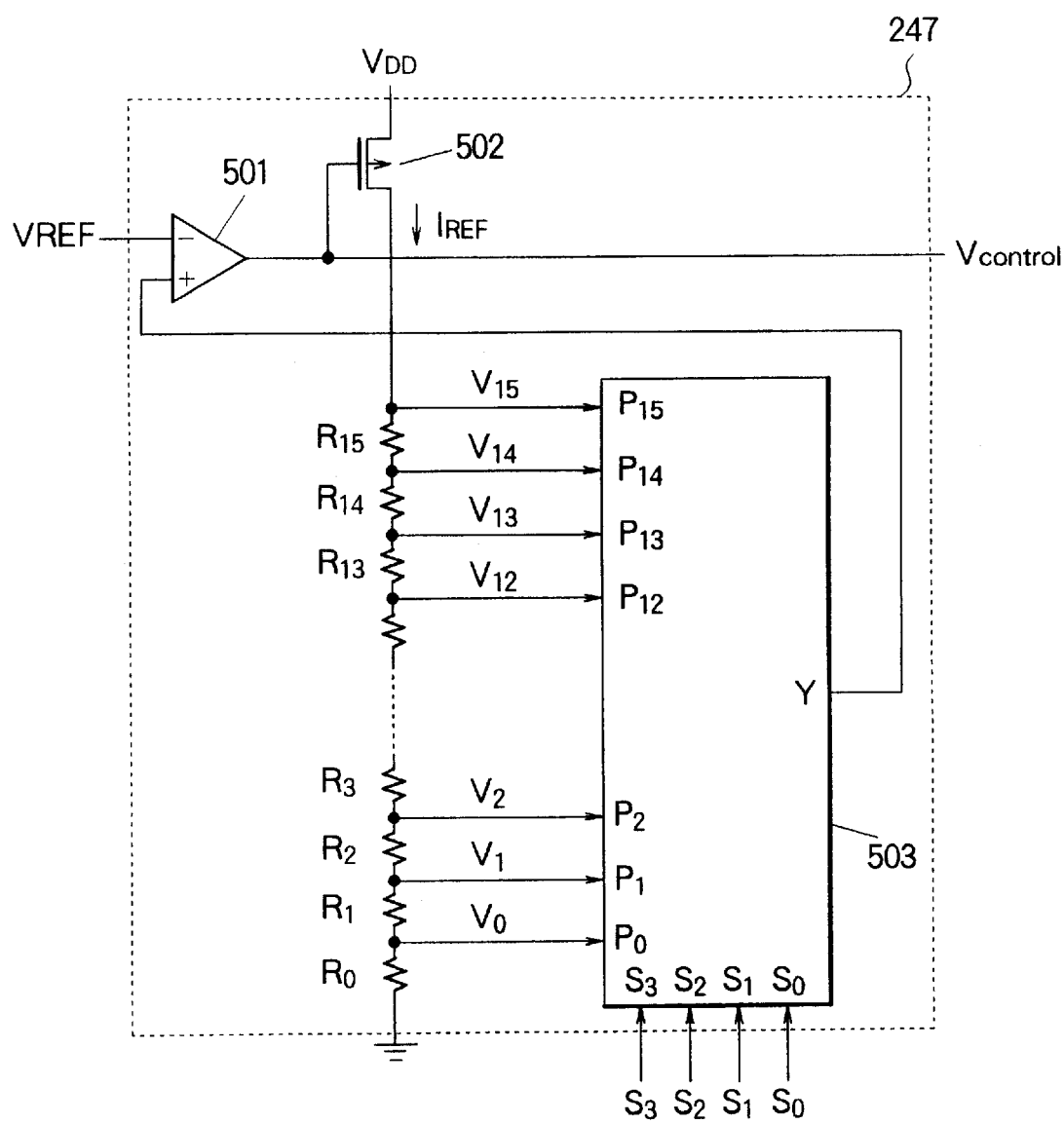
FIG. 42 is a circuit diagram illustrating the current reference circuit in a sixth embodiment.

FIG. 42 illustrates the current reference circuit 247 in the sixth embodiment, using the same reference numerals as in FIGS. 35 and 36 for equivalent elements. As in the fourth embodiment (FIG. 39), the inverting input terminal (−) of the operational amplifier 501 is coupled to the VREF input terminal, and the output terminal of the operational amplifier 501 produces the control voltage Vcontrol, which is applied to the gate terminal of the p-channel MOS transistor 502. The non-inverting input terminal (+) of the operational amplifier 501, however, is now coupled to the output terminal (Y) of a selector circuit 503 similar to circuit shown in FIG. 36.

The source terminal of the p-channel MOS transistor 502 is coupled to the power supply $V_{DD}$. A resistor ladder $R_{15}$, $R_{14}$, $R_{13}$ ..., $R_1$, $R_0$ is coupled between the drain terminal of transistor 502 and ground. Voltages $V_{15}$, $V_{14}$, ..., $V_0$ are output from nodes in the resistor ladder to the input terminals $P_{15}$ to $P_0$ of the selector circuit 503. $V_{15}$ is the drain potential of transistor 502. The chip compensation data $S_3$ to $S_0$ stored in compensation memory circuit CM25a are also input to the selector circuit 503. The voltage output at the output terminal Y of the selector circuit 503 varies in response to both Vcontrol and the chip compensation data $S_3$ to $S_0$. This voltage is supplied to the non-inverting terminal (+) of the operational amplifier 501.

Figure 43:
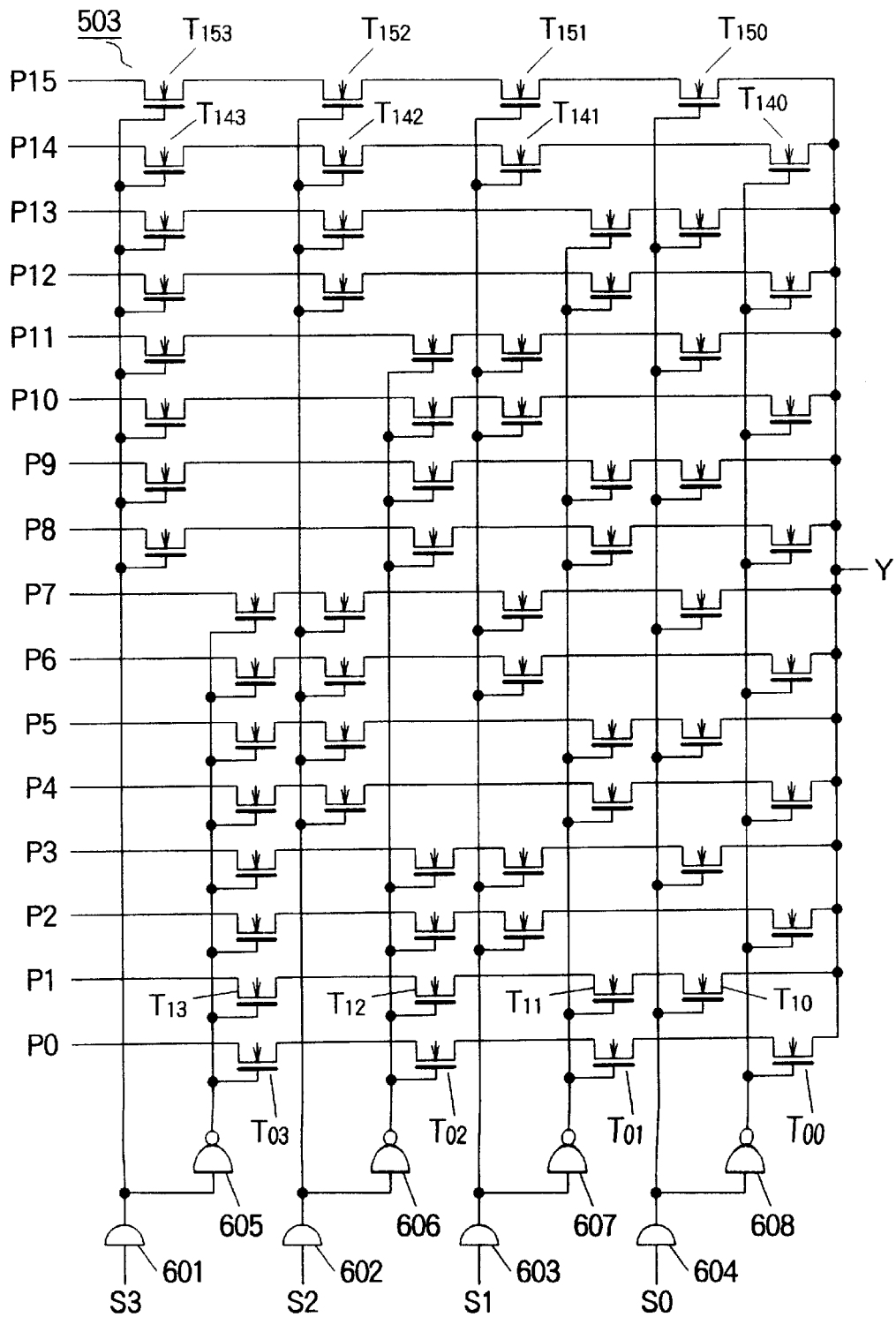
FIG. 43 is a circuit diagram illustrating the internal structure of the selector circuit in FIG. 42.

FIG. 43 shows the internal structure of the selector circuit 503, which comprises buffer circuits 601 to 604 that receive signals $S_3$ to $S_0$, respectively, inverters 605 to 608 that invert the outputs of the buffers 601 to 604, and an array of n-channel MOS transistors:

$T_{03}$, $T_{02}$, $T_{01}$, $T_{00}$ $T_{13}$, $T_{12}$, $T_{11}$, $T_{10}$

...

$T_{143}$, $T_{142}$, $T_{141}$, $T_{140}$ $T_{153}$, $T_{152}$, $T_{151}$, $T_{150}$

These circuit elements are interconnected so that the logic levels of the chip compensation data $S_3$ to $S_0$ couple just one of the input terminals $P_{15}$ to $P_0$ the output terminal Y.

Referring again to FIG. 42, let $I_{ref}$ be the current flowing through MOS transistor 502. If the chip compensation data $S_3$ to $S_0$ are all zero ('0'), the selector circuit 503 selects the $P_0$ input voltage $V_0$, which has the following value.

$$V_0 = R_0 \times I_{ref}$$

This voltage is fed to the non-inverting input terminal of the operational amplifier 501.

The operational amplifier 501 and MOS transistor 502 operate as a feedback control circuit that keeps the input voltage at the non-inverting input terminal substantially equal to the input voltage at the inverting input terminal ($V_{ref}$). Thus, $$V_{ref} = V_0 = R_0 \times I_{ref}$$

$$I_{ref} = V_{ref} / R_0$$

Similarly, when the chip compensation data $S_3$ to $S_0$ are '0001,' the voltage ($V_1$) at input terminal $P_1$ of the selector circuit 503 is selected, and the following relationships obtain:

$$V_1 = I_{ref} \times (R_0 + R_1)$$

$$I_{ref} = V_{ref} / (R_0 + R_1)$$

Since the current flowing through transistor 502 has changed, the gate voltage Vcontrol must also have changed. In like manner, as the chip compensation data $S_3$ to $S_0$ take on other combinations of values, Vcontrol varies in a total of sixteen steps. Due to the current-mirror circuit relationship between transistor 502 and transistors 520 to 524 in FIG. 20, the LED driving currents also vary in sixteen steps.

The selector circuit 503 shown in FIG. 43 uses only n-channel MOS transistors, but this circuit could also be configured as a complementary MOS (CMOS) circuit employing analog switches made up of parallel n-channel and p-channel MOS transistors. Other variations are also possible in the circuit configuration.

Next a seventh embodiment will be described.

The seventh embodiment replaces the resistor ladders and networks used for chip-to-chip compensation in the preceding embodiments with a transistor network. The description of the seventh embodiment will be confined to the current reference circuit 247; other elements are the same as in the sixth embodiment.

Figure 44:
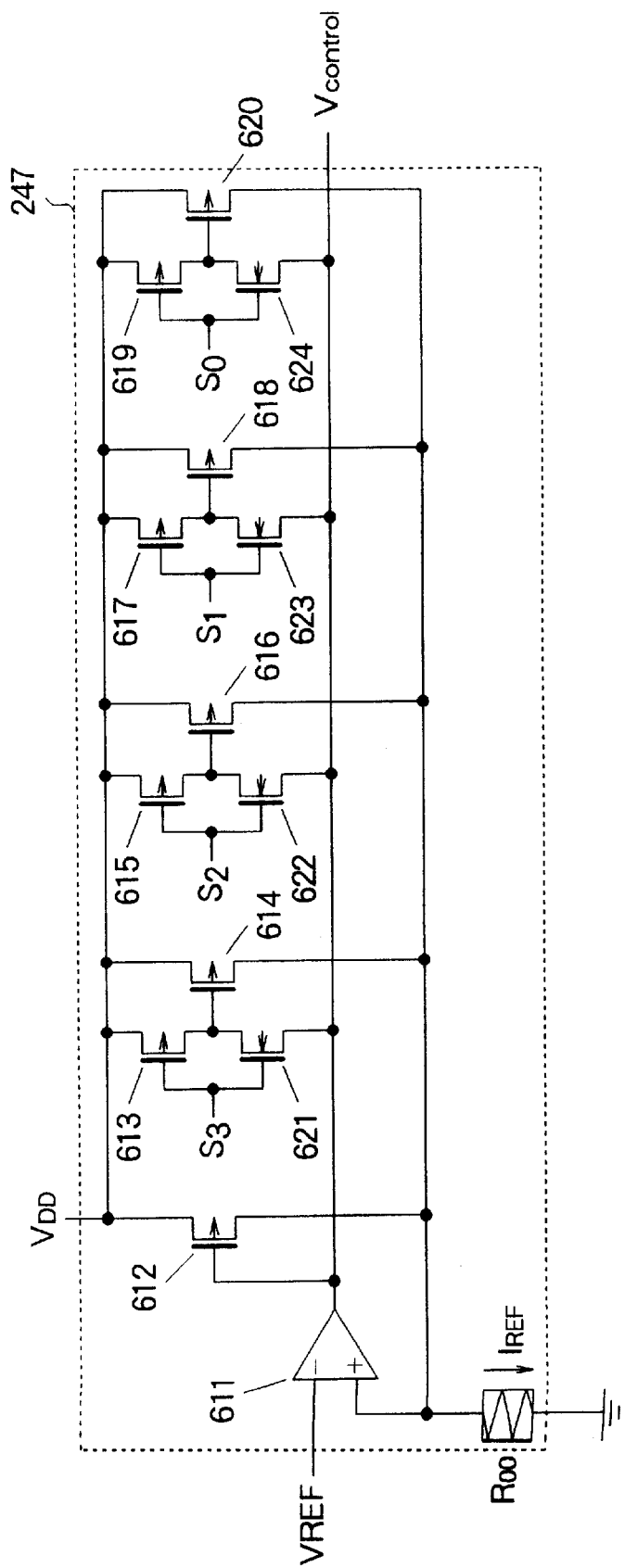
FIG. 44 is a circuit diagram illustrating the current reference circuit in a seventh embodiment.

Referring to FIG. 44, the current reference circuit 247 in the seventh embodiment comprises an operational amplifier 611, a resistor $R_{00}$, p-channel MOS transistors 612 to 620, and n-channel MOS transistors 621 to 624. The inverting input terminal (−) of the operational amplifier 611 is coupled to the VREF input terminal and receives the reference voltage $V_{ref}$. The non-inverting input terminal (+) is coupled through resistor $R_{00}$ to ground, and to the drain terminals of the five p-channel MOS transistors 612, 614, 616, 618, and 620.

Transistors 613 and 621 form an inverter. Transistors 615 and 622, transistors 617 and 623, and transistors 619 and 624 similarly form inverters. The inputs to these four inverters are the chip compensation data signals $S_3$ to $S_0$ output by compensation memory circuit CM25a in FIG. 34. The outputs of these inverters are coupled to the gate terminals of p-channel MOS transistors 614, 616, 618, and 620. Transistors 612 to 624 and the resistor $R_{00}$ form a circuit that varies the voltage input at the non-inverting input terminal (+) of the operational amplifier 501 in response to Vcontrol and the chip compensation data S3 to S0 as described below.

The source terminals of p-channel MOS transistors 612, 614, 616, 618, and 620 are coupled to the power supply $V_{DD}$. The gate terminal of p-channel MOS transistor 612 and the source terminals of n-channel MOS transistors 621 to 624 are coupled to the output of the operational amplifier 611, which is the Vcontrol voltage output by the current reference circuit 247.

Figure 45:
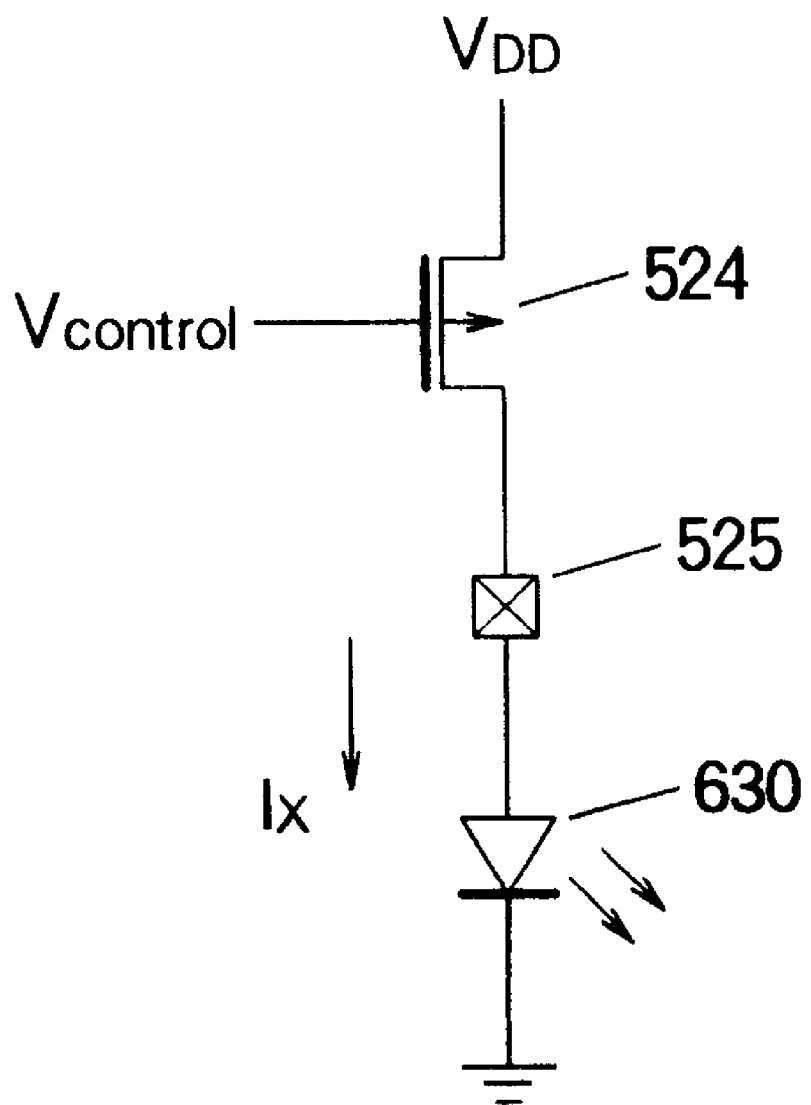
FIG. 45 is a simplified circuit diagram illustrating the driving of an LED.
Figure 46:
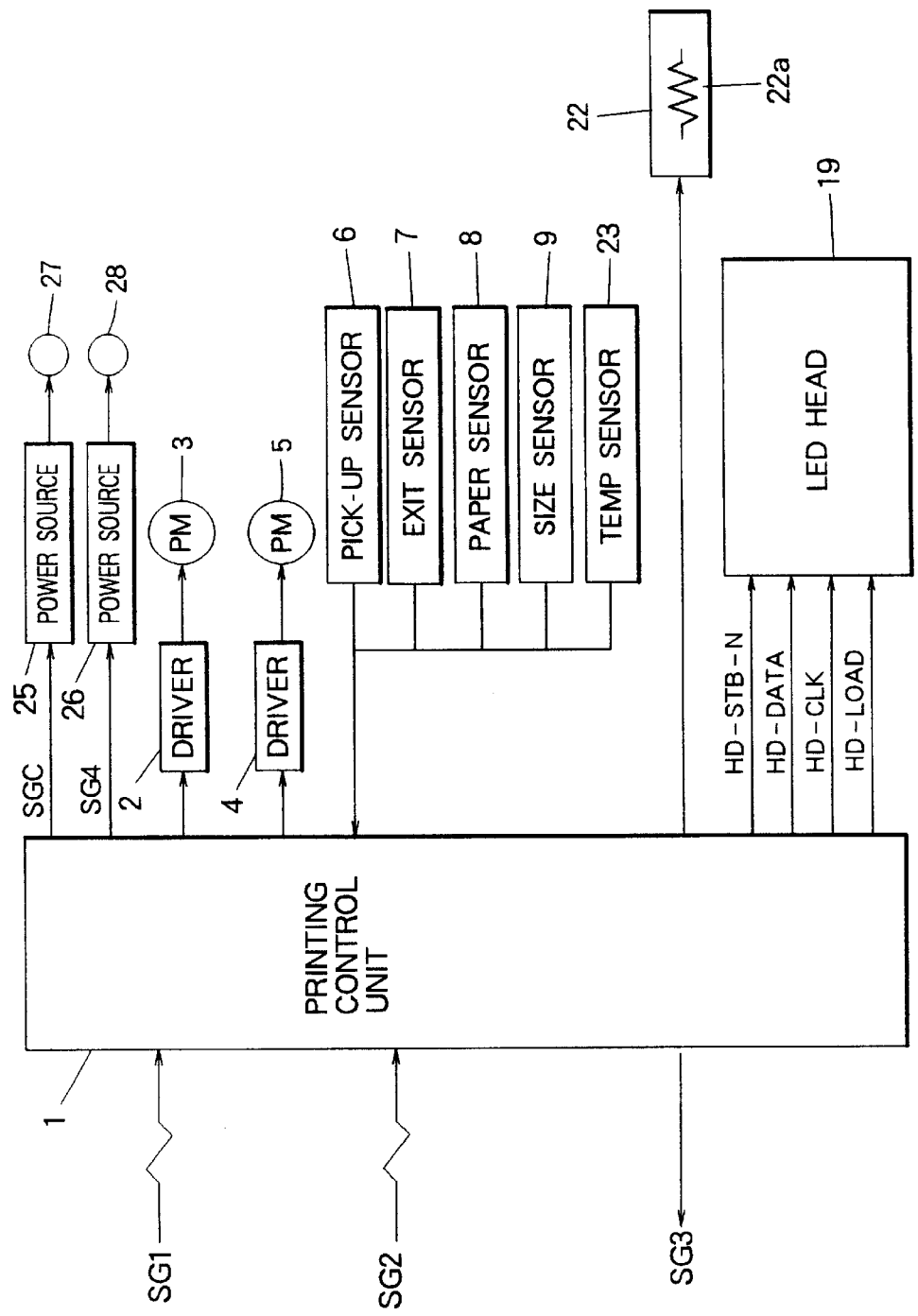
FIG. 46 is a block diagram illustrating the printing control circuits in a conventional electrophotographic printer.

Vcontrol is supplied to the LED driving circuit shown in FIG. 20. FIG. 45 is a simplified drawing illustrating the case when dot compensation data $b_3$ to $b_0$ in FIG. 20 are all zero ('0000') and the DATA-DOTn and LED-DRV-ON signals are both high, so that the gate potential of the main driving transistor 524 is substantially equal to Vcontrol and the other driving transistors 520 to 523 are switched off.

In this case, as shown in FIG. 45, the LED 630 is driven by the single p-channel MOS transistor 524, which is coupled between the power supply $V_{DD}$ and output terminal 525. The current flowing through transistor 524 is denoted $I_x$.

The gate lengths of p-channel MOS transistors 612, 614, 616, 618, 620, and 524 in FIGS. 44 and 45 are equal. The gate widths of these transistors, which are not equal, will be denoted $W_{ref}$, $W_3$, $W_2$, $W_1$, $W_0$, and W, respectively. The current flowing through resistor $R_{00}$ will be denoted $I_{ref}$. As in the sixth embodiment, the operational amplifier 611 operates so as to equalize the voltage levels at the inverting and non-inverting input terminals; therefore:

$$I_{ref} = V_{ref} / R_{00}$$

If $S_3$ is high ('1'), for example, then transistor 621 is switched on and transistor 613 is switched off. Vcontrol is therefore applied to the gate of transistor 614. The current flow through transistor 614 is determined by the value of Vcontrol and the gate width $W_3$.

If $S_3$ is low ('0'), then transistor 613 is switched on and transistor 621 is switched off, and the gate potential of transistor 614 is substantially equal to $V_{DD}$. Transistor 614 is thus switched off and allows no current to flow.

If $S_3$ to $S_0$ are '0000,' transistors 614, 616, 618, and 620 in FIG. 44 are all switched off, making $I_{ref}$ equal to the current flowing through transistor 612. The gate potentials of transistors 612 and 524 are both Vcontrol, so the currents flowing through these two transistors are proportional to their gate widths.

$$I_x = (W/W_{ref}) \times I_{ref}$$

If $S_3$ to $S_0$ are treated as variables taking the values zero and one, then the current flow through transistor 524 for any combination of value of $S_3$ to $S_0$ can be similarly calculated from the gate widths, as follows.

$$I_x = W \times I_{ref}/(W_{ref} + S_3 W_3 + S_2 W_2 + S_1 W_1 + S_0 W_0)$$

Thus the seventh embodiment also enables control of the drive current in sixteen steps on a chip-by-chip basis, responsive to the chip compensation data $S_3$ to $S_0$, in addition to the dot-by-dot control afforded by the dot compensation data $b_3$ to $b_0$.

Although the preceding embodiments have been described in relation to an LED head, substantially the same integrated circuits can also be used to drive resistive heating elements in a thermal printing head, or more generally to drive any type of driven elements in any type of printing or display device. In the general case, the compensation data adjust the driving energy. The benefits obtained in the general case are the same as in the case of an LED head, namely the following:

The driving circuit configuration is simplified, space is saved, fewer input/output terminals are required, fewer wire-bonding interconnections must be made and inspected, and fewer tests need to be made, because the same transferring means are used to transfer both the driving data that turn the driven elements on and off, and the compensation data that adjust the driving energy.

The compensation data can comprise an arbitrary number of bits per driven element, thereby providing any desired degree of compensation precision, because the transferring means transfer all of the most significant bits at one time, all of the next-most-significant bits at another time, and so on for any desired number of bits.

When the driven elements are disposed on a plurality of semiconductor chips, chip compensation data can also be provided to compensate for chip-to-chip variations. The chip compensation data are transferred and stored in memory cells in the same way that the other (dot) compensation data are transferred and stored.

The compensation data are stored in memory cells, which require fewer transistors than conventional flip-flop circuits. Differing from the memory cells in conventional semiconductor memory circuits, each of these memory cells has a separate read-out signal line, so that all necessary compensation data can be supplied to the driving circuits at once.

Those skilled in the art will recognize that the embodiments described above can be modified in various ways within the scope of the invention as claimed below.

What is claimed is:

1. A driving apparatus for selectively driving a plurality of driven elements to form dots, comprising:

a plurality of driving circuits for supplying driving energy to respective driven elements responsive to driving data indicating whether said driven elements are to be driven, and adjusting said driving energy responsive to compensation data indicating adjustment amounts;

a plurality of compensation memory circuits each coupled to respective driving circuits, the compensation memory circuits having respective first switching elements, respective second switching elements, and respective memory elements, each one of said memory elements being a static memory cell comprising a pair of inverters and being coupled between a corresponding one of said first switching elements and a corresponding one of said second switching elements and storing one bit of said compensation data;

at least one control signal line coupled to said compensation memory circuits, for supplying a control signal controlling said first switching elements and said second switching elements, thereby selecting said compensation memory circuits;

a plurality of first signal lines coupled to said first switching elements, and coupled to respective driving circuits, for transferring said compensation data to said memory elements through said first switching elements and transferring said driving data to said driving circuits;

a plurality of second signal lines coupled to said second switching elements, for transferring said compensation data to said memory elements through said second switching elements, with signal levels complementary to signal levels on said first signal lines; and a plurality of third signal lines coupling said memory elements to said driving circuits, for transferring said compensation data to said driving circuits, each of said third signal lines connected to said memory element between said first and said second switching elements.

2. The driving apparatus of claim 1, wherein the first signal lines are directly coupled to said first switching elements and said respective driving circuits.

3. The driving apparatus of claim 1, also comprising:

a non-volatile memory device for storing said compensation data; and transferring means for transferring said compensation data from said non-volatile memory device to said first signal lines and said second signal lines, thus to said compensation memory circuits.

4. The driving apparatus of claim 3, wherein said transferring means transfers said compensation data from said nonvolatile memory device to said compensation memory circuits when said driving apparatus is powered up.

5. The driving apparatus of claim 1, having n said control signal lines for each one of said compensation memory circuits, wherein each one of said compensation memory circuits separately comprises n said first switching elements, n said second switching elements, and n said memory elements coupled by n said third signal lines to a single corresponding one of said driving circuits, said n control signal lines being coupled to respective first switching elements and second switching elements, n being an integer greater than one.

6. The driving apparatus of claim 5, wherein:

said driving apparatus comprises a plurality of integrated circuits coupled in series, each one of said integrated circuits including at least one of said driving circuits and at least one of said compensation memory circuits;

said integrated circuits receiving selection signals from an external device; and said integrated circuits having respective decoding circuits for decoding said selection signals, thereby generating the control signals supplied on said control signal lines.

7. The driving apparatus of claim 5, wherein said driving apparatus comprises a plurality of integrated circuits coupled in series, each one of said integrated circuits including at least one of said driving circuits and at least one of said compensation memory circuits; and each one of said integrated circuits having an internal means for generating the control signals supplied on said control signal lines, said control signals selecting the n memory cells in turn in each of said compensation memory circuits.

8. The driving apparatus of claim 5 further comprising a timing generator for generating n said control signals on n said control signal lines, said n control signals selecting the n memory cells in turn in each of said compensation memory circuits in response to a strobe signal from an external device wherein said driving circuits provide said driving energy to said driven elements for durations of time responsive to said strobe signal.

9. The driving apparatus of claim 8, wherein said driving apparatus receives a load signal from said external device, said load signal having a first state and a second state, also comprising:
- a latching means for latching said driving data when said load signal is in said first state; and
- a disabling means for disabling the supply of said driving energy to said driven elements when said load signal is in said second state.

10. The driving apparatus of claim 1, further comprising a shift register having stages corresponding to said driving circuits, each of said stages having an output terminal coupled to a corresponding one of said first signal lines, said shift register receiving said driving data and said compensation data from an external device, and supplying said driving data and said compensation data to said first signal lines.

11. The driving apparatus of claim 10, wherein said compensation data are first transferred into all of said stages of said shift register from said external device, before being written by said shift register into said compensation memory circuits.

12. The driving apparatus of claim 11, wherein said compensation memory circuits are grouped into at least two blocks, said driving apparatus further comprising respective timing circuits for generating said control signals separately for each block, said control signals being responsive to timing signals from an external source separately for each block and causing said compensation data to be transferred from said shift register into said compensation memory circuits in respective blocks in synchronization with said separate timing signals at different times in different said blocks.

13. The driving apparatus of claim 11, wherein at least part of said compensation data is written into all of said compensation memory circuits simultaneously by simultaneous activation of at least one of said control signal lines in all of said compensation memory circuits.

14. A driving apparatus for selectively and cyclically driving a plurality of driven elements to form dots, said driven elements being disposed on at least two different semiconductor chips, comprising:
- a plurality of driving circuits for supplying driving energy to respective driven elements responsive to driving data that indicate whether respective driven elements are to be driven, for adjusting said driving energy responsive to chip compensation data, thereby compensating for differences between said semiconductor chips, and for further adjusting said driving energy responsive to dot compensation data, thereby compensating for differences between driven elements not disposed on different semiconductor chips;
- a plurality of dot compensation memory circuits coupled to said driving circuits, for storing said dot compensation data;
- a plurality of chip compensation memory circuits, coupled to said driving circuits, for storing said chip compensation data; and
- a shift register having stages corresponding to said driving circuits, each of said stages having an output terminal coupled to a corresponding driving circuit among said driving circuits, and to a corresponding dot compensation memory circuit among said dot compensation memory circuits, for first transferring said dot compensation data to said dot compensation memory circuits, then transferring said driving data to said driving circuits in successive cycles, each of said driving circuits receiving driving data for one dot per cycle, and having additional stages with output terminals coupled to said chip compensation memory circuits for transferring said chip compensation data to said chip compensation memory circuits, wherein said shift register also has a bypass circuit coupling the stages preceding and following said additional stages together, thereby bypassing said additional stages; said bypass circuit receiving a load signal from an external device, said load signal activating and deactivating said bypass circuit; said bypass circuit being deactivated, when said dot compensation data and said chip compensation data are transferred through said shift register; and said bypass circuit being activated when said driving data are transferred through said shift register, said driving data thus bypassing said additional stages.

15. The driving apparatus of claim 14, further comprising:
- a plurality of voltage generating means coupled to respective chip compensation memory circuits, for generating respective control voltages responsive to the chip compensation data stored in said chip compensation memory circuits; wherein
- each one of said driving circuits receives the control voltage generated by one of said voltage generating means, has a main transistor switched on by application of said control voltage responsive to said driving data, and has at least one compensation transistor switched on by application of said control voltage responsive to said driving data and said dot compensation data, said main transistor and said compensation transistor being coupled in parallel to a corresponding one of said driven elements, and collectively supplying said driving energy to said corresponding one of said driven elements.

16. The driving apparatus of claim 15, wherein all of said voltage generating means receive a common reference voltage, and the control voltage generated by each one of said voltage generating means is also responsive to said reference voltage.

17. The driving apparatus of claim 16, wherein each one of said voltage generating means separately comprises:
- an operational amplifier having a first input terminal for receiving said reference voltage, a second input terminal, and an output terminal;
- a transistor coupled between a first power-supply potential and the second input terminal of said operational amplifier, having a gate terminal coupled to the output terminal of said operational amplifier;
- a resistor coupled between the second input terminal of said operational amplifier and a second power-supply potential;
- a resistor ladder having a plurality of resistors coupled in series between the output terminal of said operational amplifier and said first power-supply potential, and having a plurality of nodes disposed adjacent to respective resistors; and
- a selector coupled to said nodes, for selecting one of said nodes, responsive to said chip compensation data, and outputting, as said control voltage, a voltage produced by said resistor ladder at the selected one of said nodes.

18. The driving apparatus of claim 16, wherein each one of said voltage generating means separately comprises:

an operational amplifier with a first input terminal for receiving said reference voltage, a second input terminal, and an output terminal for producing said control voltage;

a transistor coupled between a first power-supply potential and the second input terminal of said operational amplifier, having a gate terminal coupled to the output terminal of said operational amplifier;

a main resistor coupled between the second input terminal of said operational amplifier and a second power-supply potential;

at least one compensation resistor coupled in parallel with said main resistor between the second input terminal of said operational amplifier and a second power-supply potential; and for each said compensation resistor, a switching element coupled in series with said compensation resistor between the second input terminal of said operational amplifier and the second power-supply potential, said switching element being switched on and off responsive to said chip compensation data.

19. The driving apparatus of claim 16, wherein each one of said voltage generating means separately comprises:

an operational amplifier with a first input terminal for receiving said reference voltage, a second input terminal, and an output terminal for producing said control voltage;

a transistor having a first terminal coupled to a first power-supply potential, a second terminal, and a gate terminal coupled to the output terminal of said operational amplifier;

a resistor ladder having a plurality of resistors coupled in series between the second terminal of said transistor and a second power-supply potential, and having a plurality of nodes disposed adjacent to respective resistors; and a selector coupled to said nodes, for selecting one of said nodes, responsive to said chip compensation data, and coupling the selected one of said nodes to the second input terminal of said operational amplifier.

20. The driving apparatus of claim 16, wherein each one of said voltage generating means separately comprises:

an operational amplifier with a first input terminal for receiving said reference voltage, a second input terminal, and an output terminal for producing said control voltage;

a first transistor coupled between a first power-supply potential and the second input terminal of said operational amplifier, having a gate terminal coupled to the output terminal of said operational amplifier;

a resistor coupled between the second input terminal of said operational amplifier and a second power-supply potential;

at least one other transistor coupled in parallel with said first transistor between said first power-supply potential and the second input terminal of said operational amplifier, having a gate terminal; and for each said other transistor, a switching element for coupling the output terminal of said operational amplifier to the gate terminal of said other transistor responsive to said chip compensation data.

* * * * *